(12) United States Patent
Tanaka

(10) Patent No.: US 9,511,542 B2
(45) Date of Patent: Dec. 6, 2016

(54) ADHESIVE TAPE CARTRIDGE

(71) Applicant: Brother Kogyo Kabushiki Kaisha, Nagoya-shi, Aichi-ken (JP)

(72) Inventor: Mitsugi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/529,425

(22) Filed: Oct. 31, 2014

(65) Prior Publication Data

US 2015/0053351 A1 Feb. 26, 2015

Related U.S. Application Data

(63) Continuation-in-part of application No. PCT/JP2013/062781, filed on May 2, 2013.

(30) Foreign Application Priority Data

May 2, 2012 (JP) ................................ 2012-105353
Sep. 27, 2012 (JP) ................................ 2012-214818

(51) Int. Cl.
*B44C 7/00* (2006.01)
*B41J 35/28* (2006.01)
(Continued)

(52) U.S. Cl.
CPC ......... *B29C 65/5092* (2013.01); *B65H 16/005* (2013.01); *B65H 19/1852* (2013.01);
(Continued)

(58) Field of Classification Search
CPC ... B65H 35/0026; B65H 49/00; B65H 37/002; B65H 2301/5111; B65H 2701/1849; B65H 75/14; B65H 37/02; B65H 37/005; B65H 35/00; B65H 19/12; B32B 7/16; B32B 38/1841; B65C 9/0006; B65C 2009/0096; B65C 2009/0087; B65C 9/1892; B65C 11/004; B65C 2201/00; B65C 9/18; B65C 9/1865; B65C 9/1869; B54C 2009/0009; B41J 3/4075; B41J 15/044; B44C 7/00

See application file for complete search history.

(56) References Cited

U.S. PATENT DOCUMENTS 2,309,396 A 1/1943 Jackson
9,193,557 B2 * 11/2015 Tanaka ................... B65C 9/00
(Continued)

FOREIGN PATENT DOCUMENTS

JP S58-166091 A 10/1983
JP H06-278936 A 10/1994
(Continued)

OTHER PUBLICATIONS

Yamaguchi, "JP 2009-214433, machine translation", published Sep. 24, 2009.*

(Continued)

*Primary Examiner* — Alex Efta
(74) *Attorney, Agent, or Firm* — Banner & Witcoff, Ltd.

(57) ABSTRACT

This disclosure discloses an adhesive tape cartridge comprising an adhesive tape roll, a peeling part, a separation material roll, a support member, and adhering portion. The adhesive tape roll wound an adhesive tape comprising an adhesive layer and a separation material layer covering the adhesive layer. The peeling part is configured to peel the separation material layer from the adhesive tape fed out from the adhesive tape roll, and thereby to generate an affixing tape. The separation material roll is configured to wind the separation material layer peeled by the peeling part. The support member respectively rotatably supports the adhesive tape roll and the separation material roll. The adhering portion is configured to reseparably adhere the (Continued)

affixing tape generated by the peeling of the separation material layer by the peeling part.

7 Claims, 54 Drawing Sheets

(51) Int. Cl.

| | | |
|---|---|---|
| *B65H 75/00* | (2006.01) | |
| *B29C 65/50* | (2006.01) | |
| *B65H 35/00* | (2006.01) | |
| *B65H 37/00* | (2006.01) | |
| *B65H 16/00* | (2006.01) | |
| *B65H 19/18* | (2006.01) | |
| *B65C 9/00* | (2006.01) | |
| *B65H 19/12* | (2006.01) | |
| *B41J 3/407* | (2006.01) | |
| *B41J 15/04* | (2006.01) | |

(52) U.S. Cl.
CPC ....... *B65H 35/0026* (2013.01); *B65H 37/002* (2013.01); *B41J 3/4075* (2013.01); *B41J 15/042* (2013.01); *B41J 15/044* (2013.01); *B44C 7/00* (2013.01); *B65C 9/0006* (2013.01); *B65H 19/12* (2013.01); *B65H 2301/46011* (2013.01); *B65H 2301/5111* (2013.01); *B65H 2701/11332* (2013.01); *B65H 2701/1849* (2013.01); *Y10T 156/17* (2015.01)

(56) References Cited

U.S. PATENT DOCUMENTS

| | | | |
|---|---|---|---|
| 9,221,649 B2 * | 12/2015 | Tanaka | B65H 35/002 |
| 2002/0003549 A1 | 1/2002 | Mitsuhashi | |
| 2011/0008090 A1 | 1/2011 | Yamaguchi et al. | |

FOREIGN PATENT DOCUMENTS

| | | | |
|---|---|---|---|
| JP | H10-193651 A | | 7/1998 |
| JP | 2002-006701 A | | 1/2002 |
| JP | 2006-103078 A | | 4/2006 |
| JP | 2006-328118 A | | 12/2006 |
| JP | 2008-024503 A | | 2/2008 |
| JP | 2009-214433 A | | 9/2009 |
| JP | 2009214433 A | * | 9/2009 |
| JP | 2010-099886 A | | 5/2010 |

OTHER PUBLICATIONS

Yamaguchi, "JP 2009214433, machine translation", published Sep. 24, 2009.*
Oct. 8, 2015—(EP) Extended Search Report—App 13784670.5.
Nov. 13, 2014—(WO) International Preliminary Report on Patentability—App PCT/JP2013/062781, Eng Tran.
May 28, 2013—International Search Report—PCT/JP2013/062781.

* cited by examiner

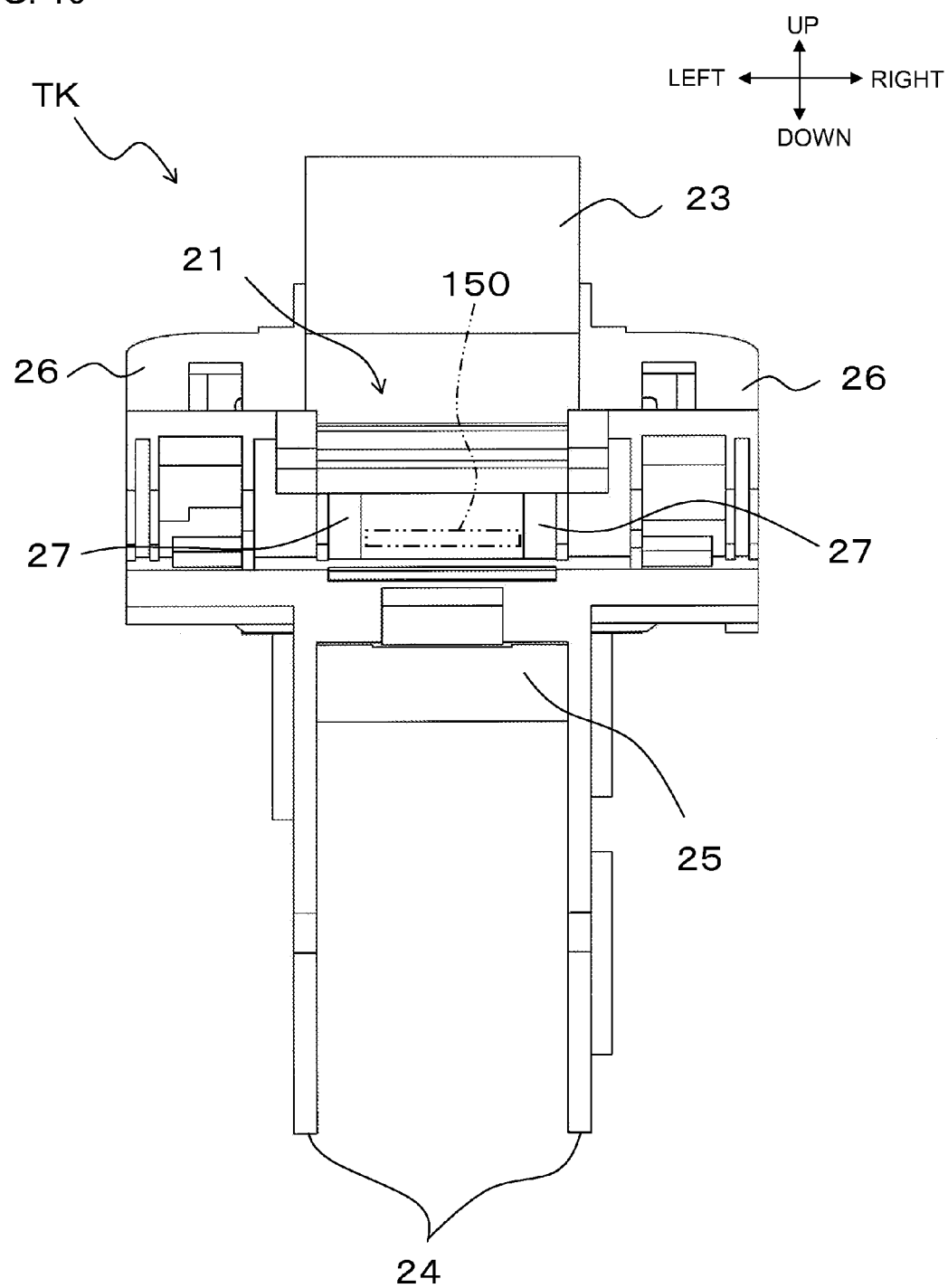

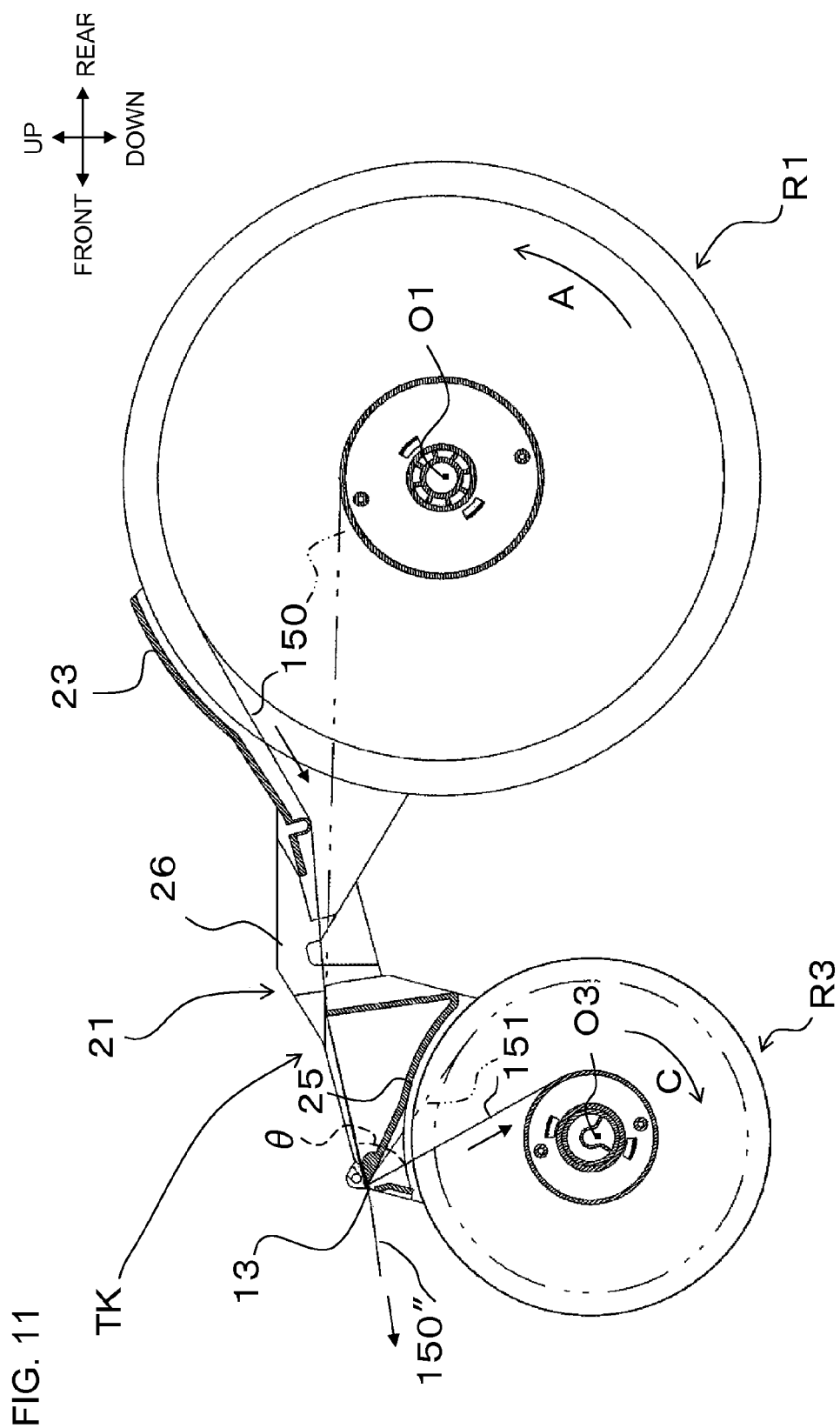

FIG. 17
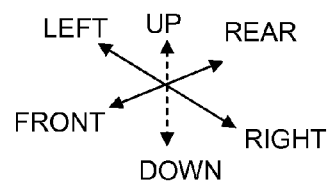
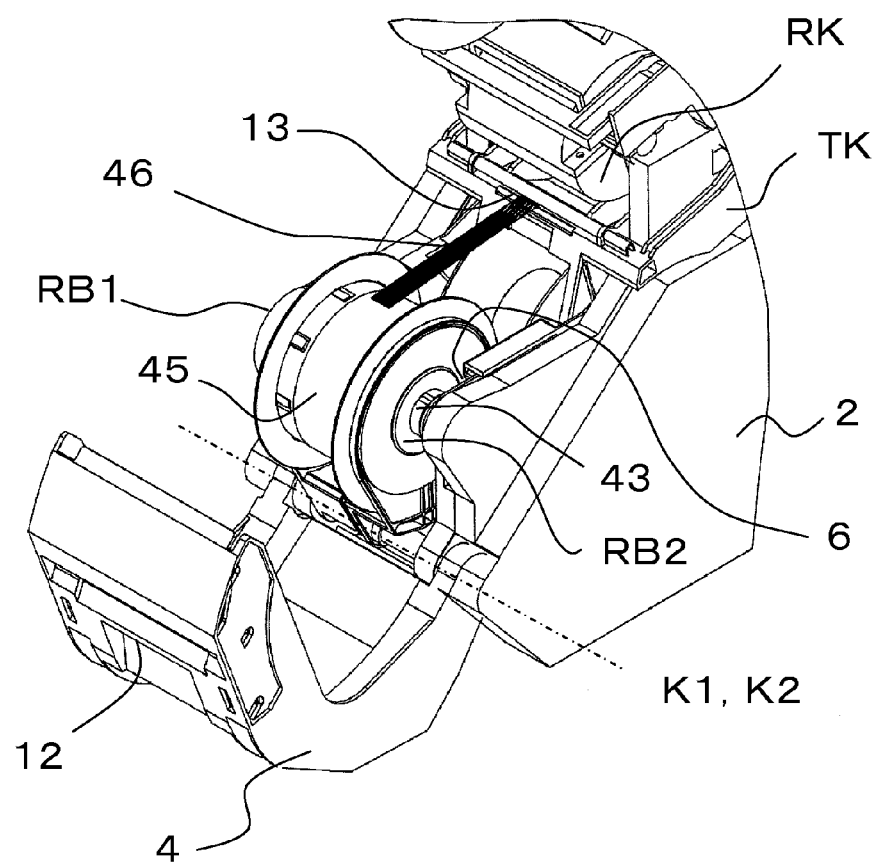

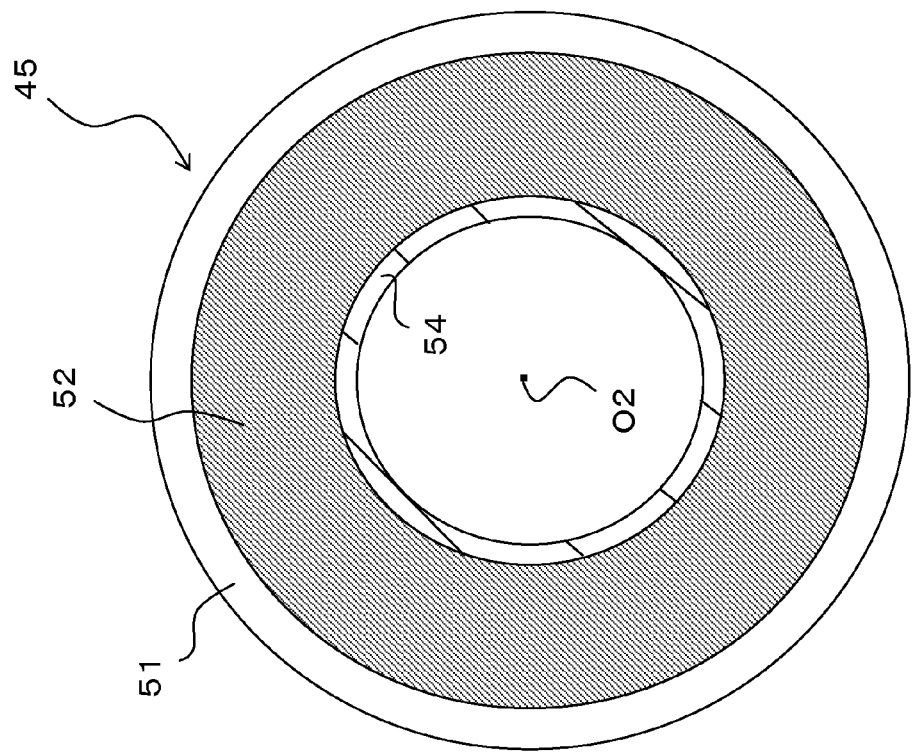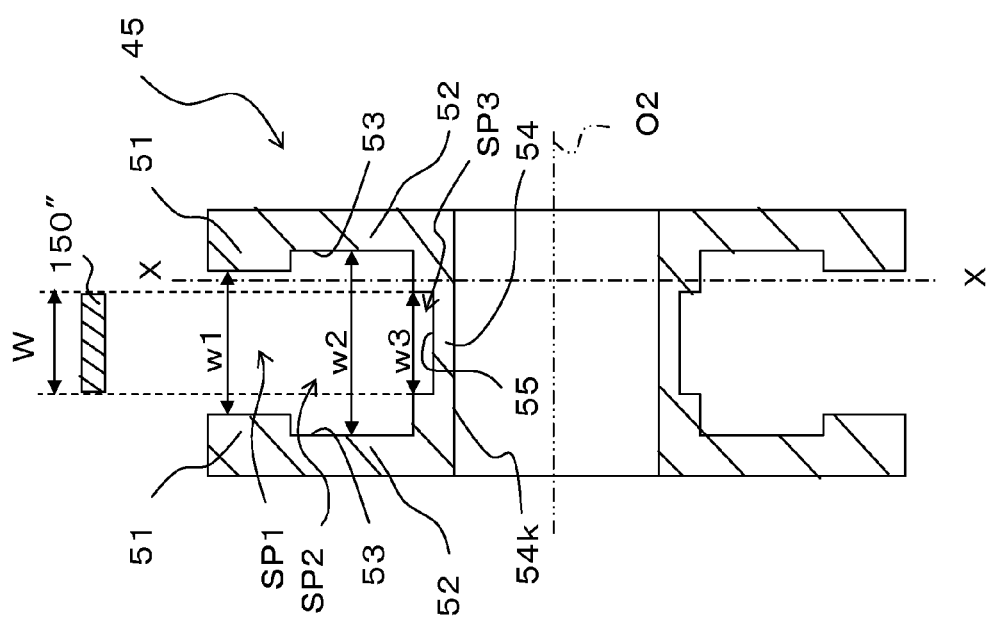

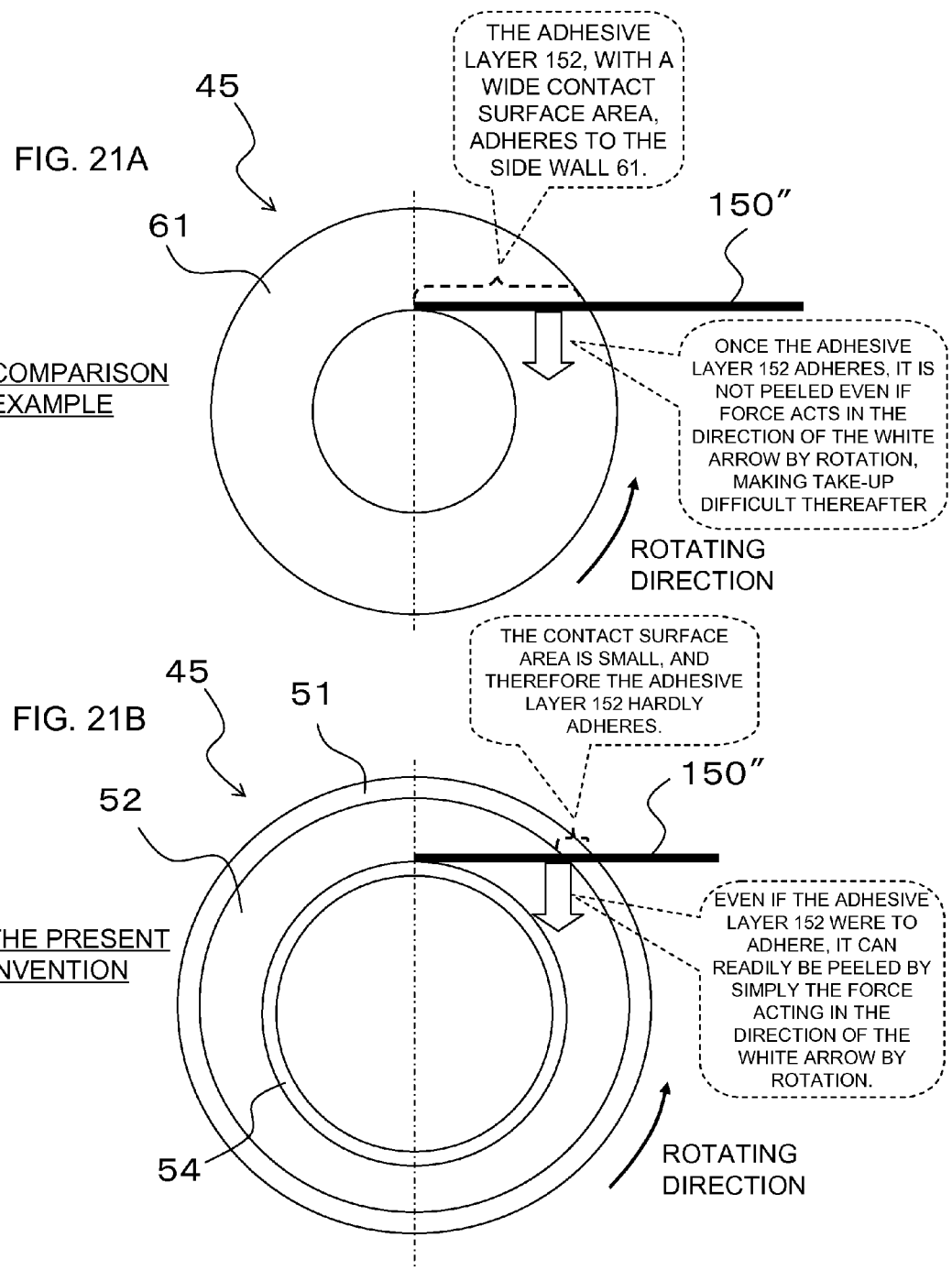

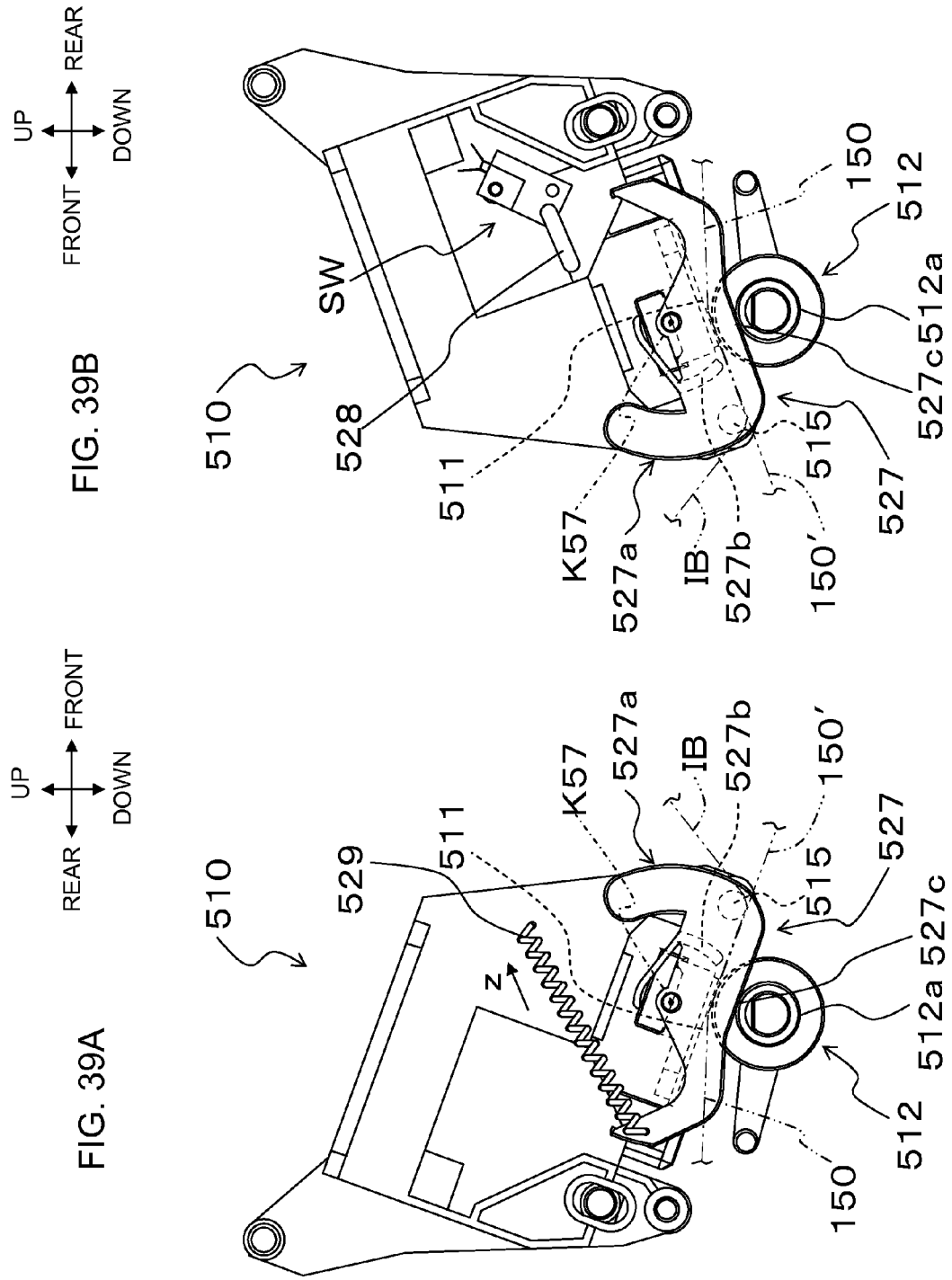

ADHESIVE TAPE CARTRIDGE

CROSS-REFERENCE TO RELATED APPLICATION

This is a CIP application PCT/JP2013/062781, filed May 2, 2013, which was not published under PCT article 21(2) in English.

BACKGROUND

Field

The present disclosure relates to an adhesive tape cartridge capable of supplying an adhesive tape comprising an adhesive layer.

Description of the Related Art

Heretofore, adhesive tape cartridges capable of supplying adhesive tape comprising an adhesive layer have been known. This adhesive tape cartridge comprises an adhesive tape roll around which is wound an adhesive tape comprising an adhesive layer and separation material layer. The separation material layer of the adhesive tape fed out and fed by the rotation of the adhesive tape roll is peeled by a peeling part. The affixing tape is generated by peeling the separation material layer from this adhesive tape, and then discharged outside the adhesive tape cartridge.

Nevertheless, the prior art has the following problems. That is, the adhesive layer of the affixing tape discharged outside the adhesive tape cartridge as described above is exposed by the peeling of the separation material layer. Accordingly, in a case where the adhesive tape cartridge is carelessly handled by the user, the adhesive layer of the affixing tape may possibly mistakenly self adhere to another area of the affixing tape or mistakenly stick to another area of the cartridge as is. In such a case, the overall adhesive tape cartridge becomes difficult to handle, inconveniencing the user.

SUMMARY

It is therefore an object of the present disclosure to provide an adhesive tape cartridge capable of preventing mistaken adherence or sticking of the affixing tape, thereby improving the handling performance of the overall cartridge.

In order to achieve the above-described object, according to an aspect of the present application, there is provided an adhesive tape cartridge comprising an adhesive tape roll wound an adhesive tape comprising an adhesive layer and a separation material layer covering the adhesive layer, a peeling part configured to peel the separation material layer from the adhesive tape fed out from the adhesive tape roll, and thereby to generate an affixing tape, a separation material roll configured to wind the separation material layer peeled by the peeling part, a support member that respectively rotatably supports the adhesive tape roll and the separation material roll, and an adhering portion configured to resebably adhere the affixing tape generated by the peeling of the separation material layer by the peeling part.

The adhesive tape cartridge in the aspect of the present application comprises an adhesive tape roll around which is wound an adhesive tape comprising an adhesive layer and separation material layer, a separation material roll around which is wound the separation material layer, and a support member that freely rotatably supports these two rolls. The separation material layer of the adhesive tape fed out and fed by the rotation of the adhesive tape roll is peeled by a peeling part. The peeled separation material layer is taken up and wound, thereby forming the separation material roll.

On the other hand, the separation material layer is peeled from the adhesive tape, thereby generating the affixing tape at the peeling part. The separation material layer of this affixing tape is peeled, thereby exposing the adhesive layer. Accordingly, in a case where the cartridge is carelessly handled by the user, the adhesive layer of the affixing tape may possibly mistakenly self adhere to another area of the affixing tape, stick to the separation material roll, or stick to another area of the cartridge as is.

Hence, in the aspect of the present application, the adhering portion for resebably adhering the affixing tape is provided. With this arrangement, when the cartridge is handled as described above, the user adheres the generated affixing tape (in particular, the tip end and nearby area) to the adhering portion, making it possible to prevent the affixing tape from mistakenly sticking to another location as described above.

As a result of the above, in the aspect of the present application, it is possible to improve the handling performance of the overall cartridge and improve user convenience.

BRIEF DESCRIPTION OF THE DRAWINGS

FIG. 10 is a front view showing the overall configuration of the adhesive tape cartridge.

FIG. 11 is a sectional side view of the adhesive tape cartridge, from the right side.

FIG. 17 is a perspective view showing the state in which the support bracket of the second roll is pivoted rearward, connecting the connection tape piece from the core member.

FIG. 20A is a transverse cross-sectional view showing another example of the core member.

FIG. 20B is a cross-sectional view of the X-X cross-section in FIG. 20A.

FIG. 21A is an explanatory view explaining the tape adhering behavior in a comparison example with respect to the other example of the core member.

FIG. 21B is an explanatory view explaining the tape adhering behavior in the other example.

FIG. 39A is a left side view showing the head holder extracted.

FIG. 39B is a right side view showing the head holder extracted.

DETAILED DESCRIPTION OF THE PREFERRED EMBODIMENTS

Figure 1:
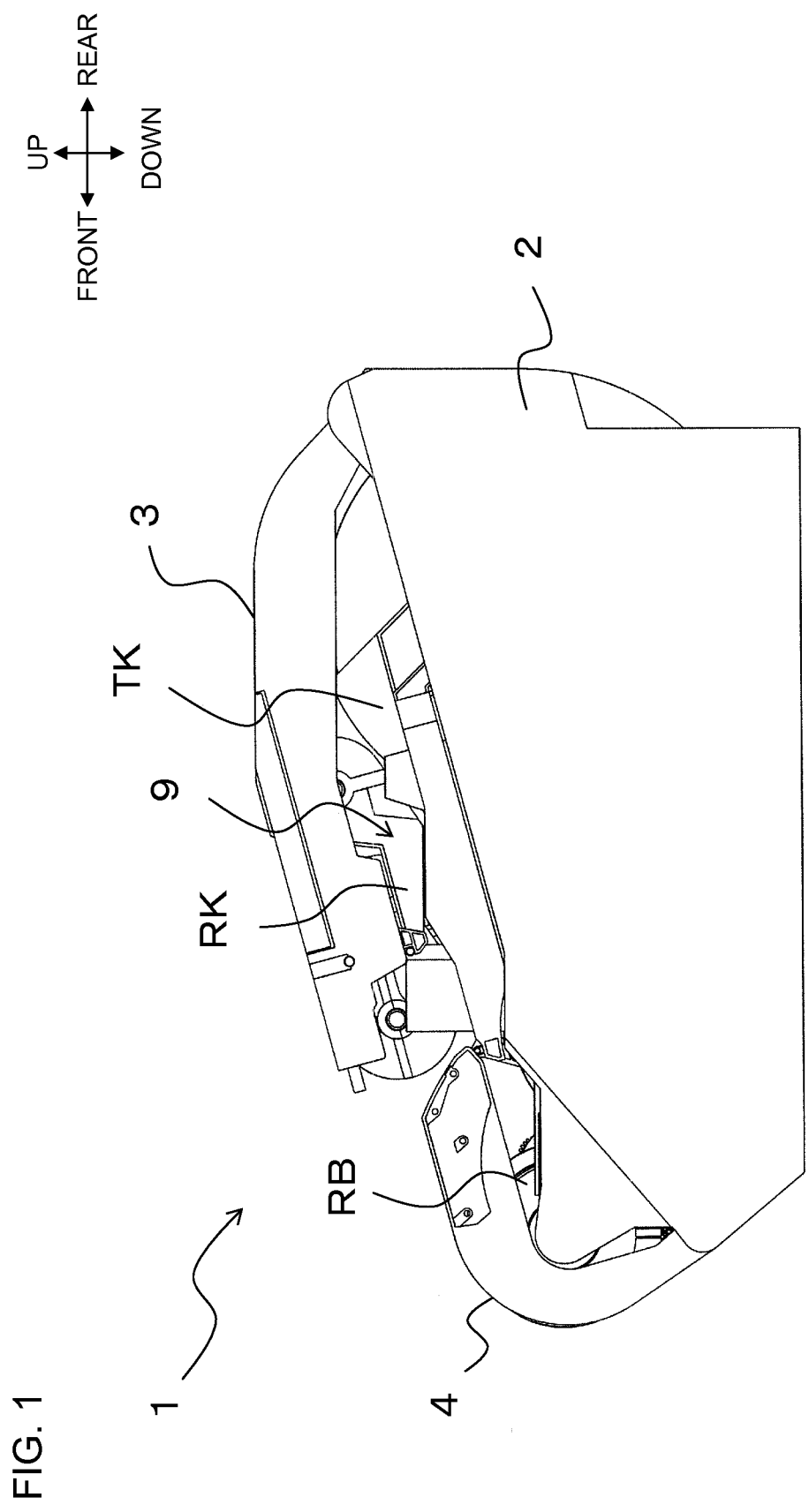
FIG. 1 is a right side view showing the outer appearance of the adhesive tape printer related to embodiment 1 of the present disclosure.

In the following, embodiments of the present disclosure will be described with reference to the accompanying drawings. Note that, in a case where "Front," "Rear," "Left," "Right," "Up," and "Down" are denoted in the drawings below, the terms "Frontward (Front)," "Rearward (Rear)," "Leftward (Left)," "Rightward (Right)," "Upward (Up),"

and "Downward (Down)" in the explanations within the description refer to the denoted directions.

Embodiment 1 of the present disclosure will now be described with reference to FIGS. 1-25.

General Configuration of Adhesive Tape Printer

First, the general configuration of the adhesive tape printer related to this embodiment will be described based on FIGS. 1-6.

In FIGS. 1-6, an adhesive tape printer 1 comprises a housing 2 that constitutes the apparatus outer frame, a first opening/closing cover 3 positioned on the upper rearward side of the housing 2, a second opening/closing cover 4 positioned on the upper frontward side of the housing 2, a first storage part 5 included on the rearward side of the housing 2, and a second storage part 6 and a third storage part 7 included on the frontward side of the housing 2.

At this time, an adhesive tape cartridge TK is attachably and detachably mounted to a first predetermined position 8 below the first opening/closing cover 3 (in a closed state) of the housing 2, as shown in FIG. 1, FIG. 2, FIG. 4, FIG. 5, FIG. 6, and the like. The adhesive tape cartridge TK freely rotatably comprises a first roll R1 (details described later) on the rearward side, and freely rotatably comprises a third roll R3 (details described later) on the frontward side. The adhesive tape cartridge TK is mounted to the first predetermined position 8, causing the first roll R1 to be stored in the first storage part 5, and the third roll R3 to be stored in the third storage part 7.

With the mounting of the above described adhesive tape cartridge TK, the first storage part 5 receives the above described first roll R1 from above, wherein a print-receiving adhesive tape 150 is wound around an axis O1 (refer to FIG. 2) in the substantial horizontal direction, storing the first roll R1 with the axis O1 of the above described winding in the horizontal direction (specifically, the left-right direction). In the print-receiving adhesive tape 150 are layered a base layer 153 on which preferred print is formed by a print head 10 described later, an adhesive layer 152 for affixing this base layer 153 to a suitable adherend (not shown), and a separation material layer 151 that covers this adhesive layer 152, in this order (refer to FIG. 3).

At this time, the first opening/closing cover 3 is capable of opening and closing the area above the first storage part 5 by pivoting around a predetermined pivot axis K disposed on the rearward side end of the housing 2. Specifically, the first opening/closing cover 3 is pivotable from a closed position where the rearward side of the housing 2 is covered (the states in FIG. 1, FIG. 2, FIG. 3, and FIG. 5) to an open position where the rearward side of the housing 2 is exposed (the states in FIG. 4 and FIG. 6).

Further, the print head 10 and a feeding roller 11 are disposed vertically facing each other on the upward side of the substantial middle of the housing 2 interior communicated with the first storage part 5 and the third storage part 7.

The feeding roller 11 feeds the print-receiving adhesive tape 150 fed out from the above described first roll R1 stored in the above described first storage part 5 in a tape posture in which the tape width direction is in the left-right direction (in other words, in a tape posture where the tape transverse cross-section is in the substantially horizontal direction; refer to FIG. 10 and the like described later). Note that, at this time, the print-receiving adhesive tape 150 is layered in the order of the above described base layer 153, the adhesive layer 152, and the separation material layer 151, from one side in the thickness direction (upper side in this example) to the other side (lower side in this example), as described above (refer to FIG. 3). That is, the base layer 153 is positioned as the uppermost layer, and the separation material layer 151 is positioned as the lowermost layer. Further, this feeding roller 11 is driven by a feeding motor M1 via a gear mechanism (not shown). The feeding motor M1 is disposed in the middle of the first storage part 5 as well as the second storage part 6 and the third storage part 7 divided between a rearward side and a frontward side as described above (further on the frontward side than the first storage part 5, and further on the rearward side than the second storage part 6 and the third storage part 7), so that the axial direction of an output shaft (not shown) is in the left-right direction. Note that the feeding roller 11 is disposed substantially above the above described feeding motor M1 in this example.

Figure 2:
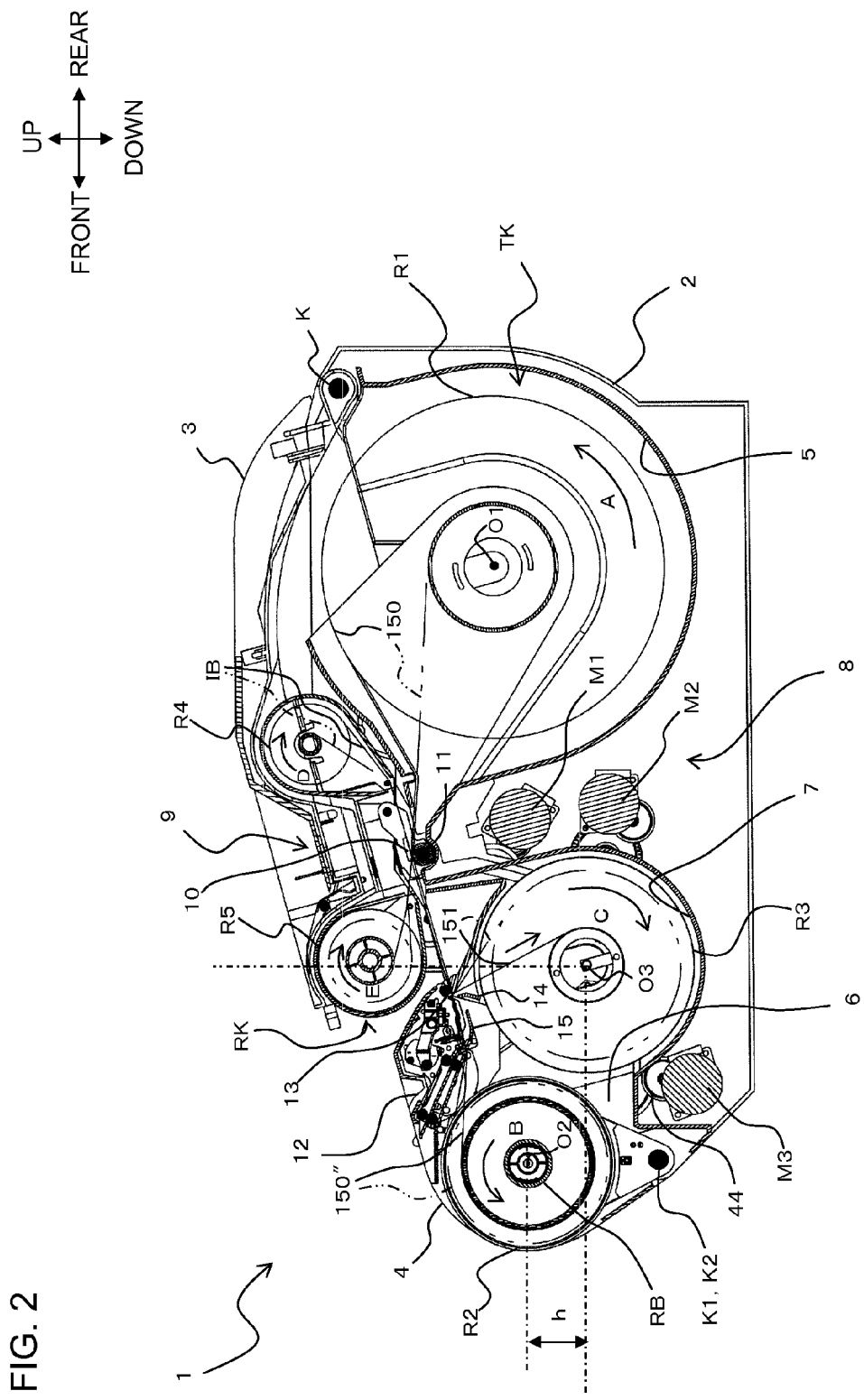
FIG. 2 is a vertical cross-sectional view showing the internal structure of the adhesive tape printer.

The print head 10 is disposed in an area of the first opening/closing cover 3 substantially upwardly facing the feeding roller 11 so that it sandwiches the fed above described print-receiving adhesive tape 150 in coordination with the feeding roller 11 (refer to FIG. 2 and the like). Then, preferred print is formed on the above described base layer 153 of the fed above described print-receiving adhesive tape 150 using an ink ribbon IB of a ribbon cartridge RK comprising a ribbon supply roll R4 and a ribbon take-up roll R5, thereby generating an adhesive tape 150' with print (refer to FIG. 3 and the like).

That is, the ribbon cartridge RK is attachably and detachably mounted to a second predetermined position 9 below the first opening/closing cover 3 (in a closed state) of the housing 2 and above the above described adhesive tape cartridge TK, as shown in FIG. 1, FIG. 2, FIG. 4, FIG. 5, FIG. 6, and the like. The ribbon cartridge RK freely rotatably comprises the ribbon supply roll R4, which feeds out the ink ribbon IB (refer to FIG. 2) for print formation by the above described print head 10, on the rearward side, and freely rotatably comprises the ribbon take-up roll R5, which takes up the used ink ribbon IB after print formation, on the frontward side. The ribbon cartridge RK is mounted to the second predetermined position 9, disposing the ribbon supply roll R4 further on the rearward side than the above described print head 10 and the feeding roller 11 (refer to FIG. 2, and the like), and disposing the ribbon take-up roll R5 further on the frontward side than the print head 10 and the feeding roller 11 (refer to FIG. 2, and the like).

Figure 4:
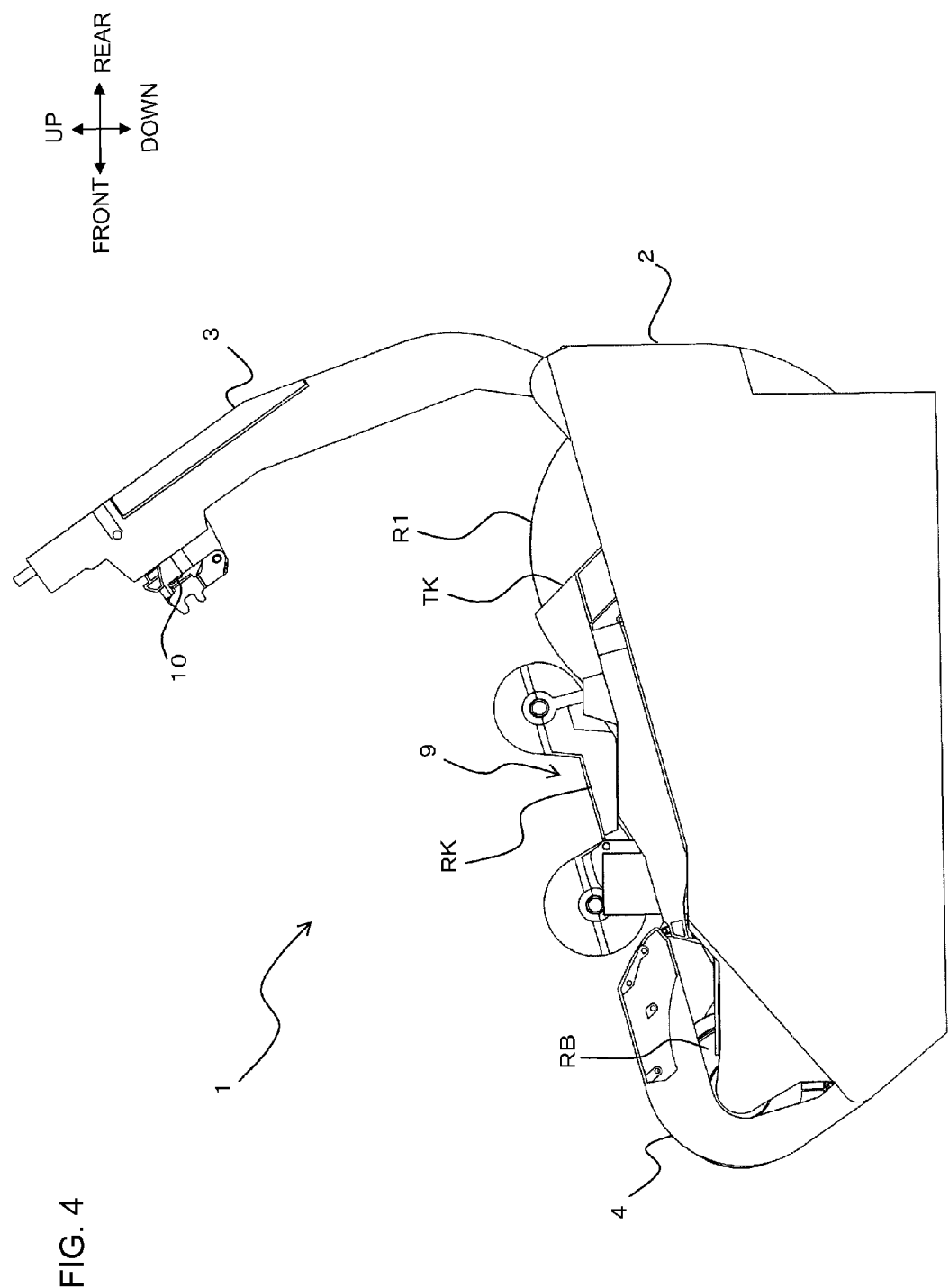
FIG. 4 is a right side view showing the outer appearance of the adhesive tape printer with only the first opening/closing cover open.

Then, the ink ribbon IB fed out from the ribbon supply roll R4 (that rotates in direction D in FIG. 2) contacts the area below the print head 10 of the print head 10 and the feeding roller 11 disposed vertically facing each other. After the ink of the ink ribbon IB is transferred to the base layer 153 of the fed print-receiving adhesive tape 150 by the heat from the print head 10 to execute print formation, the used ink ribbon IB is taken up on the ribbon take-up roll R5 (that rotates in direction E in FIG. 2). Note that the ribbon cartridge RK is attachable and detachable with respect to the above described second predetermined position 9 by setting the first opening/closing cover 3 in an open state with the second opening/closing cover 4 closed as is, as shown in FIG. 4.

The second storage part 6 receives a second roll R2 from above, storing the second roll R2. The second roll R2 winds a tape 150" from which the separation material layer 151 has been peeled by the aforementioned adhesive tape 150' with print (that is, a tape that includes the adhesive layer 152 and the base layer 153; hereinafter suitably and simply referred to as the "adhesive tape 150" with print") around the above described axis O2 in the horizontal direction (specifically, the left-right direction). At this time, the housing 2 on the second opening/closing cover 4 side comprises a core member 45 (details described later) for forming the second roll R2. Then, the second roll R2 is rotatably supported inside the second storage part 6 with this core member 45 supported by a support bracket RB. That is, the second roll R2 is connected to a take-up motor M3 via a gear mechanism (not shown) and driven to execute take-up by the take-up motor M3. This take-up motor M3 is disposed below in the substantial middle between the second storage part 6 and the third storage part 7.

Figure 5:
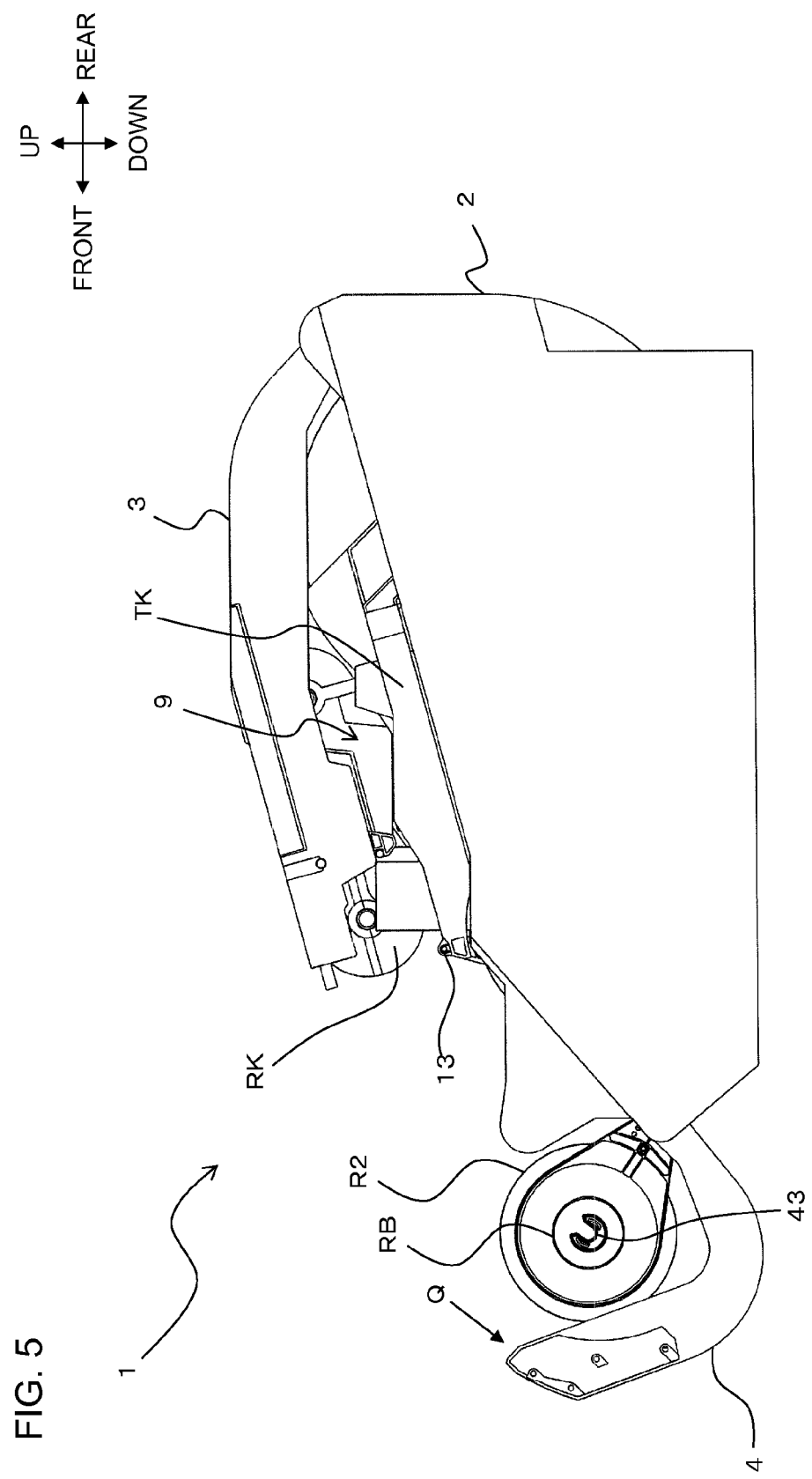
FIG. 5 is a right side view showing the outer appearance of the adhesive tape printer with only the second opening/closing cover open.

Further, at this time, the second opening/closing cover 4 is capable of opening and closing the area above the second storage part 6 by pivoting around a predetermined first pivot axis K1 disposed on the frontward side end of the housing 2. Specifically, the second opening/closing cover 4 is pivotable from a closed position where the second storage part 6 of the housing 2 is covered (the states in FIG. 1, FIG. 2, and FIG. 4) to an open position where the second storage part 6 is exposed (the states in FIG. 5 and FIG. 6). The second roll R2, as shown in FIG. 5, is attachable and detachable with respect to the second storage part 6 by setting the second opening/closing cover 4 in an open state with the first opening/closing cover 3 closed as is.

With the mounting of the above described adhesive tape cartridge TK, the third storage part 7 receives the above described third roll R3 from above, storing the third roll R3. The third roll R3 winds the separation material layer 151 separated from the aforementioned adhesive tape 150" with print and peeled from the adhesive tape 150' with print, around the above described axis O3 in the horizontal direction (specifically, the left-right direction). The third roll R3 is connected to a take-up motor M2 for driving the take-up of the third roll R3 via a gear mechanism (not shown). The take-up motor M2 is disposed below the above described feeding motor M1.

Figure 7:
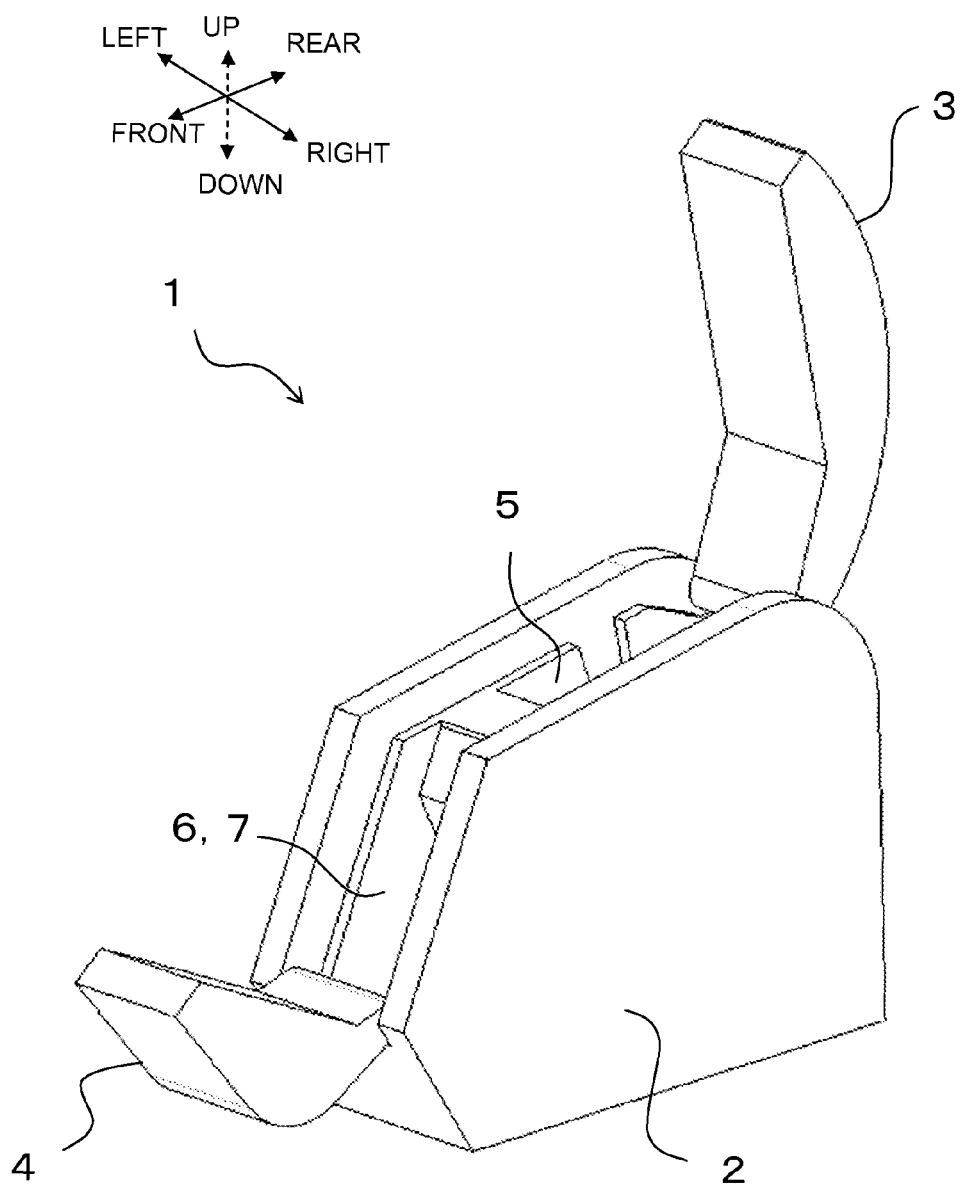
FIG. 7 is a perspective view showing a state with the housing included in the adhesive tape printer extracted and the first opening/closing cover and the second opening/closing cover open.
Figure 8:
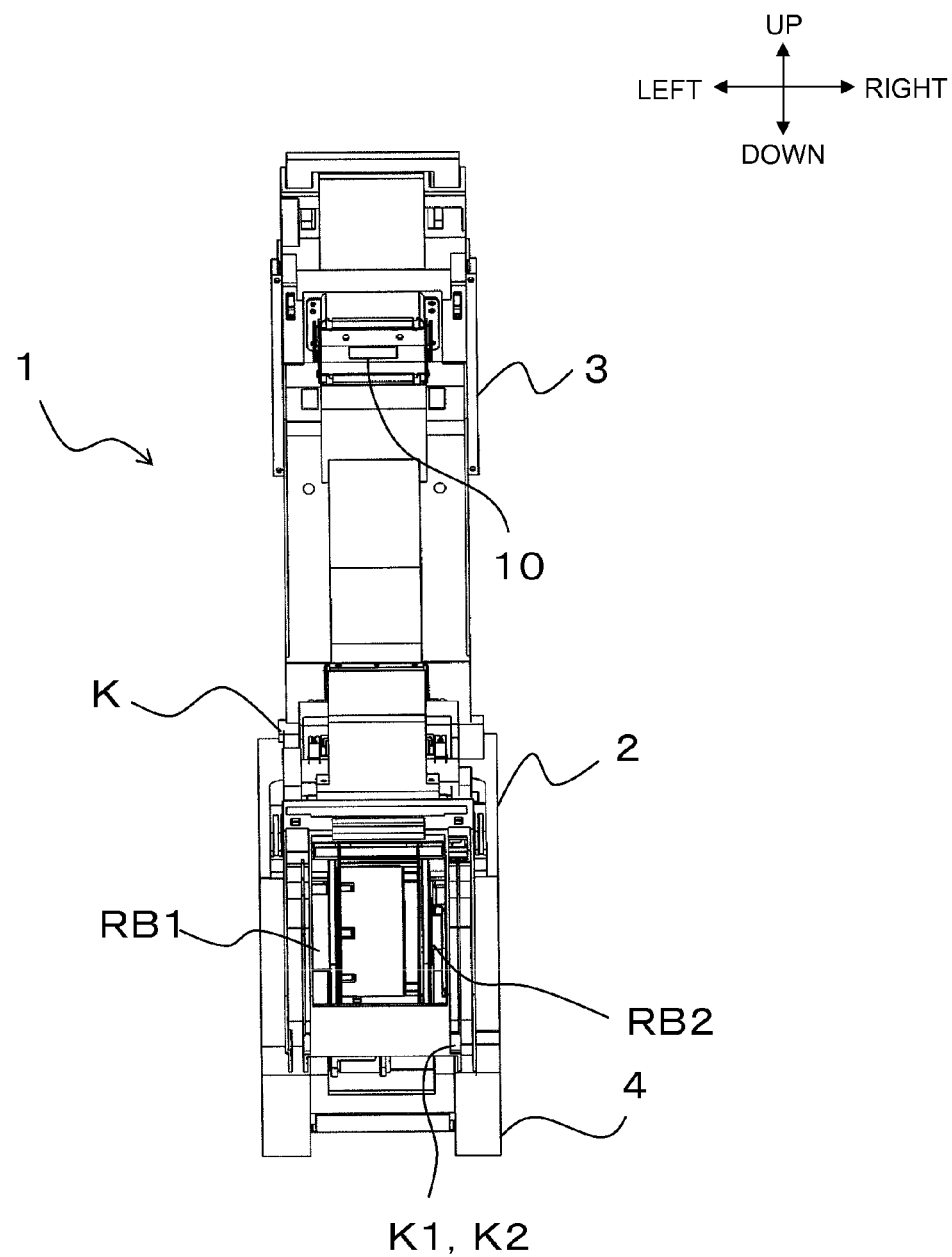
FIG. 8 is an arrow view of the adhesive tape printer with the adhesive tape cartridge and the ribbon cartridge removed, from direction P in FIG. 6.

Note that the housing 2 is in the shape of a box with a narrow width, as shown in FIG. 7. That is, the housing 2 comprises a long dimension in the front-rear direction, substantially corresponding to the overall diameter of each of the above described first roll R1, second roll R2, and third roll R3. On the other hand, the housing 2 comprises a short dimension in the left-right direction, substantially corresponding to the width of the above described print-receiving adhesive tape 150, adhesive tape 150' with print, and the like.

Figure 6:
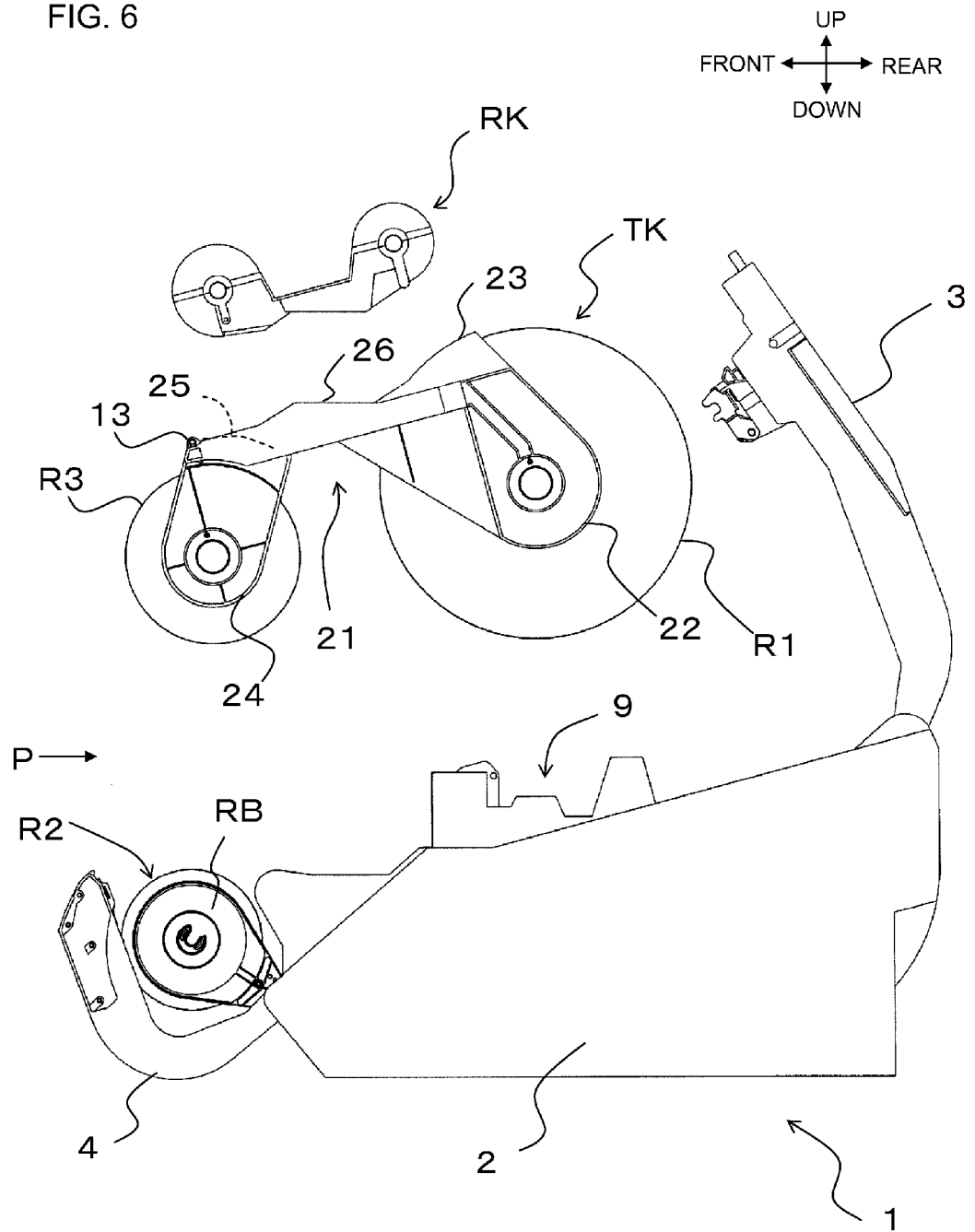
FIG. 6 is an exploded side view showing the adhesive tape printer with the first opening/closing cover and the second opening/closing cover open and the adhesive tape cartridge and ribbon cartridge removed.

Then, as shown in FIG. 1, with the first opening/closing cover 3 and the second opening/closing cover 4 closed, the first roll R1, the second roll R2, and the third roll R3 respectively stored in the first storage part 5, the second storage part 6, and the third storage part 7 are covered by the first opening/closing cover 3 and the second opening/closing cover 4 from above. On the other hand, as shown in FIG. 6, with the first opening/closing cover 3 and the second opening/closing cover 4 open, the first storage part 5, the second storage part 6, and the third storage part 7 are all exposed.

Further, a cutter mechanism 14 for cutting the adhesive tape 150" with print after the separation material layer 151 has been peeled is disposed in an area that is further on the rearward side than the second roll R2 of the second opening/closing cover 4 when the second opening/closing cover 4 is closed.

Hence, the first roll R1, the second roll R2, and the third roll R3 are respectively wound around the axes O1, O2, O3 in the substantial horizontal direction, as described above. At this time, when the tape is cut by the cutter mechanism 14, a tensile force of a certain degree is preferably applied to the adhesive tapes 152, 153 with print subject to cutting, stretching the tape surface tight. Here, according to this embodiment, the height direction position of the axis O2 of the second roll R2 supported by the support bracket RB disposed inside the second storage part 6 below the second opening/closing cover 4 in a closed state is configured to be higher than a height direction position of the axis O3 of the third roll R3 that winds the separation material layer 151 inside the third storage part 7 of the adhesive tape cartridge TK mounted to the first predetermined position 8 below the first opening/closing cover 3 in a closed state, by an amount equivalent to a distance h (refer to FIG. 2).

Summary of Apparatus Operation

In the above described configuration, when the print-receiving adhesive tape 150 fed out from the first roll R1 (rotating in direction A in FIG. 2, FIG. 3, and FIG. 11 described later) stored in the first storage part 5 with the first opening/closing cover 3 and the second opening/closing cover 4 closed is fed to the frontward side by the feeding roller 11, preferred print is formed on the base layer 153 of the fed print-receiving adhesive tape 150 by the print head 10, forming the adhesive tape 150' with print. Subsequently, the adhesive tape 150' with print is further fed to the frontward side, and the separation material layer 151 is peeled at a peeling part 13. The third roll R3 (that rotates in direction C in FIG. 2, FIG. 3, and FIG. 11 described later) is formed inside the third storage part 7 by the peeled separation material layer 151.

On the other hand, the adhesive tape 150" with print from which the separation material layer 151 has been peeled is further fed to the frontward side, introduced to the second storage part 6, and wound inside the second storage part 6, forming the second roll R2 (that rotates in direction B in FIG. 2). At that time, the cutter mechanism 14 is disposed further on the rearward side than the second roll R2, that is, on the upstream side along the transport path, and this cutter mechanism 14 cuts the adhesive tape 150" with print on which print has been formed and from which the separation material layer 151 has been peeled. With this arrangement, the adhesive tape 150" with print wound around the second roll R2 can be cut based on a timing preferred by the user and the second roll R2 can be removed from the second storage part 6 after cutting.

Detailed Structure of Each Part

Next, the detailed structure of each part of the adhesive tape printer 1 with a general configuration such as described above will be described in order.

Detailed Structure of Adhesive Tape Cartridge

As shown in the above described FIG. 6, FIG. 8, and FIGS. 9-11, the adhesive tape cartridge TK comprises a connecting arm 21 with a cross-sectional shape that is substantially box-like with an open left side. The above described first roll R1 and the third roll R3 are connected by the above described connecting arm 21. The connecting arm 21 freely rotatably supports the first roll R1 on the rearward side, and freely rotatably supports the third roll R3 on the frontward side. Further, the connecting arm 21 comprises a pair of left and right first bracket parts 22, 22 (only the first bracket part 22 on the right side is shown in FIG. 6) on the rearward side, and a pair of left and right second bracket parts 24, 24 (only the second bracket part 24 on the right side is shown in FIG. 6) on the frontward side.

The first bracket parts 22, 22 sandwich the first roll R1 from both the left and right sides, rotatably holding it around the axis O1. These first bracket parts 22, 22 are connected by a first connecting part 23 that is extended in the substantially horizontal direction on the upper end.

The second bracket parts 24, 24 sandwich the third roll R3 from both the left and right sides, rotatably holding it around the axis O3. These second bracket parts 24, 24 are connected by a second connecting part 25 that is extended in the substantially horizontal direction on the upper end.

Then, the above described first bracket parts 22, 22 and the above described first connecting part 23 on the rearward side, and the above described second bracket parts 24, 24 and the above described second connecting part 25 on the frontward side are connected by a pair of left and right roll connecting beam parts 26, 26.

Further, a pair of left and right guide parts 27 is disposed in an area of the above described connecting arm 21 that is in the middle of the first roll R1 and the third roll R3 along the tape transport path (the first connecting part 23 in this example) so as to protrude downward from the first connecting part 23 (refer to FIG. 10). The guide parts 27 cause the print-receiving adhesive tape 150 (refer to the imaginary lines in FIG. 10) fed out from the first roll R1 to pass in a tape posture in which the tape width direction is in the left-right direction, and substantially contact both ends in the tape width direction during the passing, guiding the tape width direction.

Peeling Part

Figure 3:
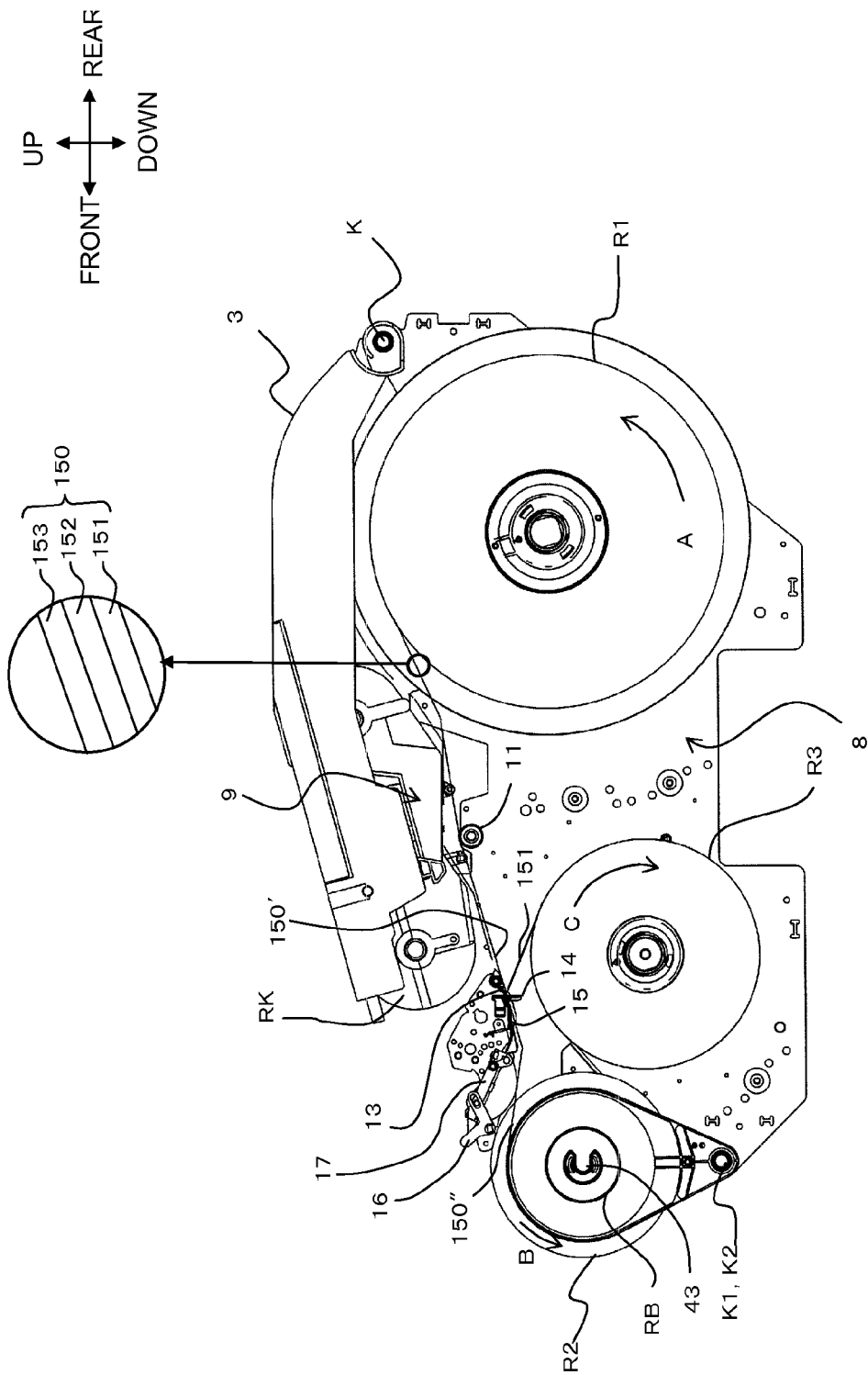
FIG. 3 is an explanatory view showing the tape transport path of the adhesive tape printer.
Figure 9:
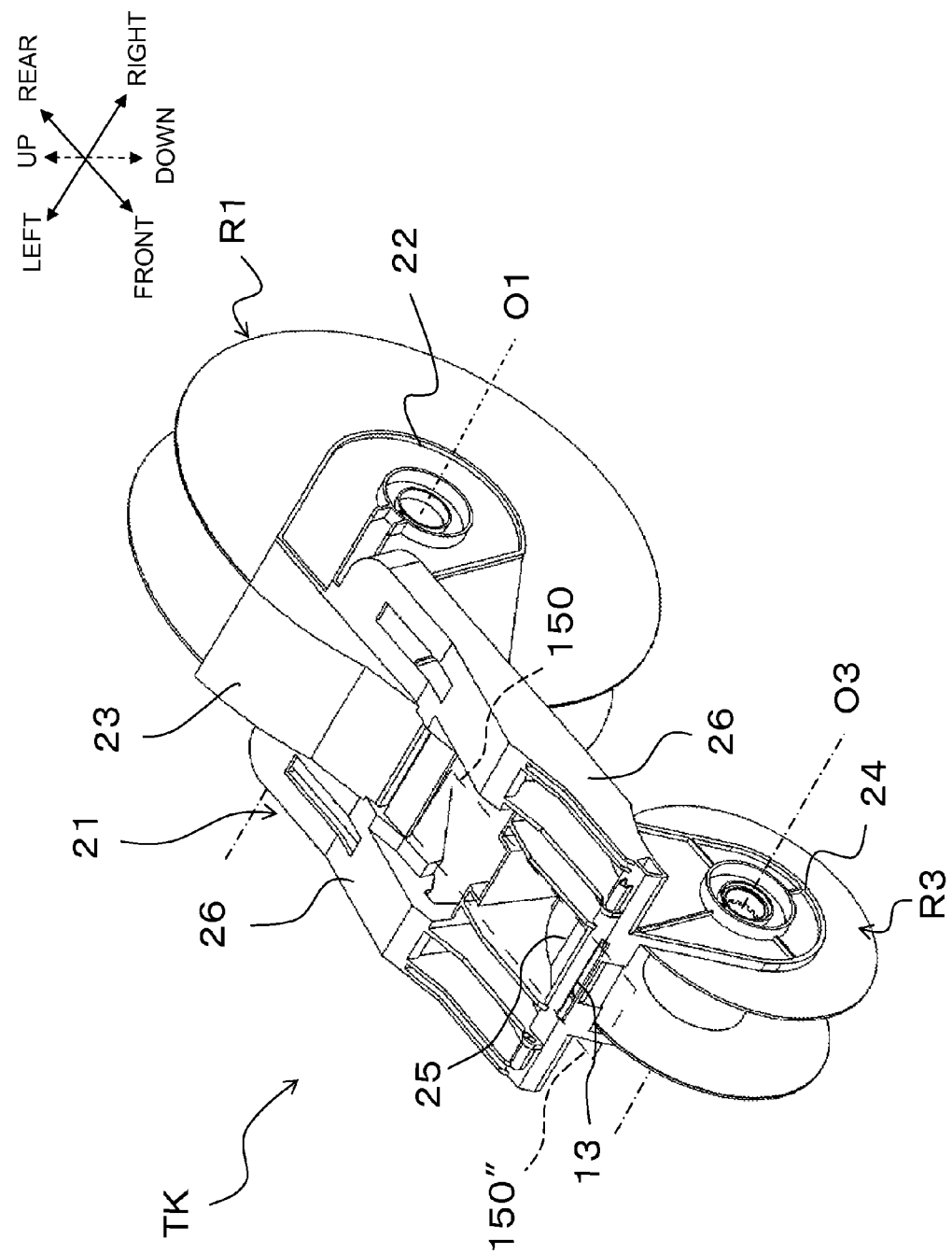
FIG. 9 is a perspective view showing the overall configuration of the adhesive tape cartridge according to embodiment 1 of the present disclosure.

Further, the connecting arm 21, as shown in FIG. 9 and FIG. 11, comprises the peeling part 13 that includes a horizontal slit shape, for example, further on the downstream side along the tape transport path than the above described guide parts 27 (refer to FIG. 2, FIG. 3, and the like, as well). The peeling part 13 peels the separation material layer 151 from the print-receiving adhesive tape 150 fed out from the first roll R1 and fed to the frontward side along a predetermined middle transport path FP (the transport path from the roll feed-out position to the peeling part 13; refer to FIG. 12A described later).

At this time, as shown in FIG. 11, in the adhesive tape cartridge TK, the first roll R1 feeds out the print-receiving adhesive tape 150 from an outer circumferential part while rotating in the counterclockwise direction (direction A), as viewed from the right side. On the other hand, the third roll R3 brings in and takes up the separation material layer 151 peeled by the peeling part 13 on a roll outer circumferential part in an orientation substantially opposite (substantially downward toward the right in FIG. 12A) the transport direction (leftward in FIG. 12A) of the print-receiving adhesive tape 150 fed out and fed from the first roll R1, while rotating in the clockwise direction (direction C) as viewed from the above described right side. As a result, an angle θ (refer to FIG. 11) at which the separation material layer 151 bends when peeled from the print-receiving adhesive tape 150 fed to the frontward side by the peeling part 13 is an acute angle.

Figure 12A:
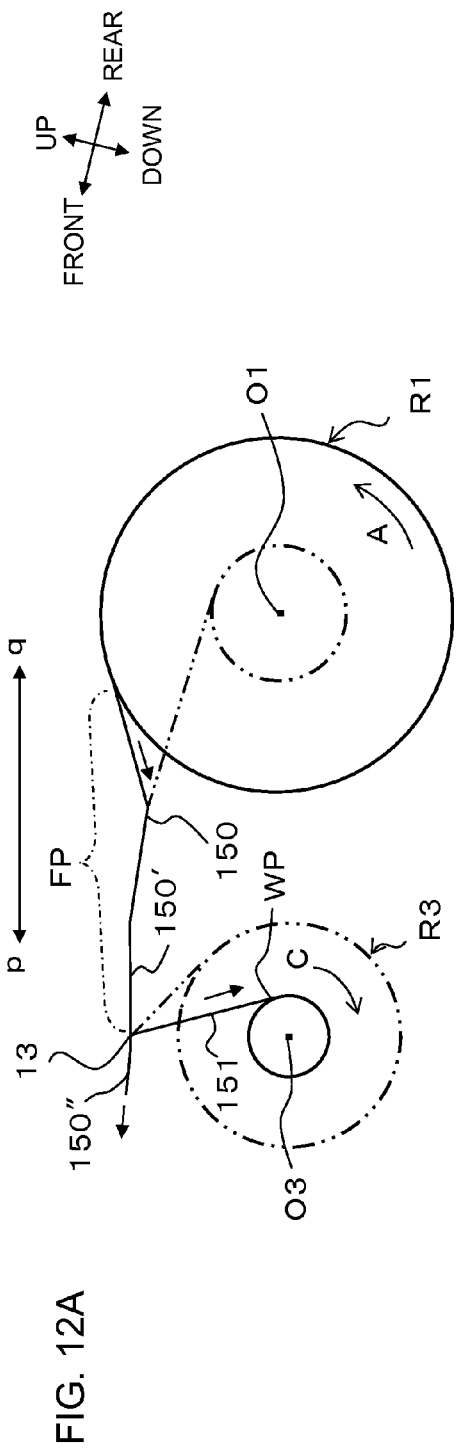
FIG. 12A is an explanatory view showing the behavior of each roll of the adhesive tape cartridge, in the rotating direction and on the tape transport path.

Further, at this time, as shown in FIG. 12A, the position of the peeling part 13 along the tape transport direction (the direction of arrow p-q in FIG. 12) on the above described middle transport path FP is disposed so that it is further on one side (the left side in FIG. 12A) than a take-up position WP in the above described predetermined direction (the direction of arrow p-q in FIG. 12) when the third roll R3 is in a minimum outer diameter state (the states of the solid lines in the above described FIG. 12, FIG. 2, and FIG. 11), at least. Hence, the take-up position WP is the position where the separation material layer 151 is brought onto the outer diameter of the third roll R3, merging with the layered structure. Further, the above described one side in the predetermined direction is, in other words, the downstream side of the middle transport path FP along the transport direction.

Note that, as described above, in FIG. 2, FIG. 11, and FIG. 12, the state in which the print-receiving adhesive tape 150 of the first roll R1 of the adhesive tape cartridge TK is not consumed and the separation material layer 151 is not yet wound on the third roll R3 (initial state) is indicated by the solid lines. Then, the state in which the print-receiving adhesive tape 150 of the first roll R1 is consumed to a certain degree and the separation material layer 151 is wound around the third roll R3 by the above described feeding and print formation is indicated by the imaginary lines.

Detailed Structure of Cutter Mechanism

Figure 13:
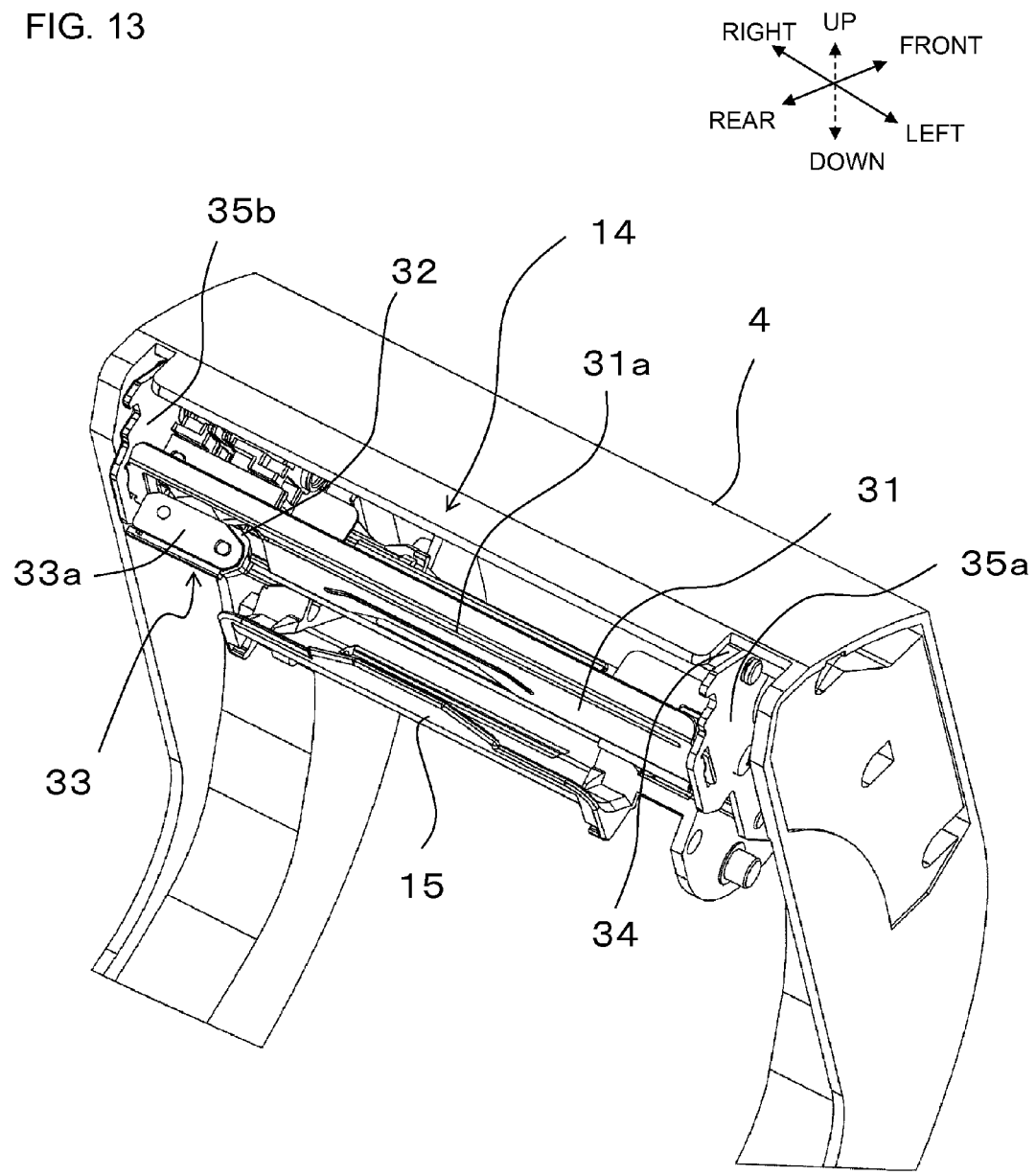
FIG. 13 is a perspective view showing the cutter mechanism provided on the second opening/closing cover (with the shoot in the downward position).
Figure 14:
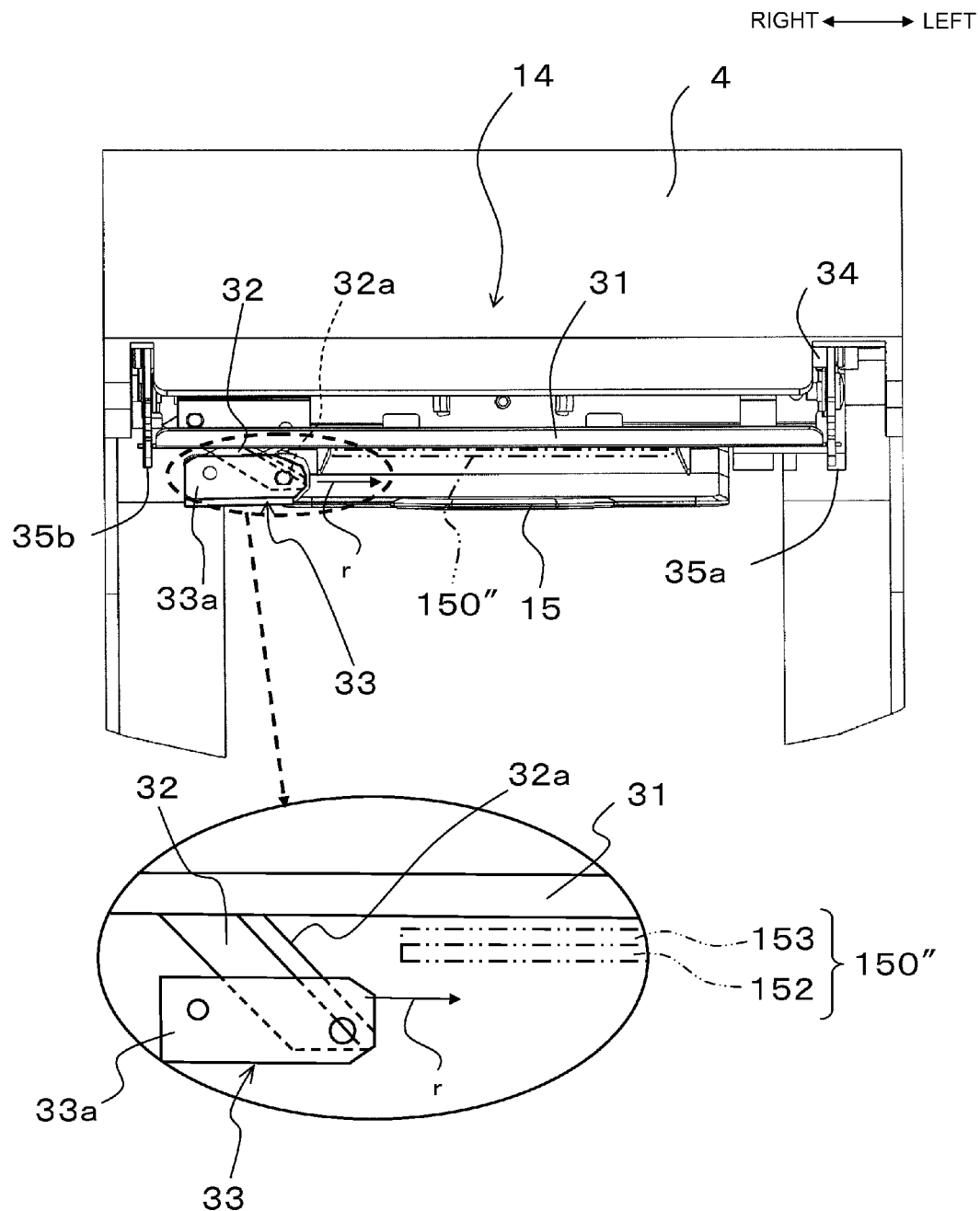
FIG. 14 is an arrow view showing the cutter mechanism, as viewed from direction Q in FIG. 5.
Figure 15:
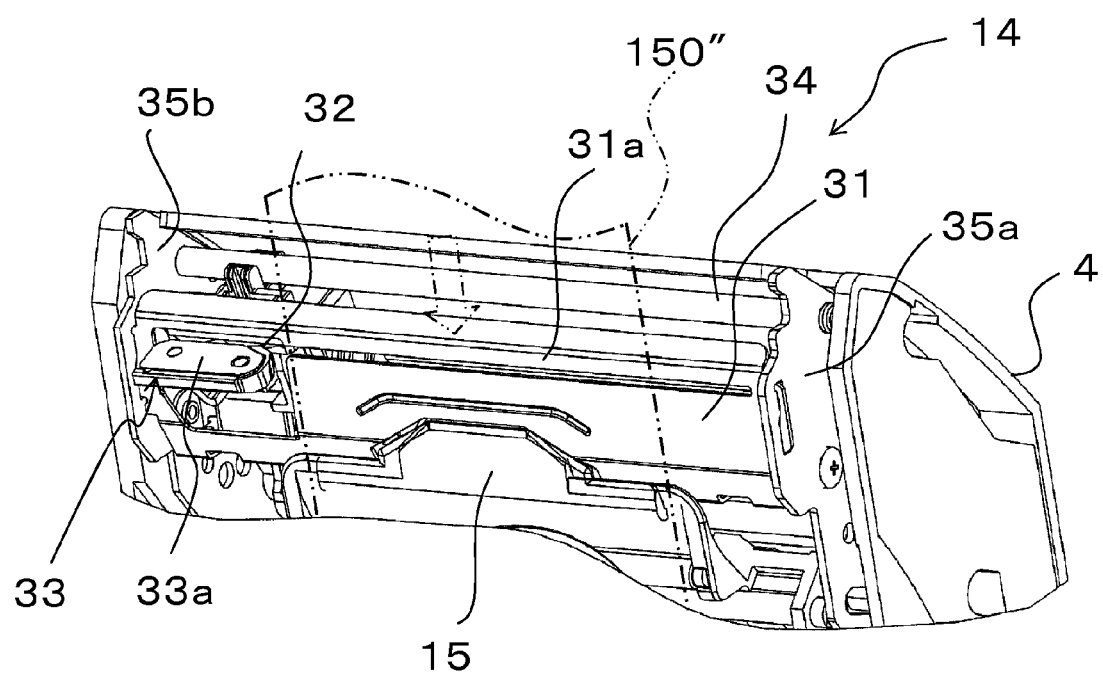
FIG. 15 is an enlarged perspective view of the main section in FIG. 13 (with the shoot in the upward position).

As shown in FIG. 13, FIG. 14, and FIG. 15, the cutter mechanism 14 comprises a guide plate 31, a movable blade 32, a carriage 33 comprising a movable blade support part 33a that supports the movable blade 32, and a guide rail 34.

The guide plate 31 is extended along the tape-width direction on the inside of the releasing edge side of the second opening/closing cover 4, further on the downstream side in the tape transport direction than the feeding roller 11. This guide plate 31 is supported by a pair of left and right support plates 35a, 35b with respect to the second opening/closing cover 4. Then, the guide plate 31 contacts the upper surface of the adhesive tape 150" with print (in other words, the upper surface of the base layer 153) fed by the feeding roller 11 inside the above described housing 2 in a posture in which the tape-width direction is in the left-right direction, and guides the adhesive tape 150" with print (refer to the imaginary lines in FIG. 14 and FIG. 15).

The above described movable blade 32 is disposed below the guide plate 31 so that a blade edge 32a faces the guide plate 31 in the up-down direction (so that the blade edge 32a points upward in this example). The movable blade 32 is guided by the guide rail 34, traveling in the tape width direction along the guide plate 31 by the above described freely traveling carriage 33, and performs cutting (refer to arrow r in FIG. 14). The above described guide rail 34 is supported by the above described pair of left and right support plates 35a, 35b with respect to the second opening/closing cover 4.

The movable blade 32 advances from the adhesive layer 152 of the lowermost layer toward the adhesive tape 150" with print, while sandwiching the adhesive tape 150" with print with the guide plate 31 by the above described travel of the carriage 33 along the guide rail 34, performing the above described cutting. At that time, the above described movable blade support part 33a supports the carriage 33 so that the movable blade 32 slopes toward the above described travel direction along the tape width, in a way that causes the blade edge 32a (refer to FIG. 14) of the movable blade 32 to press the adhesive tape 150" with print toward the guide plate 31 direction (so that it slopes downward in this example). With this arrangement, the adhesive tape 150" with print is cut in the width direction by the advancing and cutting by the blade edge 32a of the downward disposed, obliquely upward pointing movable blade 32 from the adhesive layer 152 of the lowermost layer, while the upper surface (specifically, the upper surface of the base layer 153 after print formation by the print head 10) is contacted and guided by the guide plate 31. At this time, a slit 31a is disposed on the guide plate 31 in the tape-width direction, for guiding the travel of the movable blade 32 by the carriage 33.

Note that a shoot 15 for switching the transport path of the adhesive tape 150" with print between a side toward the second roll R2 and a side toward a discharging exit 12 is disposed further on the downstream side than the guide plate 31 along the tape transport direction (the function of this shoot 15 will be described later).

Detailed Structure of Support Bracket

Figure 16:
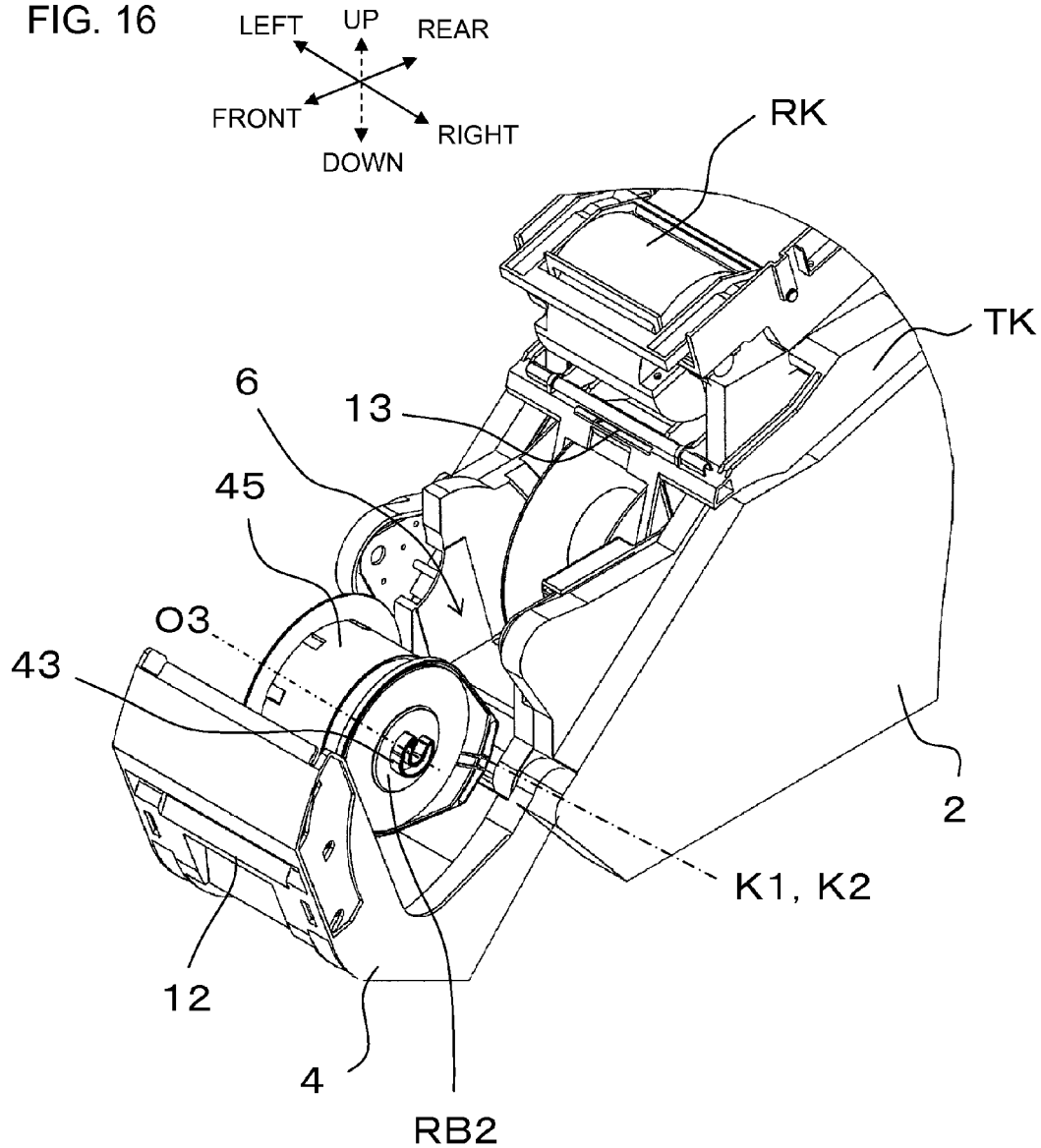
FIG. 16 is a perspective view showing the state in which the second opening/closing cover is open and the support bracket of the second roll is pivoted frontward.
Figure 18:
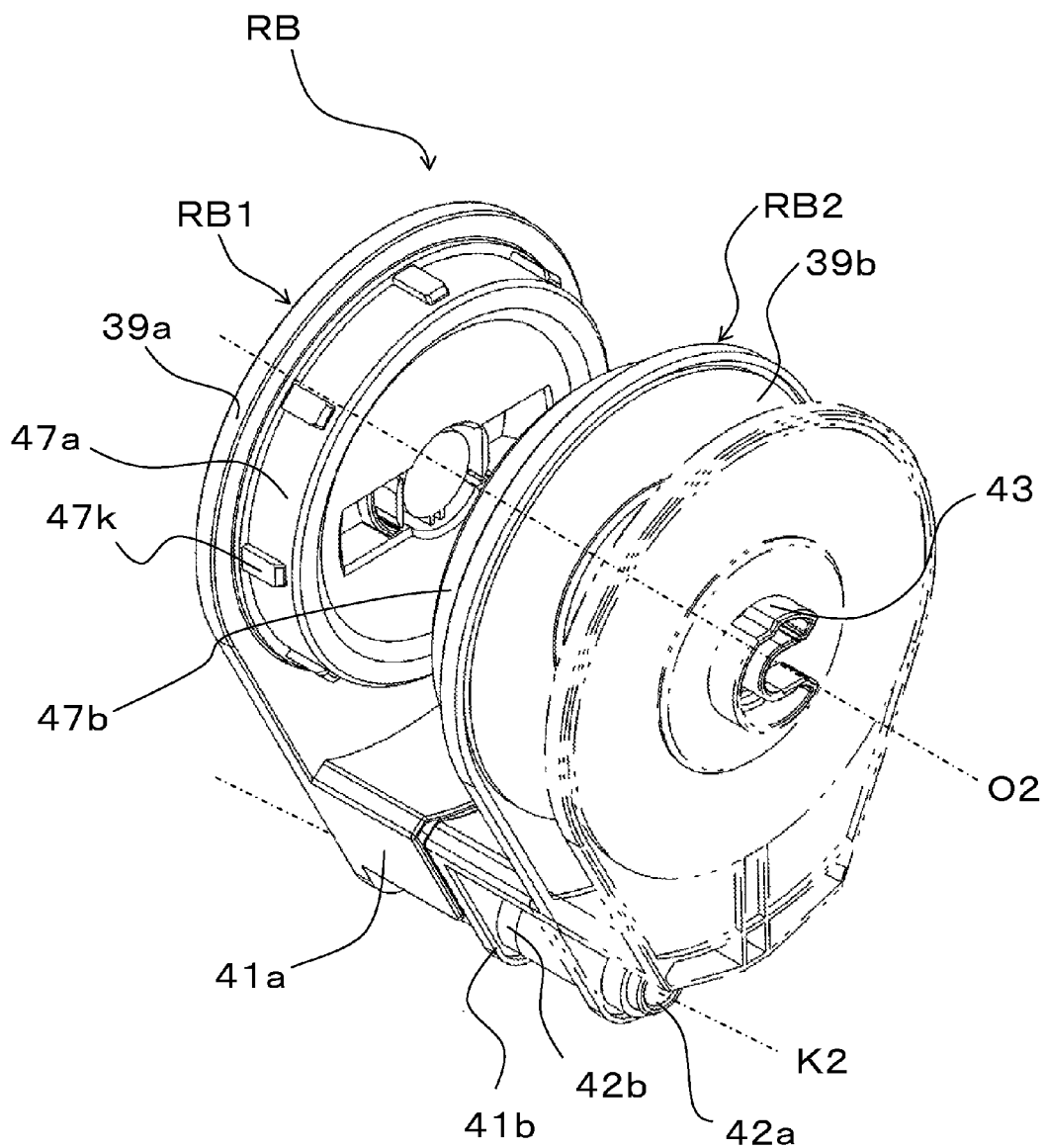
FIG. 18 is a perspective view showing the detailed structure of the support bracket of the second roll.

In FIG. 16, FIG. 17, and FIG. 18, as already described, the second opening/closing cover 4 is rotatable from the above described closed position where the second storage part 6 of the housing 2 is covered to the above described open position where the second storage part 6 is exposed, around the predetermined first pivot axis K1 disposed on the frontward side of the housing 2. At this time, the support bracket RB rotatably supports the above described second roll R2 around the predetermined second pivot axis K2 positioned on the frontward side of the housing 2. The second roll R2, as described above, is generated with the winding of the adhesive tape 150″ with print after print has been formed on the base layer 153 by the print head 10 and the separation material layer 151 has been peeled (or the adhesive tape 150′ with print that includes the separation material layer 151) in the frontward side interior of the housing 2.

That is, the support bracket RB is pivotably configured from a use position (the position shown in FIG. 1, FIG. 2, FIG. 3, FIG. 4 and FIG. 17, for example) where it is positioned on the closed direction side of the above described second opening/closing cover 4 and the second roll R2 is not attachable or detachable, to a removal position (the position shown in FIG. 5, FIG. 6, and FIG. 16, for example) where it is positioned on the open direction side of the second opening/closing cover 4 and the second roll R2 is attachable and detachable, around the above described second pivot axis K2. Note that, in this example, the second pivot axis K2 is in the same position as the first pivot axis K1 described above (that is, a common axis).

Then, the support bracket RB, as shown in FIG. 18, comprises a second bracket RB2 and a first bracket RB1, which are disposed facing each other so that the second roll R2 is sandwiched on both sides of the second roll R2 along the axis O2 direction. That is, the first bracket RB1 and the second bracket RB2 respectively comprise substantially circular shaped circular parts 39a, 39b and base parts 41a, 41b that bulge from the circular parts 39a, 39b in the radial direction.

The dimension of the base part 41a of the first bracket RB1 along the above described second pivot axis K2 direction is larger than the base part 41b of the second bracket RB2. Then, a cylindrical-shaped guide protrusion 42a protrudes along the above described second pivot axis K2 direction on the inside of the base part 41a (the side of the second bracket RB2 facing the base part 41b; the lower right side in FIG. 18). Further, a substantially annular rotating part 47a is mounted rotatably around the axis O2 (refer to FIG. 16 and FIG. 18) of the second roll R2 via a bearing (not shown) to the inside (the lower right side in FIG. 18) of the circular part 39a of the first bracket RB1. A plurality of protrusions 47k that protrude in the radial direction is disposed on the outer circumferential surface of the rotating part 47a.

The base part 41b of the second bracket RB2 is bent in a substantial L shape corresponding to the structure of the first bracket RB1 such as described above (refer to FIG. 18). A cylindrical-shaped guide tube 42b protrudes along the second pivot axis K2 direction on the outside of the base part 41b (the side opposite the side facing the base part 41a; the lower right side in FIG. 18). Then, the guide protrusion 42a of the above described first bracket RB1 is slidably inserted into the guide tube 42b of the above described second bracket RB2. Note that the guide tube 42b and the guide protrusion 42a are each mounted to a hinge (not shown; with the above described second pivot axis K2 as the pivot center) attached to the housing 2. Further, a substantially annular rotating part 47b equivalent to the above described rotating part 47a is mounted rotatably around the above described axis O2 via a bearing (not shown) to the inside (the upper left side in FIG. 18) of the circular part 39b of the second bracket RB2.

With the above described structure, when the second roll R2 is in the above described removal position (refer to FIG. 16 and the like), the first bracket RB1 and the second bracket RB2 can be moved relatively close to or away from each other along the above described axis O2 direction by sliding the guide tube 42b inwardly and outwardly along the guide protrusion 42a. FIG. 18 shows a mode where the second bracket RB2 is moved close to and away from the first bracket RB1, with the state where the second bracket RB2 has been moved close to the first bracket RB1 indicated by the solid lines, and the state where the second bracket RB2 has been moved away from the first bracket RB1 indicated by the imaginary lines. On the other hand, when the second roll R2 is in the above described use position (refer to FIG. 17 and the like), the first bracket RB1 and the second bracket RB2 are in the above described close state and stored inside the second storage part 6 with a narrow width as described above, and cannot be moved close to or away from each other along the above described axis O2 direction of the second roll R2.

Further, a substantially C-ring shaped fitting groove 43 is disposed on the center of the above described circular parts 39a, 39b of the first bracket RB1 and the second bracket RB2 in the radial direction. In the above described use position (the position shown in FIG. 1, FIG. 2, FIG. 3, FIG. 4, and FIG. 17, for example), the above described fitting groove 43 fits together with a fitted shaft (not shown) disposed on the housing 2. Then, in this use position, a driven gear (not shown) disposed on the above described first bracket RB1 fits together with a drive transmitting gear disposed on the frontward side of the housing 2 (FIG. 17 shows this fitted state). The driven gear of this first bracket RB1 operates in coordination with the above described rotating part 47a by a connecting gear mechanism (not shown) disposed on the inside of the first bracket RB1. Further, the above described drive transmitting gear operates in coordination with an output shaft of the above described take-up motor M3 via a gear mechanism 44 (refer to FIG. 2) disposed near the second storage part 6 on the frontward side of the housing 2. As a result, in the above described use position, the driving force generated by the take-up motor M3 is transmitted to the above described rotating part 47a via the gear mechanism 44, the above described drive transmitting gear, and the driven gear, thereby rotationally driving the second roll R2 mounted to the above described rotating part 47a as described later. Accordingly, the first bracket RB1, in the above described use position, can transmit the driving force of the take-up motor M3 to the second roll R2.

Core Member

Hence, as described above, the above described second roll R2 is generated by the winding of the adhesive tape 150″ with print on the outer circumference side of the above described core member 45. Then, with the core member 45 rotatably supported with respect to the above described first bracket RB1 and the second bracket RB2, the second roll R2 is rotatable inside the second storage part 6. The following described the details thereof.

Figure 19A:
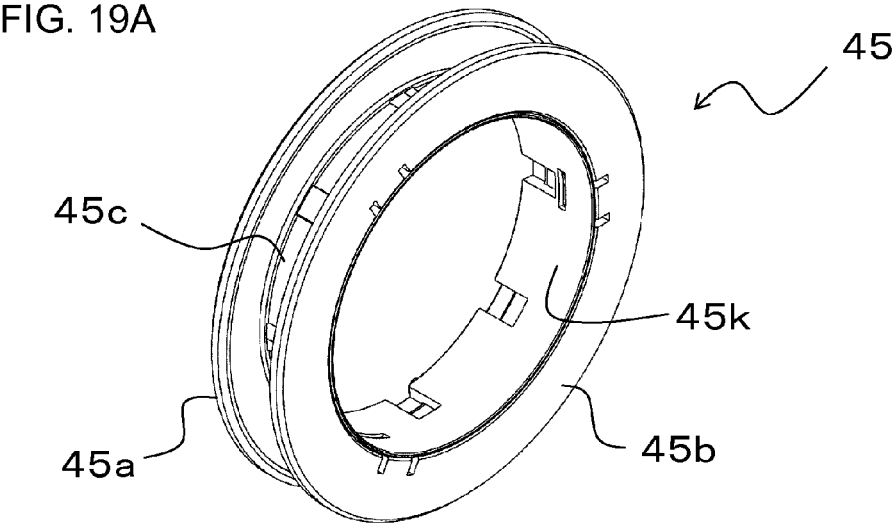
FIG. 19A is an outer appearance perspective view showing an example of the core member for generating the second roll.
Figure 19B:
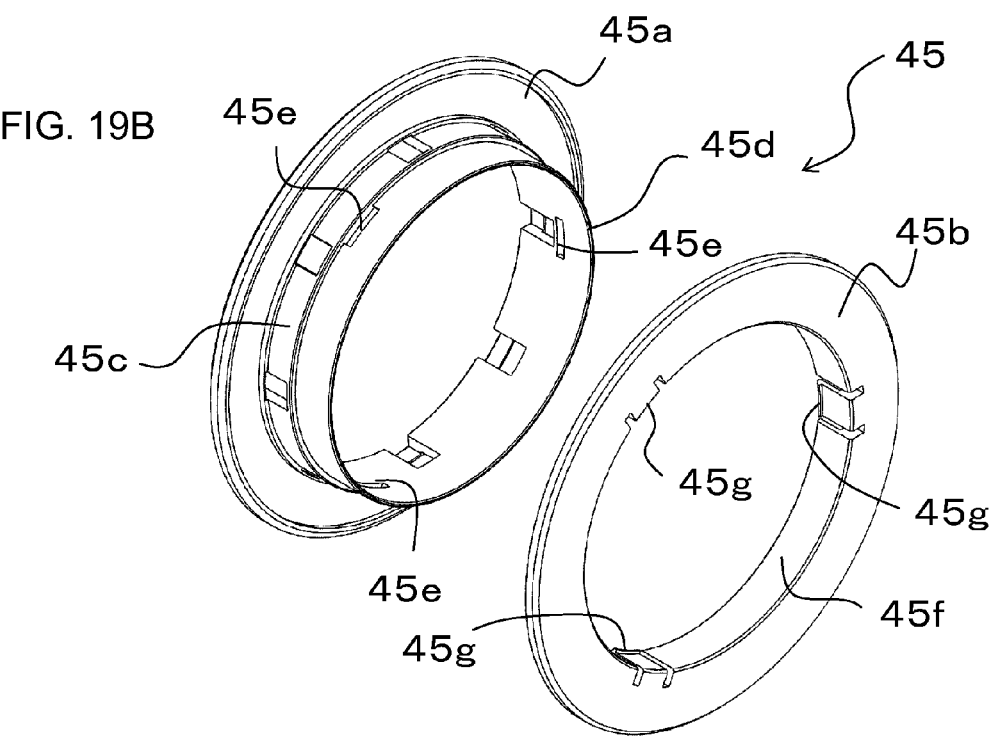
FIG. 19B is an exploded perspective view showing an example of the core member for generating the second roll.

In FIG. 19A and FIG. 19B, the core member 45 in this example is designed with a split structure, comprising a substantially annular flange 45a integrally formed with a cylindrical part 45c formed into a substantially cylindrical shape and one end side of the cylindrical part 45c in the axial direction (the upper left side in FIG. 19A), and a substantially annular flange 45b disposed on the other end side of the above described cylindrical part 45c in the axial direction (the lower right side in FIG. 19A).

The above described cylindrical part 45c is integrally formed on one flange 45a in this example. An extending part 45d with a slightly smaller diameter than the cylindrical part 45c is disposed on one side end of the cylindrical part 45c in the axial direction (the lower right side in FIG. 19). Further, a plurality (three in this example) of locking holes 45e is formed at equal intervals around the extending part 45d. An extending part 45f comprising an inner diameter that is the same as the outer diameter of the above described cylindrical part 45c and fits onto the outside of the above described extending part 45d is disposed from the inner circumference of the other flange 45b toward one side. A plurality (three in this example) of locking pieces 45g is formed at equal intervals correspondingly with the above described locking holes 45e around this extending part 45f.

Then, the extending part 45f is fitted onto the outside of the above described extending part 45d and the locking pieces 45g engage with the locking holes 45e, thereby forming the above described core member 45 in a bobbin (or drum) shape. Then, the core member 45 in the assembled state as shown in FIG. 19A is mounted to the outer circumference side of the rotating part 47a while an inner circumferential surface 45k of the above described cylindrical part 45c is made to closely contact the above described protrusion 47k of the rotating part 47a of the above described first bracket RB1. With this arrangement, in the above described use position, the driving force generated from the above described take-up motor M3 and transmitted to the above described rotating part 47a via the above described driven gear is transmitted to the second roll R2, rotationally driving the second roll R2. Note that, during the above described mounting, the end of the second roll R2 on the side opposite the first bracket RB1 contacts the above described rotating part 47b of the second bracket RB2. The above described rotating part 47b is freely rotatable with respect to the circular part 39b as described above, and rotates in a following manner along with the second roll R2 driven as described above.

Note that the width direction dimension of the above described cylindrical part 45c substantially corresponds to the width of the above described adhesive tape 150" with print. The example shown in the above described FIG. 17 is an example of a case where the width of the adhesive tape 150" with print is relatively large, and the example shown in FIG. 19 is an example of a case where the width of the adhesive tape 150" with print is relatively small.

Step-Shape of Core Member

According to this embodiment, it is also possible to further improve the take-up performance of the above described adhesive tape 150" with print by devising a transverse cross-sectional shape of the above described core member 45. The following describes an example of such the core member 45 with reference to FIG. 20 and FIG. 21.

In FIG. 20 and FIG. 21, the core member 45 in this example, similar to that described above, is supported by the support bracket RB and sequentially takes up and layers the adhesive tape 150" with print while rotating (refer to the arrow of the rotating direction in FIG. 21), thereby generating the above described second roll R2. At that time, as shown in FIG. 21A, for example, a side wall surface 61 with a flat circular plate shape is disposed on one side and the other side of the core member 45 in the axial direction, resulting in the possibility that, if the adhesive tape 150" with print is sequentially introduced to and layered in the space (comprising a width direction dimension that is substantially the same as the tape width) between these side wall surfaces 61, 61, the adhesive layer 152 may stick to the above described side wall surface 61 in a wide surface area of the contact range when the adhesive tape 150" with print shifts in position in the width direction prior to introduction, causing difficulties in subsequent tape take-up and, as a result, winding disruption.

Hence, in this example, as shown in FIG. 20A, FIG. 20B, and FIG. 21B, the side wall surface structure is not flat shaped as described above, but rather step-shaped. That is, in the core member 45 in this example, a pair of introduction wall parts 51, 51 is disposed facing each other on one side and the other side of the above described axis O2 in the axial direction (on the left side and the right side in FIG. 20A). Then, these introduction wall parts 51, 51 are formed with a space SP1 comprising a dimension w1 in the axial direction that corresponds to a tape width W of the adhesive tape 150" with print therebetween. With this arrangement, when the above described adhesive tape 150" with print subject to take-up is introduced from the outside of the core member 45 in the radial direction to the core member 45, it is possible to smoothly introduce the adhesive tape 150" with print while positioning and guiding it with high accuracy in the width direction.

Further, a pair of middle wall parts 52, 52 is disposed further on the inside in the radial direction than the pair of introduction wall parts 51, 51, facing each other on one side and the other side in the above described axial direction. These middle wall parts 52, 52 are formed by recessed parts 53, 53 that respectively cave in further on either end side in the axial direction (the left side or right side in FIG. 20A) than the introduction wall parts 51, 51, with a space SP2 comprising an axial direction dimension w2 (functioning as a tape relief width) wider than the above described dimension w1 therebetween.

Furthermore, an inner cylindrical surface 54 is disposed further on the inside in the radial direction than the above described pair of middle wall parts 52, 52, extending in an axial direction so as to connect the inside ends of the pair of middle wall parts 52, 52 in the radial direction. The inner cylindrical surface 54 is an area for sequentially affixing and winding the adhesive tape 150" with print introduced via the above described introduction wall part 51 and the above described middle wall part 52. The inner cylindrical surface 54 comprises a concave groove 55 of a dimension w3 in the axial direction that is substantially equal to the tape width W of the adhesive tape 150" with print. Note that an inner circumferential surface 54k that is on the side opposite the concave groove 55 of the inner cylindrical surface 54 fulfills the same function as the aforementioned inner circumferential surface 45k. That is, the core member 45 in this example is mounted to the outer circumference side of the rotating part 47a while the above described inner circumferential surface 54k is made to closely contact the above described protrusion 47k of the rotating part 47a of the aforementioned first bracket RB1.

Note that, as shown in FIG. 20B, the axial direction dimension of the above described middle wall part 52 inserted between the introduction wall part 51 and the inner cylindrical surface 54 (the concave groove 55) is larger than the axial direction dimension of the introduction wall part 51, and larger than the axial direction dimension of the inner cylindrical surface 54. Note that the size relationship of the above described axial direction dimensions w1, w2, w3 of the above described introduction wall part 51, the middle wall part 52, and the inner cylindrical surface 54, respectively, is w3 (≈W)<w1 and w1<w2.

As described above, in the core member 45 shown in FIG. 20A, FIG. 20B, and FIG. 21, the space SP2 of the dimension w2 wider than the space SP1 of the dimension w1 formed by the introduction wall parts 51, 51 is formed by the recessed parts 53, 53 of the middle wall parts 52, 52. With this arrangement, when the adhesive tape 150" with print introduced from the introduction wall part 51 is sequentially wound on the inner cylindrical surface 54 as described above, both ends of the adhesive tape 150" with print in the width direction are in a positional relationship where they respectively separate from the above described middle wall parts 52, 52, thereby making it difficult for sticking to occur by contact. Further, even if both ends of the adhesive tape 150" with print in the width direction were to make contact and stick, the area to which they would stick would mainly be the introduction wall part 51 only and not the above described middle wall parts 52, 52. Accordingly, compared to a case where the side wall surface 61 with the aforementioned flat, circular plate shape shown in FIG. 21A is disposed, the surface area of the sticking caused by contact is extremely small. As a result, even if sticking occurs, the sticking to the introduction wall part 51 is peeled once again by the subsequent rotation of the above described core member 45 (refer to the white arrow in FIG. 21B), making it possible to properly guide and affix the adhesive tape 150" with print to the inner cylindrical surface 54.

Note that the core member 45 in this example shown in FIG. 20A, FIG. 20B, and FIG. 21B differs from the one described above with reference to FIG. 19A and FIG. 19B, and does not necessarily require a divided structure. Nevertheless, the core member 45 may be combined with the divided structure shown in FIG. 19A and FIG. 19B.

Cartridge Release Processing Part

Hence, a release processing part for temporarily tacking (reseparably adhering) the adhesive tape 150" with print generated by the cut processing by the aforementioned cutter mechanism 14 is disposed on the aforementioned adhesive tape cartridge TK. This release processing part will now be described with reference to FIG. 22 and the like.

Figure 22:
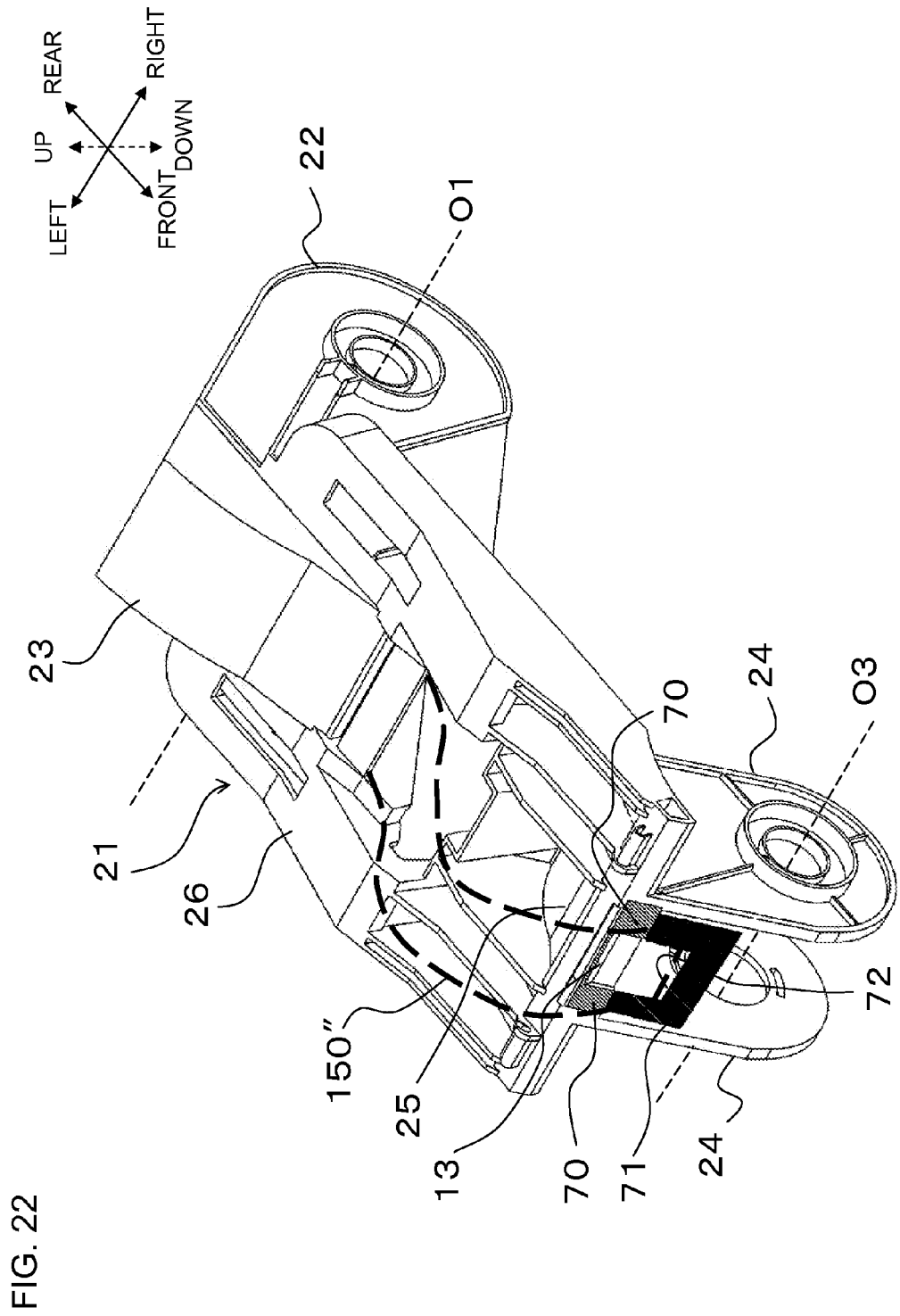
FIG. 22 is a perspective view showing the connecting arm extracted from the adhesive tape cartridge.
Figure 23:
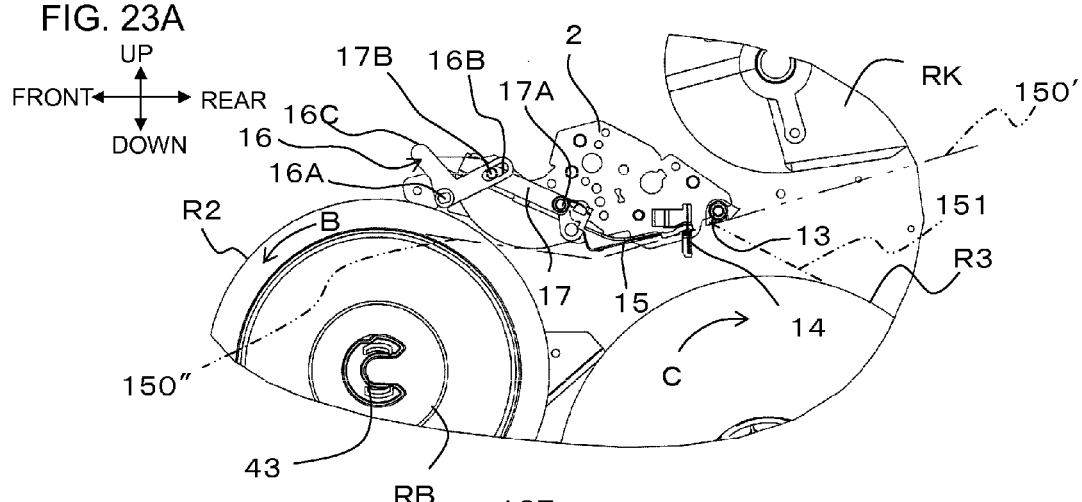
FIG. 23A is an explanatory view showing the behavior when the second roll is generated by the adhesive tape with print while the separation material layer is peeled, with the shoot switched to the first switching state.
FIG. 23B is an explanatory view showing the behavior when the second roll is generated by the adhesive tape with print without the separation material layer peeled, with the shoot switched to the first switching state.
FIG. 23C is an explanatory view showing the behavior when the adhesive tape with print is discharged in a tape state without the separation material layer peeled, with the shoot switched to the second switching position.
Figure 24:
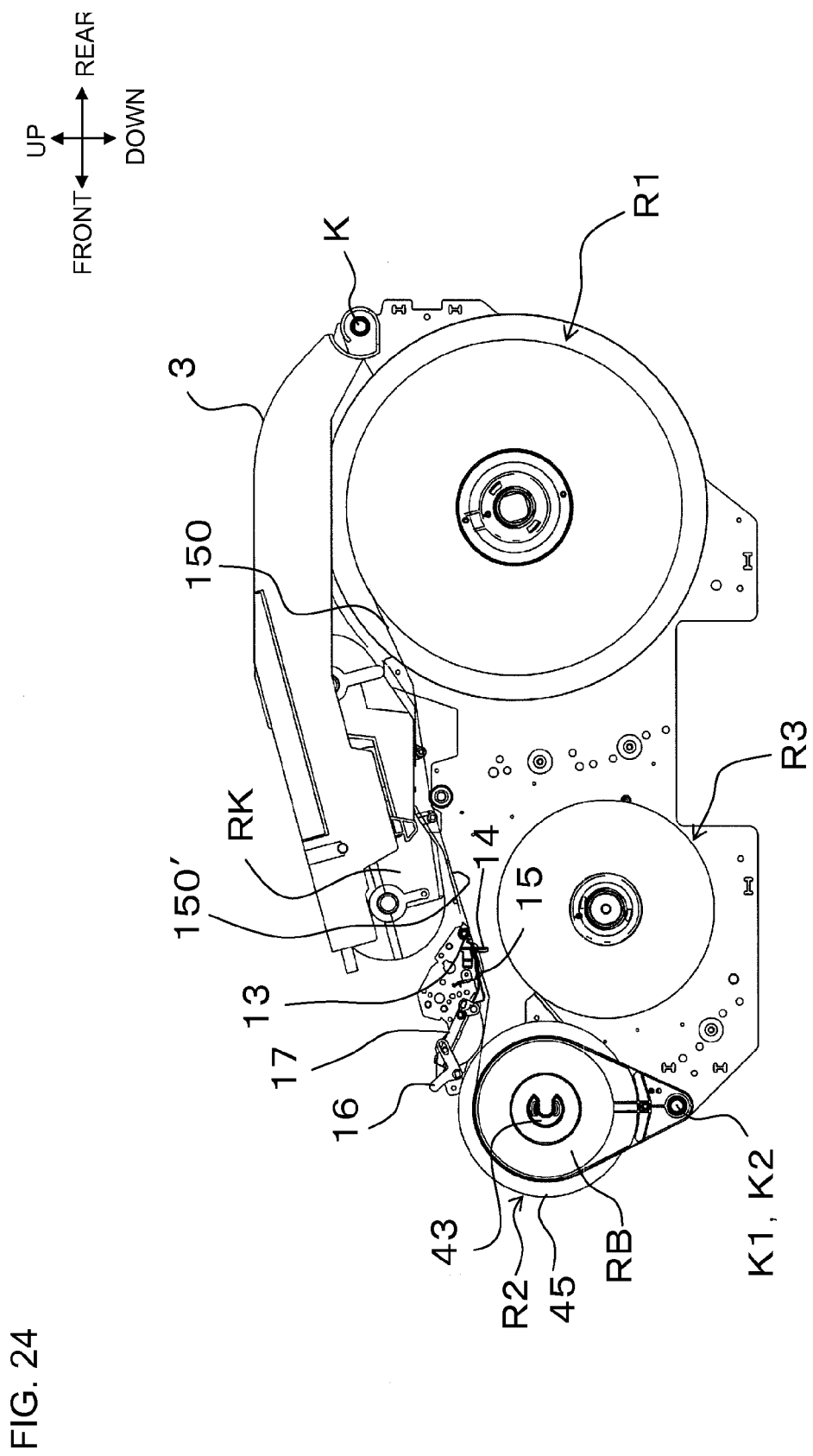
FIG. 24 is an explanatory view showing the tape transport path in the state shown in FIG. 23B.
Figure 25:
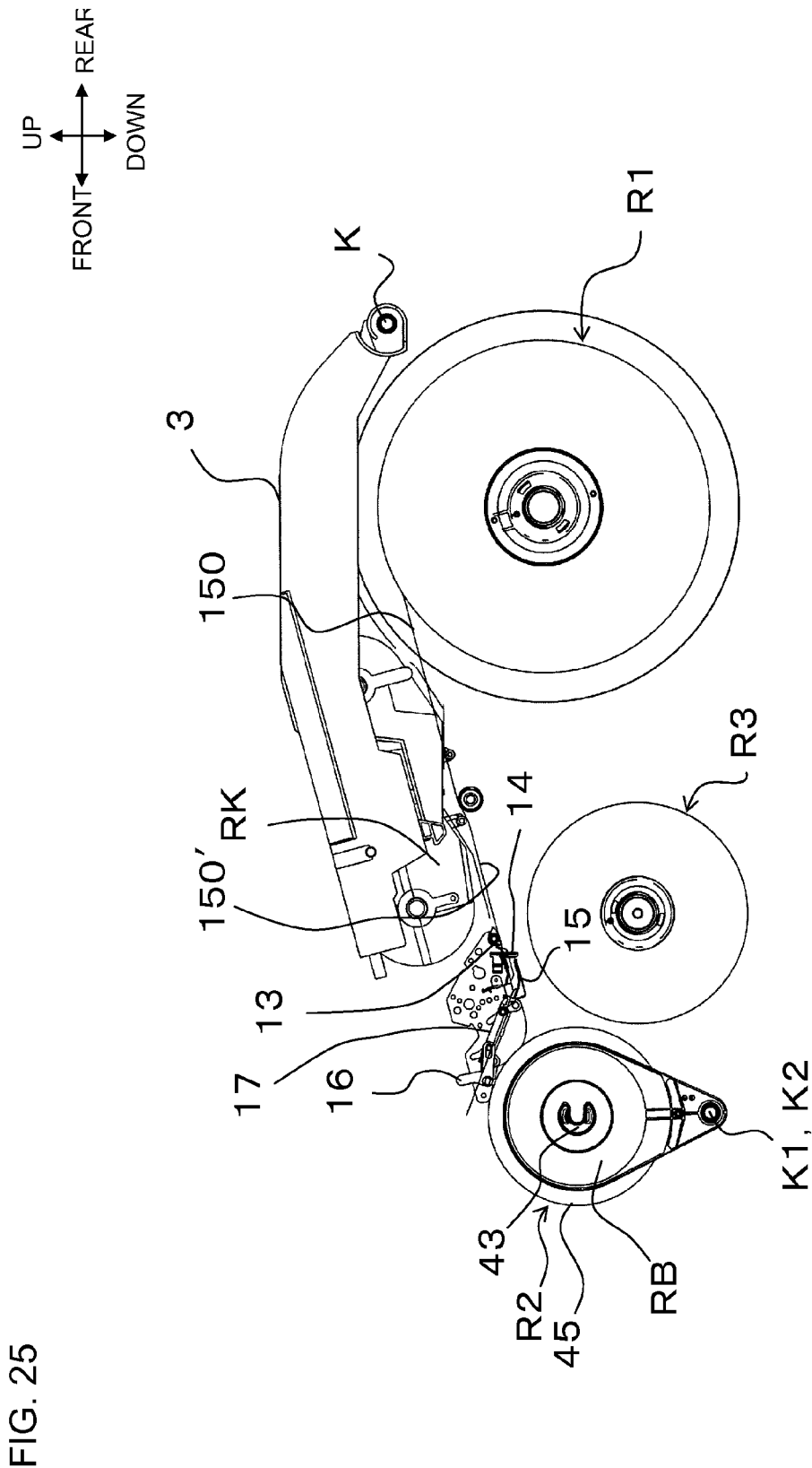
FIG. 25 is an explanatory view showing the tape transport path in the state shown in FIG. 23C.
Figure 26:
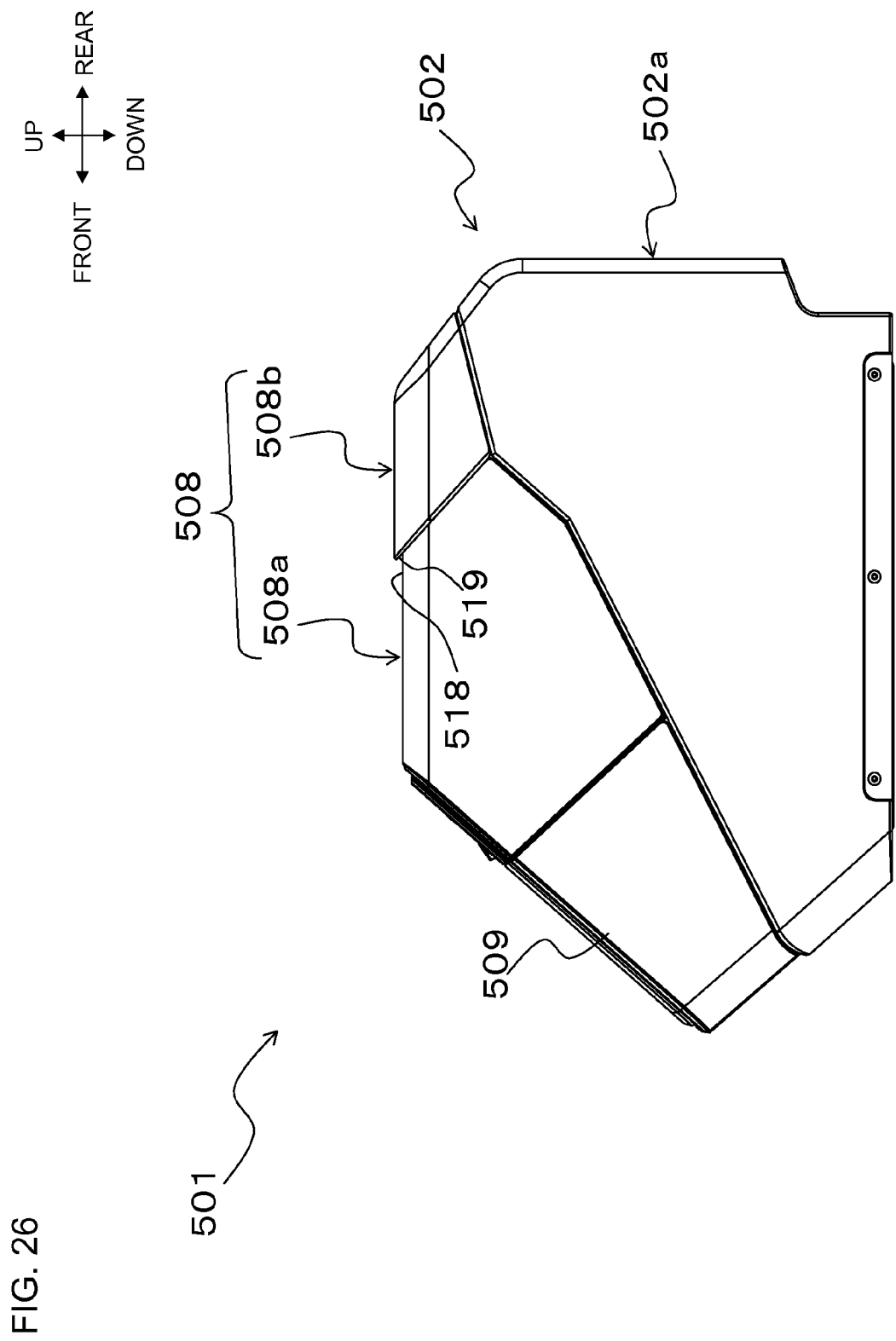
FIG. 26 is a right side view showing the outer appearance of the adhesive tape printer related to embodiment 2 of the present disclosure.

In FIG. 22 and the aforementioned FIG. 9 and the like, as already described, the first roll R1 and the third roll R3 are connected by the connecting arm 21 with a cross-sectional shape that is substantially box-like with an open left side, with the first roll R1 freely rotatably supported on the rearward side, and the third roll R3 freely rotatably supported on the frontward side. Then, at the peeling part 13, the separation material layer 151 is peeled from the print-receiving adhesive tape 150 fed out from the first roll R1, generating the adhesive tape 150" with print.

When the adhesive tape 150" with print is cut by the cutter mechanism 14 as described above, the user may, for example, remove and move the adhesive tape cartridge TK from the housing 2, or the like. At this time, the adhesive layer 152 of the above described adhesive tape 150" with print is exposed by the peeling of the separation material layer 151 from the print-receiving adhesive tape 150. Accordingly, when the user carelessly performs handling during the above described removal and moving, the adhesive layer 152 positioned at the tip end part (and nearby area) of the adhesive tape 150" with print after the above described cutting may mistakenly self adhere to another area of the adhesive tape 150" with print or stick to the third roll R3 or another cartridge area as is.

Hence, in this embodiment, a release processing part 70 that reseparably adheres the above described adhesive tape 150" with print is disposed in the position of the peeling part 13 of the connecting arm 21 described above (in this example, the shaded section in a substantial sideways "C" shape shown in FIG. 22). Note that, as the release processing part 70, a release processing member that has been subjected to a predetermined release processing and is a separate member from the connecting arm 21 may be arranged, or a release processing area may be formed by performing predetermined release processing in the area of the connecting arm 21.

Further, according to this embodiment, a rectangular cover member 71 that hangs down in the shape of an eave from the position of the peeling part 13 is further disposed to cover an area of the third roll R3 on the side of the adhesive tape 150" with print generated by the peeling part 13. Release processing similar to the above described release processing part 70 is performed on the entire surface (or a part of the surface) of this cover member 71. With this arrangement, the cover member 71 is capable of reseparably adhering the adhesive layer 152 positioned on the lower surface of the adhesive tape 150" with print discharged from the peeling part 13 to the surface of the cover member 71.

Further, a hole 72 comprising a width direction dimension that is smaller than the width of the adhesive tape 150" with print is disposed on the cover member 71. The adhesive tape 150" with print is reseparably adhered across both sides of the hole 72 along the tape length direction. When the above described adhesive tape 150" with print adheres across this hole 72 comprising a small width direction dimension as described above, the user can access the adhesive tape 150" with print exposed on the third roll R3 side by a finger operation.

Note that, in a case where there is no possibility of sticking to the third roll R3 side (or in a case where no such considerations need be made), the cover member 71 may be omitted and the release processing part 70 only may be disposed.

Note that the above described release processing part 70 and cover member 71 are shown only in FIG. 22 to prevent complexities in illustrations, and illustrations thereof in other figures are omitted.

Switching the Path of the Adhesive Tape with Print

As already described, according to this embodiment, the shoot 15 for switching the transport path of the adhesive tape 150" with print (or sometimes the adhesive tape 150' with print which includes the separation material layer 151; described later) between the side toward the second roll R2 and the side toward the discharging exit 12 is disposed on the downstream side of the cutter mechanism 14 along the tape transport direction. The path switching of this shoot 15 will now be described with reference to FIG. 23, FIG. 24, FIG. 25, and the like.

According to this embodiment, the feeding mode of the adhesive tape 150" with print or the adhesive tape 150' with print (hereinafter suitably and simply referred to as the "adhesive tape 150" with print, etc.") is generally classified into two modes according to whether or not there is winding of the second roll R2 inside the second storage part 6, and can be switched to three modes by further switching the above described shoot 15.

Switching Details of Shoot

First, the switching of the shoot 15 will be described. The above described shoot 15 is disposed further on the upstream side along the transport path than the second roll R2 stored in the second storage part 6, and further on the downstream side along the transport path than the print head 10. This shoot 15 is configured to be selectively switchable between an upward position (corresponding to a regular feeding mode described later) that guides the transport path of the adhesive tape 150" with print, etc., to the second storage part 6, and a downward position (corresponding to a feeding mode for external discharge described later) that guides the transport path of the adhesive tape 150' with print (in which the separation material layer 151 is not separated but included) to the discharging exit 12 of the housing 2.

The switching of the position of this shoot 15 is specifically performed by a switching lever 16, as shown in FIGS. 23A-23C. That is, a slide arm 17 is disposed on the housing 2 in a slidable manner in the downward sloping direction on the rearward side. The above described shoot 15 with a substantially L-shaped transverse cross-section is attached to a fulcrum shaft 17A disposed on the rearward side of this slide arm 17 so that the L-shaped horizontal part faces the cutter mechanism 14 side.

Further, a hinge protrusion 17B that serves as an action point is formed on the frontward side of the slide arm 17. At this time, the above described switching lever 16 is formed into a substantial L-shape, and is attached to the housing 2 by the fulcrum shaft 16A positioned in a middle section thereof in a back-and-forth rockable manner. A long hole 16B is formed on the rearward side of the switching lever 16, and the hinge protrusion 17B of the slide arm 17 is inserted into this long hole 16B in a slidable manner.

With the above described configuration, the slide arm 17 moves by the user operating an upward extending operation part 16C of the switching lever 16 in direction F in FIG. 23B, switching the shoot 15 from the upward position shown in FIG. 23A and FIG. 23B to the downward position shown in FIG. 23C. Further, if the operation part 16C is operated in the reverse of the above described F direction, the shoot 15 is switched from the downward position shown in FIG. 23C to the upward position shown in FIG. 23A and FIG. 23B.

Switching the Transport Path

Next, the three transport paths realised by the presence or non-presence of the winding of the second roll R2 described above and the switching of the above described shoot 15 will be described in order.

That is, first, the regular representative feeding mode performed with the shoot 15 switched to the above described upward position is the feeding mode already described. That is, as shown in FIG. 23A, while the separation material layer 151 of the adhesive tape 150' with print is peeled to form the third roll R3 inside the third storage part 7, the adhesive tape 150" with print from which the separation material layer 151 has been peeled are wound inside the second storage part 6, forming the second roll R2.

Note that the regular feeding mode performed with the shoot 15 switched to the above described upward position as described above is also sometimes configured so that the third roll R3 is not made to function. In such a case, as shown in FIG. 23B, the adhesive tape 150' with print is wound as is inside the second storage part 6 without the separation material layer 151 being peeled (that is, with the separation material layer 151 included as is), thereby forming the second roll R2. In order to make the third roll R3 not function, it is only necessary to not connect the separation material layer 151 included in the adhesive tape 150' with print and the third roll R3 (in this case, the third roll R3 serves as a so-called dummy) or not mount the third roll R3 itself to the adhesive tape cartridge TK.

On the other hand, in a case where the shoot is switched to the above described downward position (in this case, the third roll R3 is made not to function as described above), the mode changes to the feeding mode for external discharge. In this case, the adhesive tape 150' with print is discharged in a tape mode from the discharging exit 12 (refer to FIG. 2, FIG. 16, and FIG. 17 as well) disposed on the housing 2 to the outside of the housing 2 as is, without being guided to the second storage part 6 and wound into a roll shape and without the separation material layer 151 being peeled (in this case, the second storage part 6 is not used, for example).

Note that the switching of the above described shoot 15 is performed before winding work (or discharging work) of the above described adhesive tape 150" with print, etc., is newly performed, that is, with tape feeding stopped. During that switching, the tape tip end of the adhesive tape 150" with print, etc., cut during the previous winding work (or discharging work) is stopped at the position of the above described cutter mechanism 14. Correspondingly, according to this embodiment, when the shoot 15 is switched from the above described upward position to the downward position, the tip end position of the shoot 15 is configured to be closer to the side near the cutter mechanism 14 side (one side). That is, in the upward position shown in FIG. 23A and FIG. 23B, a relatively large space A forms between the rearward side tip end position of the shoot 15 and the cutter mechanism 14. Conversely, in the downward position shown in FIG. 23C, a space A' smaller than the above described A forms between the rearward side tip end position of the shoot 15 and the cutter mechanism 14 when the shoot 15 is switched to the downward position.

As described above, in this embodiment, in the flow of the print-receiving adhesive tape 150 and the adhesive tape 150' with print (the adhesive tape 150" with print and the separation material layer 151) from the first storage part 5, through print formation by the print head 10, to the third storage part 7 and the second storage part 6, and the like, the feeding by the feeding roller 11 is all performed in a tape posture in which the tape width direction is in the left-right direction, in other words, with the tape surface turned sideways. That is, the first roll R1, the second roll R2, and the third roll R3 are respectively wound around the axes O1, O2, O3 in the substantially horizontal direction. Then, the first storage part 5 that stores the first roll R1 is disposed on the rearward side of the housing 2, the print-receiving adhesive tape 150 from the first roll R1 is fed to the frontward side of the housing 2, and the adhesive tape 150' with print after print formation is guided to the second storage part 6, the third storage part 7, and the like, disposed on the frontward side of the housing 2. The transport path when the adhesive tape 150' with print is formed from the print-receiving adhesive tape 150 is thus a transport path from the rearward side to the frontward side of the housing 2. Further, the first roll R1, the second roll R2, and the third roll R3 are so-called drop-in types that are respectively inserted and stored in the corresponding first storage part 5, the second storage part 6, and the third storage part 7 from above. Moreover, the feeding motor M1 for driving the feeding roller 11 is disposed in the middle of the first storage part 5 and the second storage part 6, which are divided into a rearward side and a frontward side as described above. With such a disposed structure of each component, according to the adhesive tape printer 1 in this embodiment, it is possible to design the housing 2 which contains each of the above described components with a narrow width shape comprising a long dimension in the front-rear direction, and a short dimension in the left-right direction (refer to FIG. 8). As a result, it is possible to decrease the space required for arranging the adhesive tape printer 1.

Further, the first opening/closing cover 3 capable of opening and closing the first storage part 5, and the second opening/closing cover 4 capable of opening and closing the second storage part 6 are disposed on the upper part of the housing 2. Then, the first storage part 5 can be exposed by opening the first opening/closing cover 3 disposed on the rear end of the housing 2, and the second storage part 6 can be exposed by opening the second opening/closing cover 4 disposed on the front end of the housing 2. That is, it is possible to individually and independently expose the first storage part 5 and the second storage part 6, respectively. With this arrangement, when the adhesive tape 150' with print is wound inside the second storage part 6, forming the second roll R2, for example, it is also possible to open the second opening/closing cover 4 based on suitable timing and remove and use the second roll R2 wound inside the second storage part 6, regardless of the consumed state of the print-receiving adhesive tape 150 of the first roll R1 inside the first storage part 5. As a result, it is possible to improve user convenience.

Further, in particular, according to this embodiment, during printing execution, the first roll R1 and the third roll R3 are stored and used in the first predetermined position 8 below the first opening/closing cover 3 for each of the adhesive tape cartridges TK. With this arrangement, the user can simply attach and detach these two rolls R1, R3 and perform other handling collectively, thereby making it possible to improve convenience.

Further, in particular, according to this embodiment, the ink ribbon IB used for printing is stored and used in the second predetermined position 9 below the first opening/closing cover 3 and above the adhesive tape cartridge TK for each of the above described ribbon cartridges RK. With this arrangement, the user can simply perform the handling of the ink ribbon IB required during print formation separately from the adhesive tape cartridge TK, thereby making it possible to improve convenience.

Further, in particular, according to this embodiment, the structure of the aforementioned first opening/closing cover 3 and the second opening/closing cover 4 makes it possible to replace the ribbon cartridge RK based on suitable timing by opening the first opening/closing cover 3, regardless of the winding and layering state of the adhesive tape 150" with print of the second roll R2. With this arrangement, when the adhesive tape 150" with print is wound on the second roll R2, it is also possible to replace the ribbon cartridge RK to change the print color or the like in the middle of the process, for example, making it possible to further improve convenience.

Further, in particular, according to this embodiment, the second roll R2 can be attached to and detached from the second storage part 6 by opening the second opening/closing cover 4, even with the first opening/closing cover 3 closed as is. With this arrangement, even in a case where the print-receiving adhesive tape 150 of the first roll R1 is barely consumed and replacement of the first roll R1 is not yet required, the user can open the second opening/closing cover 4 based on suitable preferred timing and reliably remove the second roll R2 with the first roll R1 left inside the first storage part 5 as is. As a result, it is possible to further improve convenience.

Further, in particular, according to this embodiment, the height direction position of the axis O2 of the second roll R2 that winds the adhesive tape 150" with print inside the second storage part 6 is higher than the height direction position of the axis O3 of the third roll R3 that winds the separation material layer 151 inside the third storage part 7 by an amount equivalent to the distance h. With this arrangement, it is possible to reliably peel the separation material layer 151 downward from the adhesive tape 150' with print fed to the frontward side as described above, and reliably introduce the remaining adhesive tape 150" with print separated from the separation material layer 151 to the second storage part 6 without interference with the third roll R3. Further, due to the above described positional relationship, it is possible to apply sufficient tensile force to stretch the adhesive tape 150" with print tight after the peeling of the separation material layer 151, between the peeling position of the separation material layer 151 and the outer circumferential part of the second roll R2 wound on the second roll R2 inside the second storage part 6. As a result, it is possible to smoothly and favorably perform the cutting by the above described cutter mechanism 14.

Further, according to the adhesive tape cartridge TK in this embodiment, in a case where the separation material layer 151 is peeled from the adhesive tape 150' with print generated from the print-receiving adhesive tape 150 and used, the first roll R1 around which is wound the print-receiving adhesive tape 150 and the third roll R3 around which is wound the above described peeled separation material layer 151 are integrated via the connecting arm 21. With this arrangement, the user can simply attach and detach these two rolls to and from the adhesive tape printer 1 side and the like, and perform various handling collectively, making it possible to improve convenience. At this time, the guide parts 27 disposed on the connecting arm 21 substantially contact both ends in the tape width direction and guide the print-receiving adhesive tape 150 while causing the print-receiving adhesive tape 150 to pass with its tape width direction set in the left-right direction. With this arrangement, it is possible to reliably achieve smooth tape feeding. As a result of the above, it is possible to improve the handling performance by the user and ensure smooth feeding.

Further, in particular, according to this embodiment, it is possible to smoothly and reliably peel the separation material layer 151 from the print-receiving adhesive tape 150 fed out from the first roll R1 and fed to the frontward side by the peeling part 13 disposed further on the downstream side along the tape transport path than the guide part 27.

Further, in particular, according to this embodiment, the feed-out of the print-receiving adhesive tape 150 and the take-up of the separation material layer 151 are performed while the first roll R1 and the third roll R3 rotate in mutually opposite directions (in direction A, i.e., the counterclockwise direction, in FIG. 3, and in direction C, i.e., the clockwise direction, in FIG. 3, respectively). At this time, in a case where the third roll R3 rotates in the same counterclockwise direction as the first roll R1, for instance, the separation material layer 151 is brought onto the roll outer circumferential part in the substantially same orientation (substantially leftward in FIG. 3, for example) as the transport direction (leftward in FIG. 3, for example) of the print-receiving adhesive tape 150 fed out and fed from the first roll R1. Nevertheless, according to this embodiment, with the third roll R3 that rotates in the clockwise direction as described above, the separation material layer 151 is brought onto the roll outer circumferential part in the orientation substantially opposite (substantially rightward in FIG. 3, for example) the transport direction (leftward in FIG. 3, for example) of the print-receiving adhesive tape 150 fed out and fed from the first roll R1 (refer to arrow C in FIG. 3). With this arrangement, the angle θ (refer to FIG. 11) at which the separation material layer 151 bends when peeled from the print-receiving adhesive tape 150 fed to the frontward side is a small angle (an acute angle in this example) compared to a case where the above described two rolls R1, R2 both rotate in the clockwise direction. As a result, it is possible to more smoothly and reliably perform the peeling of the separation material layer 151 from the fed print-receiving adhesive tape 150.

Further, in particular, according to this embodiment, the connecting arm 21 of the adhesive tape cartridge TK, with the aforementioned configuration (the first bracket parts 22, 22, the second bracket parts 24, 24, the first connecting part 23, the second connecting part 25, and the roll connecting beam parts 26, 26), is designed with the required minimum structure for connecting and integrating the first roll R1 around which is wound the print-receiving adhesive tape 150 and the third roll R3 around which is wound the peeled separation material layer 151 while rotatably supporting these. With this arrangement, it is possible to set each of the rolls R1, R3 in a largely exposed state in an area other than the connecting arm 21 of the adhesive tape cartridge TK. As a result, it is possible to simplify and lighten the structure of the overall adhesive tape cartridge TK.

Further, according to the adhesive tape cartridge TK in this embodiment, the mutual relationship between the position of the above described peeling part 13 and the take-up position WP to the third roll R3 when the separation material layer 151 is peeled and taken up as described above is set so that favorable peeling is performed as described above. Specifically, the position of the peeling part 13 in the above described predetermined direction (arrow p-q direction in FIG. 12) is set further on one side (arrow p side) than the above described take-up position WP when the third roll R3 is in a minimum outer diameter state (solid line state), at least. With this arrangement, when the separation material layer 151 is peeled from the adhesive tape 150' with print fed on the middle transport path FP to one side (arrow p direction) along the above described predetermined direction (arrow p-q direction) at the peeling part 13, the separation material layer 151 bends toward the arrow q direction, which is the other side in the above described predetermined direction, at an acute angle (the above described angle θ) smaller than 90°, at least. As a result, compared to a case where the separation material layer 151 is simply bent 90° directly horizontally and peeled, it is possible to sufficiently and reliably peel the separation material layer 151.

Note that the position of the peeling part 13 in the above described predetermined direction (arrow p-q direction) may be set further on the above described one side (arrow p side) than the axis O3 of the third roll R3. In this case, the separation material layer 151 bends at an even smaller angle when peeled at the above described peeling part 13, making it possible to more reliably sufficiently peel the separation material layer 151.

Figure 12B:
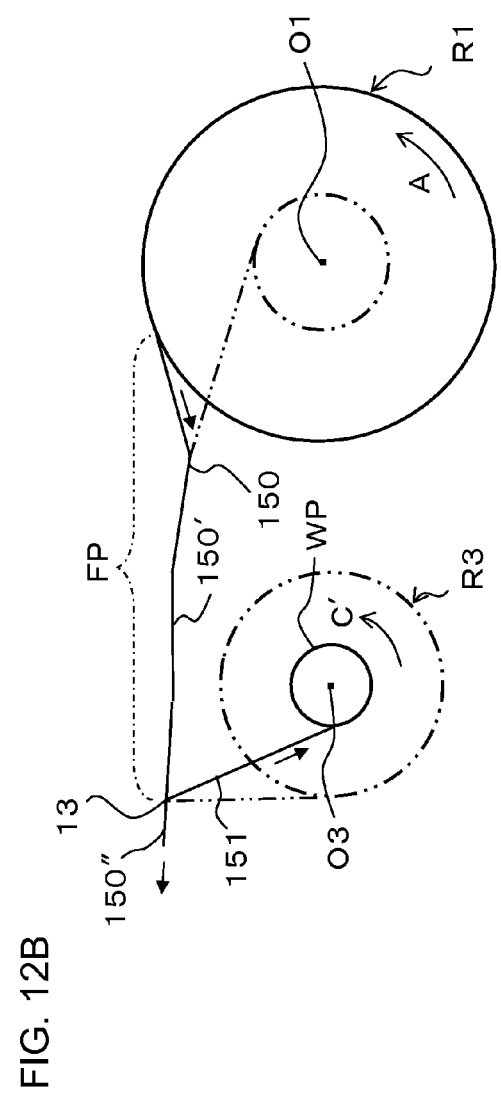
FIG. 12B is an explanatory view showing the behavior of each roll of the adhesive tape cartridge, in the rotating direction and on the tape transport path.

Further, in particular, according to this embodiment, the first roll R1 feeds out the print-receiving adhesive tape 150 from the outer circumferential part while rotating in the above described counterclockwise direction, as already described. On the other hand, the third roll R3 brings in and takes up the separation material layer 151 peeled by the peeling part 13 on the roll outer circumferential part in an orientation substantially opposite the transport direction of the print-receiving adhesive tape 150 while rotating in the above described clockwise direction. With this arrangement, it is possible to reasonably and smoothly wind the separation material layer 151 acutely bent at an acute angle as described above. Further, in a case where the third roll R3 rotates in the same direction as the first roll R1 (that is, the aforementioned counterclockwise direction) and brings in the separation material layer 151 on the roll outer circumferential part as shown in FIG. 12B, the peeling part 13 needs to be disposed further on the frontward side in order to maintain the above described angle θ at an acute angle and avoid interference with the first roll R1 and the third roll R3, leading to an increase in size of the adhesive tape cartridge TK. Conversely, in the case of the configuration shown in FIG. 12A, it is possible to avoid the above and arrange the peeling part 13 closer to the first roll R1 on the rearward side, making it possible to decrease the size of the adhesive tape cartridge TK. Note that, in a case where a decrease in size in this adhesive tape cartridge TK need not be considered, a configuration such as that of the above described FIG. 12B is acceptable.

Further, according to this embodiment, in the cutter mechanism 14, due to the support mode of the above described movable blade support part 33a, the movable blade 32 cuts from the adhesive layer 152 of the lowermost layer to the upper layer while the upward-pointing and downward-sloping blade edge 32a lifts the adhesive tape 150" with print upward from below as the movable blade 32 travels, as described above. At that time, the lowermost layer (that is, on the blade edge 32a side) and not the uppermost layer of the adhesive tape 150" with print is the adhesive layer 152, making it possible to prevent the adhesive layer from sticking to the guide plate 31 that presses and contacts the upper surface of the adhesive tape 150" with print (in other words, the upper surface of the base layer 153) due to the above described cutting. As a result, the movable blade 32 is caused to advance in the tape width direction as the adhesive tape 150" with print is reliably sandwiched and stabilised from above and below by the guide plate 31 and the movable blade 32, making it possible to perform cutting smoothly and sharply.

Further, in particular, in this embodiment, the guide plate 31 comprises the slit 31a for guiding the travel of the movable blade 32 by the carriage 33. With this arrangement, during the cutting of the adhesive tape 150" with print, it is possible to reliably and smoothly make the movable blade 32 supported by the guide plate 31 and the carriage 33 travel in the tape width direction.

Further, in this embodiment, the frontward side of the housing 2 comprises the second opening/closing cover 4 pivotable between the above described closed position and the above described open position. The frontward side of the above described housing 2 is covered by the second opening/closing cover 4 in the above described closed position, and exposed in the above described open position. Then, the above described second roll R2 is rotatably supported via the core member 45 and the support bracket RB in the frontward side interior of the housing 2. The support bracket RB is pivotably configured between the above described use position, which is on the closed direction side of the above described second opening/closing cover 4, and the above described removal position, which is on the open direction side of the above described second opening/closing cover 4. As a result, it is possible to expose the frontward side of the housing 2 by changing the above described second opening/closing cover 4 from the closed position to the open position (refer to FIG. 17), which causes the support bracket RB that supports the second roll R2 to pivot from the above described use position to the above described removal position (refer to FIG. 16).

At this time, the support bracket RB is configured so that the second roll R2 is not attachable or detachable in the above described use position (refer to FIG. 17), and is attachable and detachable in the above described removal position (refer to FIG. 16). Accordingly, when the second opening/closing cover 4 is closed and the frontward side of the housing 2 is covered, the support bracket RB is in the above described use position, and the above described second roll R2 rotates in a state in which it is not attachable or detachable (refer to FIG. 1, FIG. 2, FIG. 4, and the like). On the other hand, when the second opening/closing cover 4 changes from a closed state to an open state and the frontward side of the housing 2 is exposed, the support bracket RB pivots from the above described use position to the above described removal position, making the second roll R2 attachable and detachable on the frontward side of the above described exposed housing 2 (the states shown in FIG. 16, FIG. 5, and FIG. 6).

With the above, in this embodiment, after the adhesive tape 150" with print is wound, forming the second roll R2 as described above, the user opens the second opening/closing cover 4 based on suitable timing and pivots the support bracket RB to the removal position as described above, making it possible to smoothly and simply remove the wound second roll R2. Further, similar to the above, when the second roll R2 is to be newly mounted as well, the user opens the second opening/closing cover 4 and pivots the support bracket RB to the above described removal position as described above, making it possible to smoothly and simply mount the second roll R2. Further, subsequently the support bracket RB is pivoted to the above described use position and the user closes the second opening/closing cover 4, thereby completing printing preparation.

As described above, in this embodiment, in a state where the user has opened the second opening/closing cover 4 to expose the frontward side interior of the housing 2 and further pivots the support bracket RB to the above described removal position of the above described second opening/closing cover 4 in the open direction, the user can attach and detach the second roll R2 to and from the support bracket RB. That is, the user can attach and detach the second roll R2 not in the interior space but outside the interior space of the housing 2 with the second opening/closing cover 4 closed. With this arrangement, a manual operation space for roll attachment and detachment no longer needs to be secured in the interior of the housing 2, making it possible decrease the size of the housing 2. Thus, according to this embodiment, it is possible to simply attach and detach the second roll R2 around which is wound the adhesive tape 150" with print while preventing an increase in the size of the housing 2.

Further, in particular, in this embodiment, when the support bracket RB is pivoted from the use position to the removal position, it is possible to relatively separate the first bracket RB1 and the second bracket RB2 away from each other as described above (refer to FIG. 18). As a result, it is possible to attach and detach the second roll R2 between the separated second bracket RB2 and first bracket RB1.

Further, in particular, in this embodiment, it is possible to pivot the support bracket RB from the removal position to the use position, thereby transmitting the driving force from the take-up motor M3 to the second roll R2 via the driven gear and rotating part 47a of the first bracket RB1 as described above. As a result, it is possible to reliably take up and wind the adhesive tape 150" with print onto the second roll R2.

Further, in particular, in this embodiment, the first pivot axis K1 of the second opening/closing cover 4 and the second pivot axis K2 of the support bracket RB are in the same position. With this arrangement, the arc trajectory drawn by each part of the second opening/closing cover 4 when the second opening/closing cover 4 pivots between the above described closed position and the above described open position, and the arc trajectory drawn by each part of the support bracket RB when the support bracket RB pivots between the above described use position and the above described removal position are trajectories with the same center. As a result, it is possible to make interference not readily occur between the second opening/closing cover 4 and the support bracket RB during pivoting. Further, a common shaft member is used by the second opening/closing cover 4 and the support bracket RB at the axes K1 and K2 of the above described same position, thereby making it possible to simplify the structure compared to a case where separate shaft members are used.

Further, in particular, in this embodiment, the cutter mechanism 14 is disposed further on the rearward side than the second roll R2 (that is, the upstream side along the transport path), and this cutter mechanism 14 cuts the adhesive tape 150" with print fed upon print formation as described above. With this arrangement, the adhesive tape 150" with print is cut based on preferred timing, making it possible for the user to remove and acquire the second roll R2, around which is wound the adhesive tape 150" with print at a preferred length, from the frontward side of the housing 2.

Here, the attachment and detachment of the second roll R2 performed by pivoting the support bracket RB to the removal position as described above are performed before the winding work of the above described adhesive tape 150" with print is newly performed (that is, in a state where tape feeding is stopped). That is, during that switching, the tape tip end cut during the previous above described winding work is stopped at the position of the above described cutter mechanism 14. Correspondingly, according to this embodiment, one end of a connecting tape piece 46 is connected to the core member 45 (specifically, to the outer circumferential surface of the cylindrical part 45c, for example).

Then, in a case where the winding of the second roll R2 is to be newly performed, the user mounts the above described core member 45 to the support bracket RB and pivots the support bracket RB to the use position, and then adheres and connects the tip end part of the adhesive tape 150" with print cut and generated as described above to the other end of the above described connecting tape piece 46 (the opposite side end of the side that connects to the core member 45). FIG. 17 shows the connected state of this connecting tape piece 46. With this arrangement, after adhering and connecting the connecting tape piece 46, it is possible to sequentially wind the adhesive tape 150" with print on the outer circumference side of the core member 45 (specifically, the cylindrical part 45c) and form the second roll R2 by pivoting the second opening/closing cover 4 to the closed position and thus rotating the core member 45 as described above. As a result of the above, even in a case where the second roll R2 is to be newly generated, it is possible to smoothly and simply wind the adhesive tape 150" with print.

Further, in this embodiment, according to the core member 45 shown in FIG. 20A, FIG. 20B, and FIG. 21, when the adhesive tape 150" with print introduced from the introduction wall part 51 as described above is sequentially wound on the inner cylindrical surface 54, both ends of the adhesive tape 150" with print in the width direction do not readily stick to the above described middle wall parts 52, 52 by contact. Further, even if sticking were to occur, sticking to the introduction wall part 51 is peeled once again by the subsequent rotation of the above described core member 45, making it possible to properly guide and affix the adhesive tape 150" with print to the inner cylindrical surface 54. As a result, difficulties in take-up caused by the sticking of the adhesive layer 152 such as described above no longer arise, making it possible to improve the take-up performance of the adhesive tape 150" with print and execute take-up with high accuracy and high reliability. As a result, it is possible to reliably wind the adhesive tape 150" with print and generate the second roll R2.

Further, in particular, according to this embodiment, when the adhesive tape 150" with print is affixed to the inner cylindrical surface 54, it is affixed to the bottom surface of the concave groove 55 disposed on the inner cylindrical surface 54 while introduced to the concave groove 55. With this arrangement, it is possible to position and guide the adhesive tape 150" with print in the width direction even during introduction to the concave groove 55, making it possible to execute take-up with even higher accuracy.

Further, in particular, according to this embodiment, the size relationship between the above described axial direction dimensions w1, w2, w3 of the above described introduction wall part 51, the middle wall part 52, and the inner cylindrical surface 54, respectively, is w3 (≈W)<w1 and w1<w2. With this arrangement, in the introduction wall part 51, it is possible to reliably introduce the adhesive tape 150" with print based on a certain degree of width direction positioning accuracy using the dimension w1. Further, in the inner cylindrical surface 54, it is possible to affix the adhesive tape 150" with print based on high positioning accuracy using the dimension w3.

Further, in the adhesive tape cartridge TK in this embodiment, when the user handles the adhesive tape cartridge TK as described above, it is possible to the above described adhesive tape 150" with print (particularly, the tip end and nearby area) to the above described release processing part 70 and the cover member 71, thereby preventing the tape tip end and nearby area from mistakenly sticking to each location as described above. Further, since the release processing is performed on the release processing part 70 and cover member 71 as described above, in a case where the adhesive tape cartridge TK is mounted to the adhesive tape printer 1 and the print processing is to be started or the like, for example, the user can simply peel the adhesive tape 150" with print from the release processing part 70 and the cover member 71, and then execute setup to a predetermined mode for the print processing (for example, affix the other end of the aforementioned connecting tape piece 46, or the like). As a result of the above, in this embodiment, it is possible to improve the handling performance of the overall adhesive tape cartridge TK and improve user convenience.

Further, in particular, in this embodiment, either a release processing area is formed in a corresponding area of the connecting arm 21 or a release processing member is disposed as a separate member on the connecting arm 21, as the release processing part 70. With this arrangement, even if a new member for adherence is not prepared separately from the connecting arm 21, it is possible for the user to separably adhere the adhesive tape 150" with print.

Further, in particular, in this embodiment, the cover member 71 with the above described configuration is included, making it possible to reliably prevent the above described adhesive layer 152 of the adhesive tape 150" with print from mistakenly sticking to the third roll R3.

Further, in particular, in this embodiment, the cover member 71 comprises the hole 72 with the above described configuration. With this arrangement, when the user wants to once again peel the adhesive tape 150" with print that has been temporarily adhered to the cover member 71, the user can simply perform the peeling by a finger operation from the hole 72. As a result, it is possible to further improve user convenience.

Further, in this embodiment, as described above, the user can freely select whether to acquire the adhesive tape 150" with print, etc., wound into a roll shape as the second roll R2 or acquire the adhesive tape 150' with print in a tape-like shape as is via the discharging exit 12 by switching the shoot 15 in accordance with his or her preference (while setting whether or not the third roll R3 is to be made to function). As a result, it is possible to improve user convenience.

Further, in particular, according to this embodiment, in the above described regular feeding mode in which the shoot 15 is switched to the upward position, it is possible to peel the separation material layer 151 from the adhesive tape 150' with print and form the third roll R3 by making the third roll R3 function. As a result, the handling of the separation material layer 151 that will be discarded becomes more convenient, thereby making it possible to improve user convenience.

Further, in particular, according to this embodiment, when the shoot 15 is switched to the downward position, the tip end position of the shoot 15 is configured to be closer to the side near the cutter mechanism 14 side. With this arrangement, when the tape tip end of the adhesive tape 150" with print, etc., that has been cut during the previous winding work (or discharging work) and stopped at the position of the cutter mechanism 14 is fed, the shoot 15 is capable of reliably capturing the tape tip end of the adhesive tape 150" with print, etc. As a result, it is possible to reliably guide the adhesive tape 150" with print, etc., to the discharging exit 12 and reliably discharge it to outside the housing 2.

Note that while the above described embodiment 1 has described an illustrative scenario in which the adhesive tapes 150', 150" with print are formed using the print-receiving adhesive tape 150, which is an adherable tape, as the tape subject to feeding, the present disclosure is not limited thereto. That is, the aforementioned configuration may be applied to a case where print tape on which preferred print has been formed, such as advertisement ribbon, for example, is formed using print-receiving tape that is not adhesive.

Next, embodiment 2 of the present disclosure will be described using FIGS. 26-54. This embodiment, similar to the above described embodiment 1, is related to an adhesive tape printer. The adhesive tape printer in this embodiment differs in the number, shape, and opening/closing structure of the covers, the shape and detailed structure of the cartridge, the roll rotation stopping structure resulting from coordination between the cartridge and housing, the detailed structure of the core member, and the like, compared to the adhesive tape printer in the above described embodiment 1 (details described later). The following describes embodiment 2 focusing on these differences in structure from the above described embodiment 1, and sections that are the same as those in the above described embodiment 1 are denoted using the same reference numerals, suitably omitting or simplifying the descriptions thereof.

General Configuration of Adhesive Tape Printer

First, the general configuration of the adhesive tape printer in this embodiment will be described with reference to FIGS. 26-33.

In FIGS. 26-33, an adhesive tape printer 501 in this embodiment comprises a housing 502 that constitutes the apparatus outer frame, a rearward-side opening/closing part 508, and a frontward-side opening/closing cover 509.

The housing 502 comprises a housing main body 502a, a first opening/closing arm 506 that is connected to the upper part of the rearward side of the housing main body 502a in an openable and closeable manner, and a second opening/closing arm 507 that is connected to the upper part of the frontward side of the housing main body 502a in an openable and closeable manner.

The housing main body 502a comprises a first storage part 503 disposed on the rearward side of the housing main body 502a, and a second storage part 504 and a third storage part 505 disposed on the frontward side of the housing main body 502a. Note that the first storage part 503, the second storage part 504, and the third storage part 505 will be described later in further detail.

A head holder 510 (refer to FIG. 33 and the like) is disposed on the first opening/closing arm 506. Then, the first opening/closing arm 506 is capable of making a print head 511 (described later) included in the head holder 510 relatively approach or separate from a platen roller 512 (described later; refer to FIG. 27 and the like) disposed on the housing main body 502a by pivoting around a predetermined pivot axis K51 (refer to FIG. 27) disposed on the upper part of the rearward side of the housing main body 502a. Specifically, the first opening/closing arm 506 is capable of pivoting from a closed position (the states in FIG. 27 and FIG. 29) in which the print head 511 is near the platen roller 512, to an open position (the state in FIG. 33) in which the print head 511 is separated from the platen roller 512.

The second opening/closing arm 507 is capable of opening and closing the area above the second storage part 504 by pivoting around a predetermined pivot axis K52 (refer to FIG. 27) disposed on an upper end of the frontward side of the housing main body 502a. Specifically, the second opening/closing arm 507 is capable of pivoting from a closed position (the states in FIG. 27 and FIG. 31) in which it covers the area above the second storage part 504, to an open position (the state in FIG. 33) in which it exposes the area above the second storage part 504.

The rearward-side opening/closing part 508 is connected to the upper area of the rearward side of the housing main body 502a in an openable and closeable manner. This rearward-side opening/closing part 508 is capable of opening and closing the area above the first opening/closing arm 506, that is, the area above the first storage part 503, by pivoting. According to this embodiment, unlike the above described embodiment 1, this rearward-side opening/closing part 508 comprises a first opening/closing cover 508a and a second opening/closing cover 508b.

The first opening/closing cover 508a is capable of opening and closing the area above the frontward side of the first storage part 503 by pivoting around a predetermined pivot axis K53 (refer to FIG. 27) disposed in the upper area of the rearward side of the housing main body 502a. Specifically, the first opening/closing cover 508a is capable of pivoting from a closed position (the states in FIGS. 26-28) in which it covers the area above the frontward side of the first storage part 503, to an open position (the states in FIGS. 29-32) in which it exposes the area above the frontward side of the first storage part 503. At this time, the positions of the above described pivot axis K53 of the first opening/closing cover 508a in the front-rear direction and the up-down direction are further on the rearward side and further on the upward side, respectively, than a roll center R50 of a first roll R51 (described later) stored in the first storage part 503.

The second opening/closing cover 508b is disposed further on the rearward side than the above described first opening/closing cover 508a, and is capable of opening and closing the area above the rearward side of the first storage part 503 separately from the opening and closing of the above described first opening/closing cover 508a by pivoting around a predetermined pivot axis K54 (refer to FIG. 27) disposed on the upper end of the rearward side of the housing main body 502a. Specifically, the second opening/closing cover 508b is capable of pivoting from a closed position (the states in FIG. 26 and FIG. 27) in which it covers the area above the rearward side of the first storage part 503, to an open position (the states in FIGS. 28-32) in which it exposes the area above the rearward side of the first storage part 503. At this time, the positions of the above described pivot axis K54 of the second opening/closing cover 508b in the front-rear direction and the up-down direction are further on the rearward side and further on the upward side, respectively, than the above described pivot axis K53 of the above described first opening/closing cover 508a. Note that the position of the pivot axis K54 of the second opening/closing cover 508b in the up-down direction may be the same as that of the pivot axis K53 of the above described first opening/closing cover 508a.

Then, the first opening/closing cover 508a and the second opening/closing cover 508b are configured so that, when each is closed, an outer circumferential part 518 of the first opening/closing cover 508a and an edge part 519 of the second opening/closing cover 508b substantially contact each other and cover substantially the entire area above the first storage part 503. Note that the first opening/closing cover 508a and the second opening/closing cover 508b will be described in further detail later.

The frontward-side opening/closing cover 509 is connected to the upper area of the frontward side of the housing main body 502a in an openable and closeable manner. This frontward-side opening/closing cover 509 is capable of opening and closing the area above the second opening/closing arm 507, that is, the area above the second storage part 504, by pivoting around a predetermined pivot axis K55 (refer to FIG. 27) disposed on the upper end of the frontward side of the housing main body 502a. Specifically, the frontward-side opening/closing cover 509 is capable of pivoting from a closed position (the states in FIGS. 26-30) in which it covers the area above the second storage part 504, to an open position (the states in FIG. 31 and FIG. 32) in which it exposes the area above the second storage part 504.

At this time, an adhesive tape cartridge TK5 is attachably and detachably mounted in a third predetermined position 513 located below the first opening/closing arm 506 of the housing main body 502a in a closed state. The adhesive tape cartridge TK5, similar to the adhesive tape cartridge TK in the above described embodiment 1, comprises the first roll R51, a third roll R53, and a connecting arm 516 that connects the first roll R51 and the third roll R53.

The first roll R51 is rotatably supported on the rearward side of the adhesive tape cartridge TK5 by the connecting arm 516, and the print-receiving adhesive tape 150 (with the same configuration as the above described embodiment 1) consumed by feed-out winds around an axis O51 (refer to FIG. 27) in the left-right direction. At this time, the first roll R51 is received in the first storage part 503 by the mounting of the adhesive tape cartridge TK5 from above, and stored in a state in which the axis O51 of the winding of the print-receiving adhesive tape 150 is in the left-right direction. Then, the first roll R51, stored in the first storage part 503 (with the adhesive tape cartridge TK5 mounted), is rotated in a predetermined rotating direction (direction a in FIG. 27) inside the first storage part 503, thereby feeding out the print-receiving adhesive tape 150.

Further, the platen roller 512 is disposed on a middle upward side of the first storage part 503 and the third storage part 505 of the housing main body 502*a*. The platen roller 512 is driven by a feeding motor M51 (refer to FIG. 27) disposed on the housing main body 502*a* via a gear mechanism (not shown), thereby feeding the print-receiving adhesive tape 150 fed out from the first roll R51 stored in the first storage part 503 in a tape posture in which the tape width direction is in the left-right direction.

Figure 27:
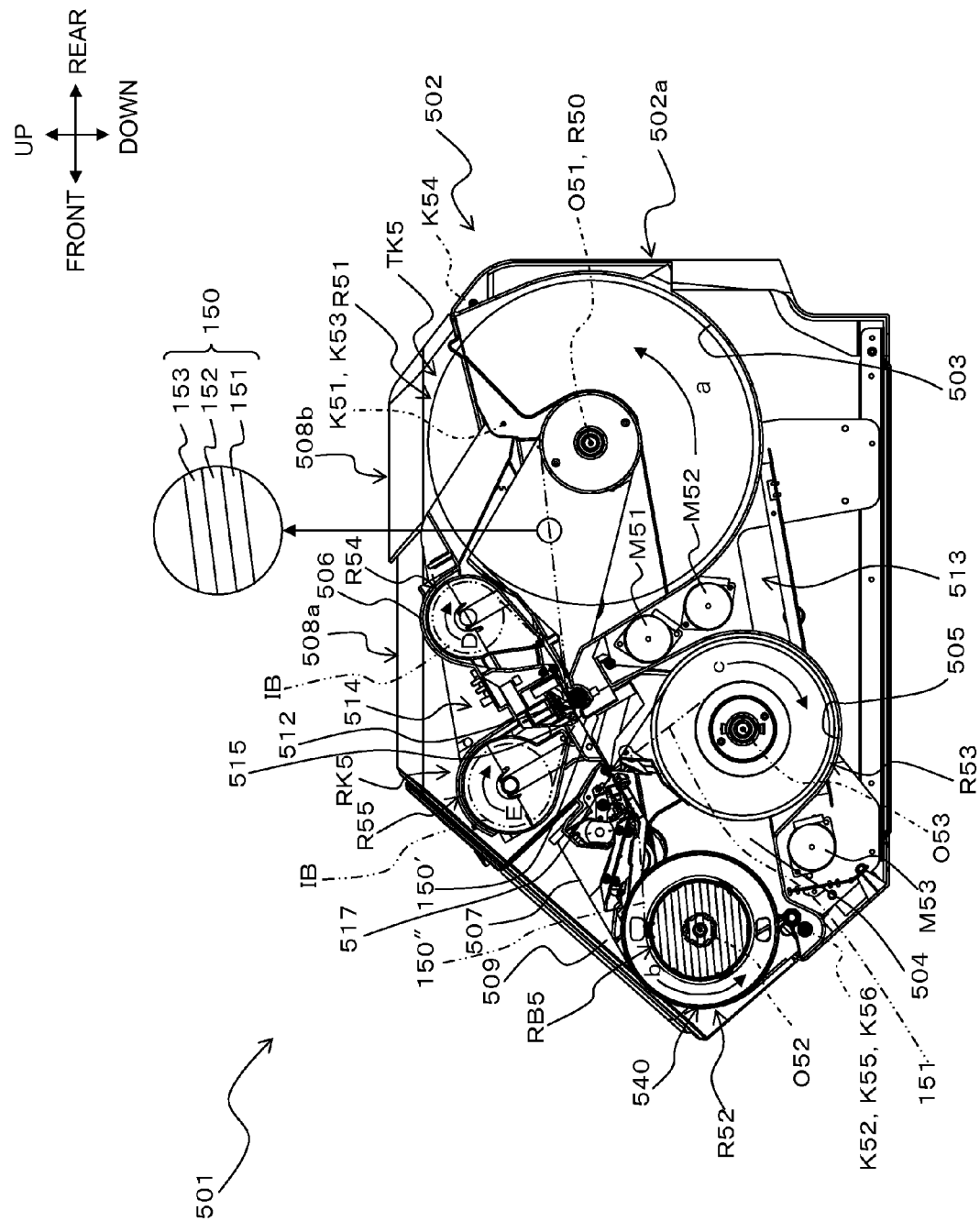
FIG. 27 is a vertical cross-sectional view showing the internal structure of the adhesive tape printer.
Figure 28:
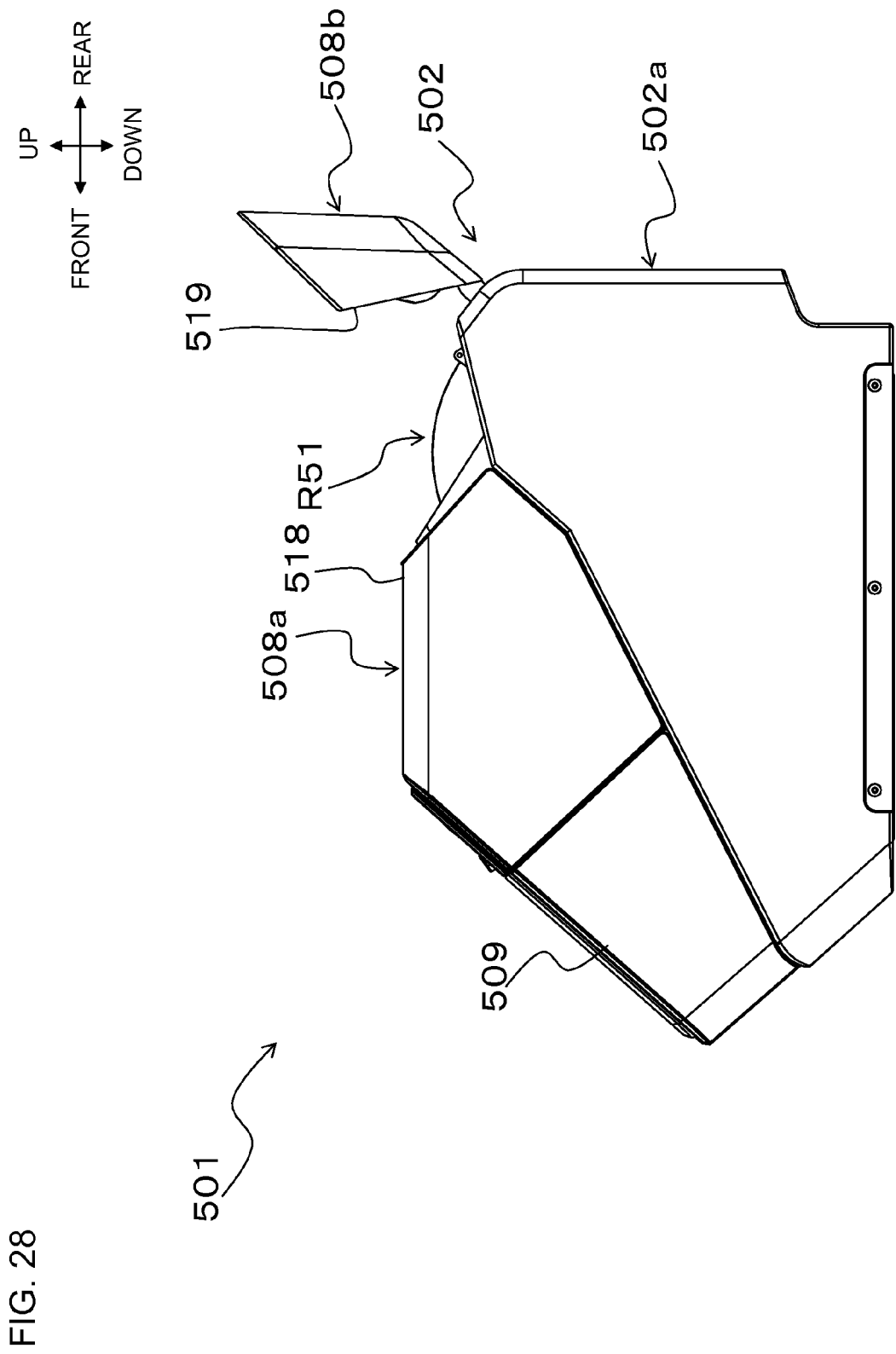
FIG. 28 is a right side view showing the outer appearance of the adhesive tape printer with the second opening/closing cover open.
Figure 29:
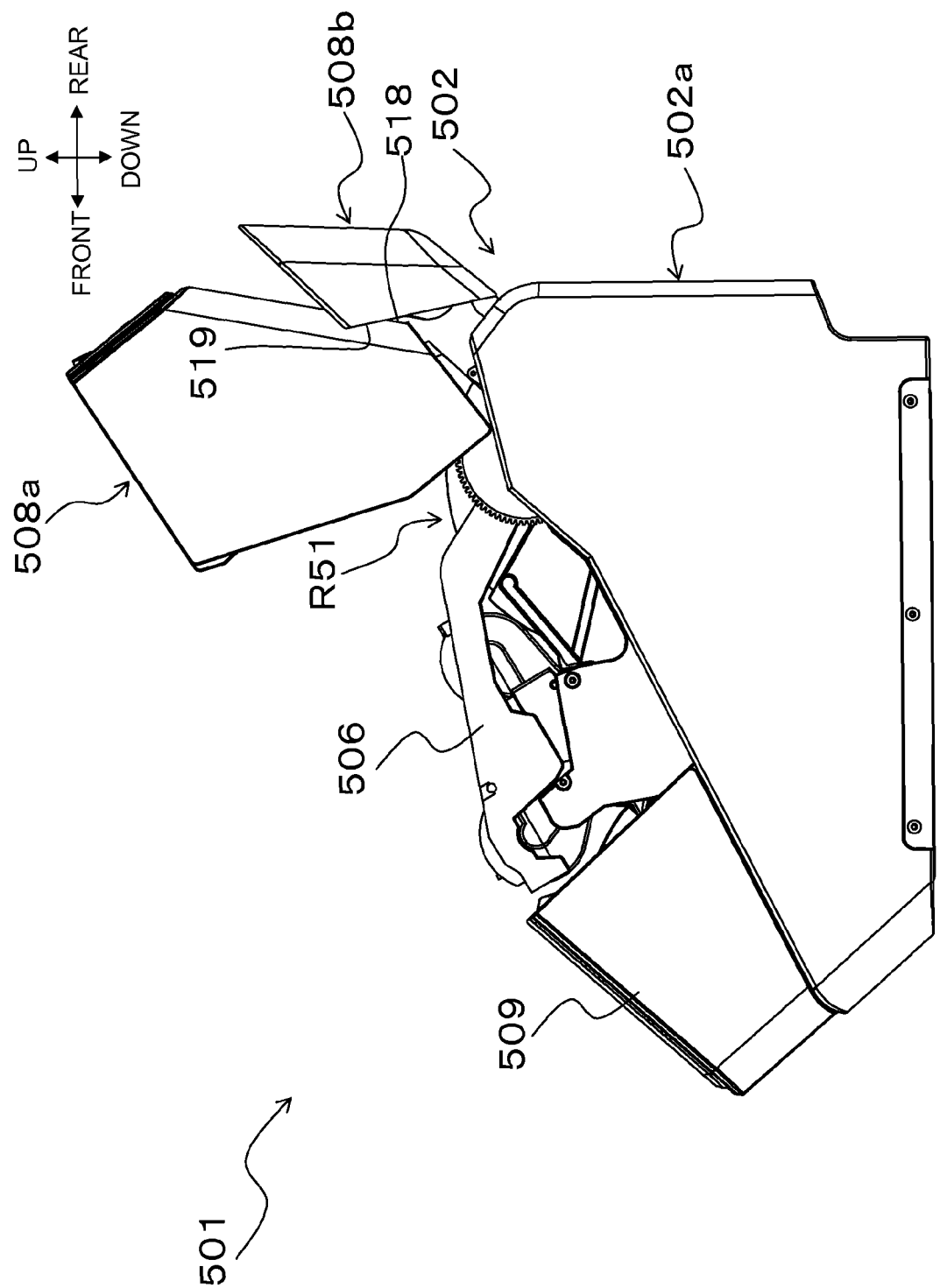
FIG. 29 is a right side view showing the outer appearance of the adhesive tape printer with the first opening/closing cover and the second opening/closing cover open.
Figure 30:
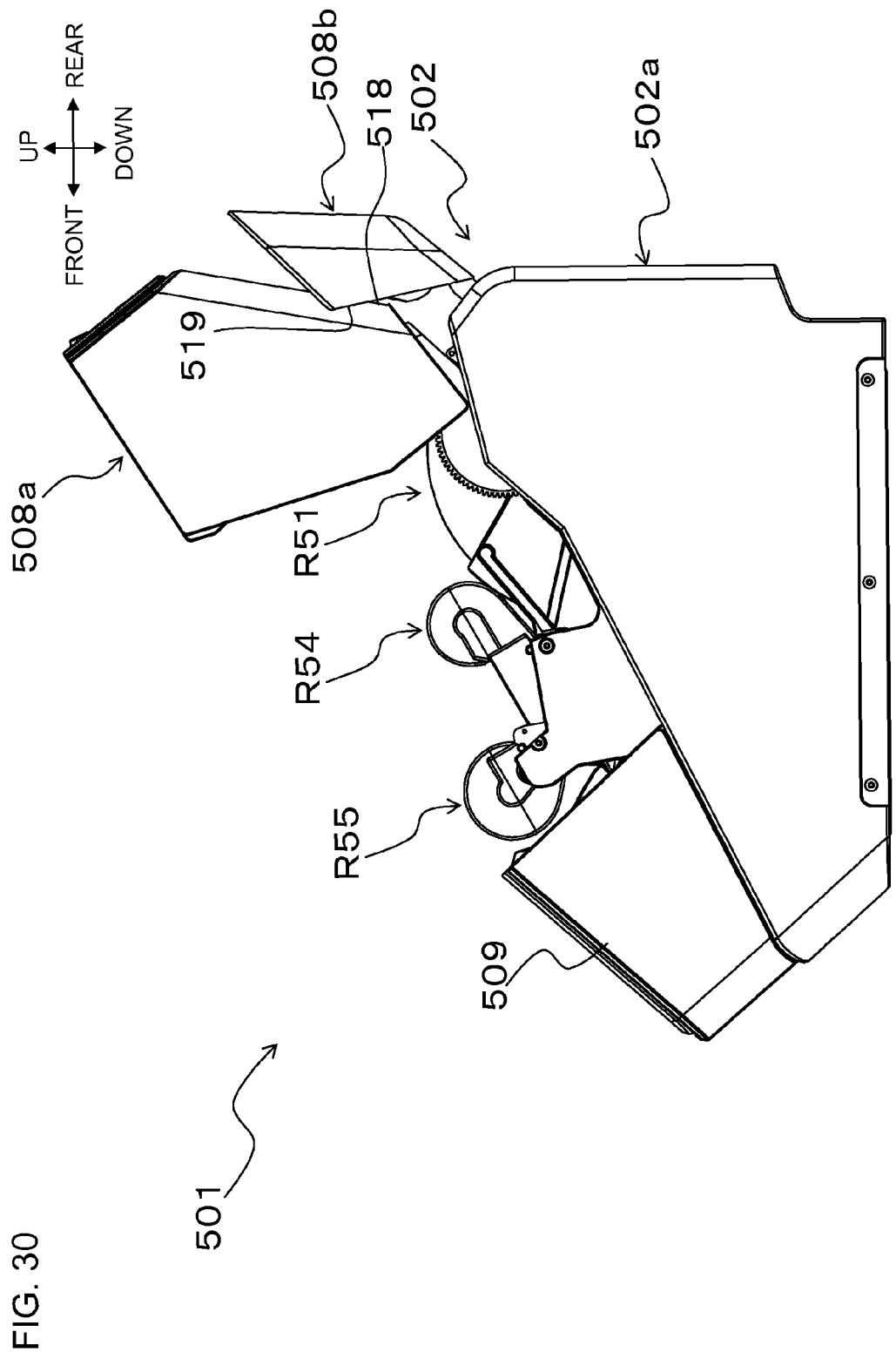
FIG. 30 is a right side view showing the outer appearance of the adhesive tape printer with the first opening/closing cover, the second opening/closing cover, and the first opening/closing arm open.
Figure 31:
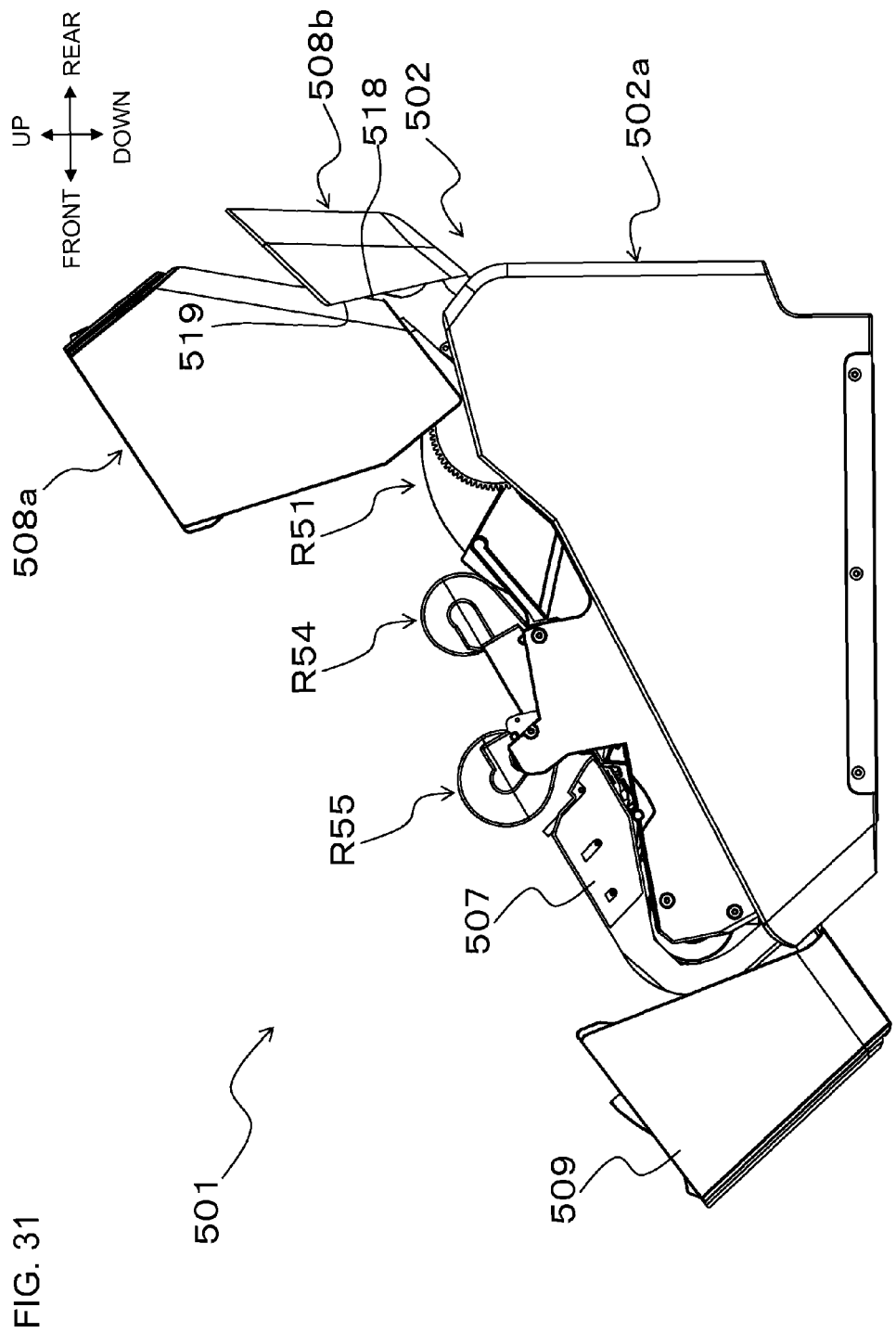
FIG. 31 is a right side view showing the outer appearance of the adhesive tape printer with the first opening/closing cover, the second opening/closing cover, the first opening/closing arm, and the frontward-side opening/closing cover open.
Figure 32:
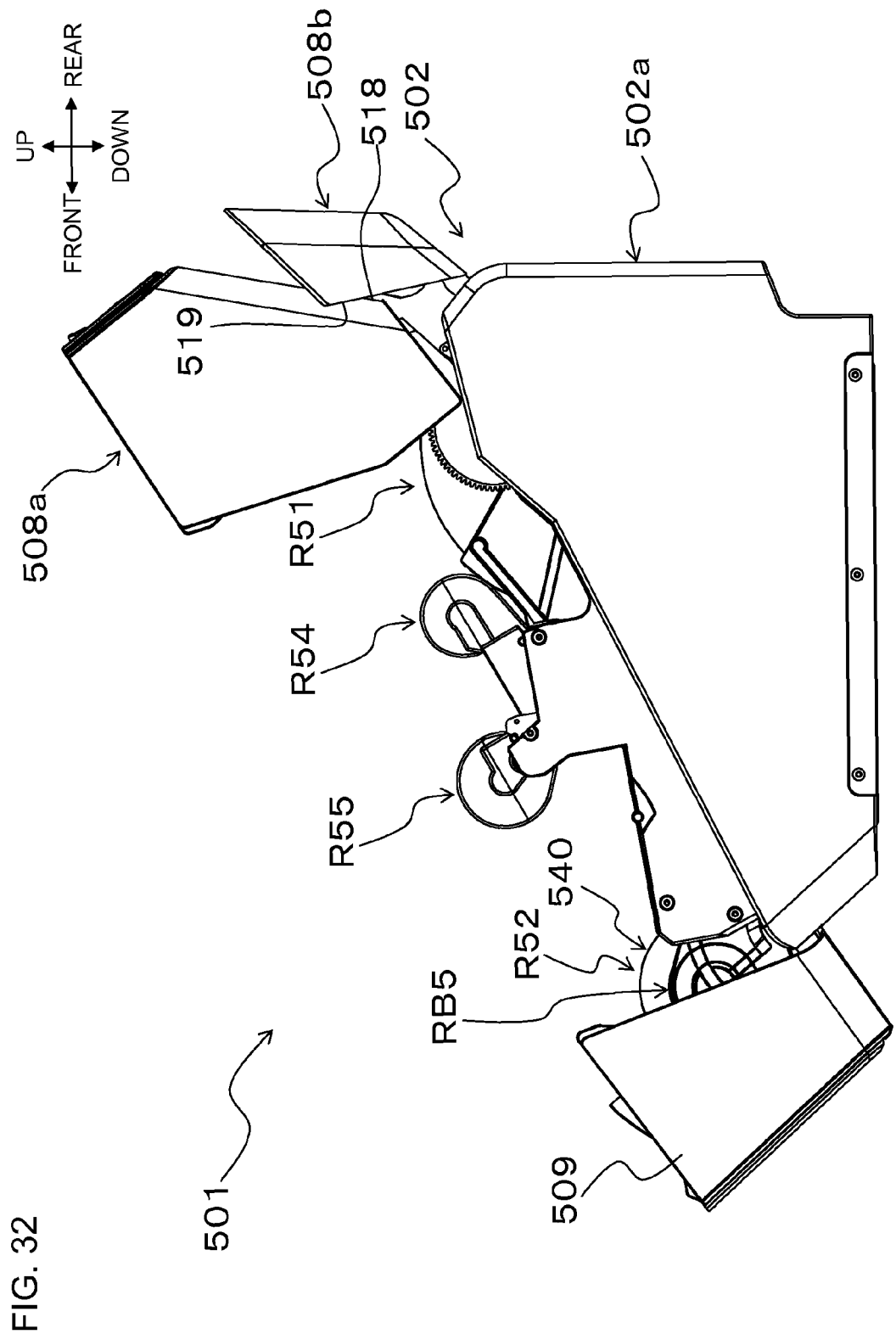
FIG. 32 is a right side view showing the outer appearance of the adhesive tape printer with the first opening/closing cover, the second opening/closing cover, the first opening/closing arm, the frontward-side opening/closing cover, and the second opening/closing arm open.

Further, the head holder 510 disposed on the first opening/closing arm 506 comprises the print head 511 (refer to FIG. 27). The print head 511, as described above, is capable of relatively approaching or separating from the platen roller 512 by the pivoting of the first opening/closing arm 506 around the pivot axis K51. That is, the print head 511 approaches the platen roller 512 when the first opening/closing arm 506 is closed, and separates from the platen roller 512 when the first opening/closing arm 506 is open. This print head 511 is disposed in a position that faces the area above the platen roller 512 at the first opening/closing arm 506, in a closed state, of the head holder 510, sandwiching the print-receiving adhesive tape 150 fed by the platen roller 512 in coordination with the platen roller 512. Accordingly, when the first opening/closing arm 506 is closed, the print head 511 and the platen roller 512 are disposed facing each other in the up-down direction. Then, the print head 511 forms preferring print on the base layer 153 of the print-receiving adhesive tape 150 sandwiched between the print head 511 and the platen roller 512 using an ink ribbon IB5 of a ribbon cartridge RK5 described later, thereby forming the same adhesive tape 150' with print as the above described embodiment 1. Note that the configuration of the head holder 510 other than that described above will be described in further detail later.

Further, at this time, the ribbon cartridge RK5 is attachably and detachably mounted in a fourth predetermined position 514, which is below the first opening/closing arm 506 of the housing main body 502*a* in a closed state and above the adhesive tape cartridge TK5. The ribbon cartridge RK5, similar to the above described embodiment 1, comprises a ribbon supply roll R54 and a ribbon take-up roll R55.

The ribbon supply roll R54 is rotatably supported on the rearward side of the ribbon cartridge RK5, and rotates in a predetermined rotating direction (direction D in FIG. 27) with the ribbon cartridge RK5 mounted, thereby feeding out the ink ribbon IB5 for forming print by the print head 511.

The ribbon take-up roll R55 is rotatably supported on the frontward side of the ribbon cartridge RK5 and rotates in a predetermined rotating direction (direction E in FIG. 27) with the ribbon cartridge RK5 mounted, thereby taking up the used ink ribbon IB5 after print formation.

Further, a ribbon take-up roller 515 is included on the downstream side of the print head 511 of the first opening/closing arm 506 along the tape feeding direction. The ribbon take-up roller 515 guides the used ink ribbon IB5 to the ribbon take-up roll R55.

That is, the ink ribbon IB5 fed out from the ribbon supply roll R54 is disposed further on the print head 511 side of the print-receiving adhesive tape 150 sandwiched between the print head 511 and the platen roller 512, contacting the area below the print head 511. Then, after the ink of the ink ribbon IB5 is transferred to the base layer 153 of the print-receiving adhesive tape 150 by the heat from the print head 511 to execute print formation, the used ink ribbon IB5 is taken up on the ribbon take-up roll R55 while guided by the ribbon take-up roller 515.

The connecting arm 516 comprises a peeling part 517 (refer to FIG. 33 and the like) which includes a substantially horizontal slit shape, for example, on the upstream side of the third roll R53 along the tape feeding direction. The peeling part 517, similar to the above described embodiment 1, is an area that peels the separation material layer 151 from the adhesive tape 150' with print fed out from the first roll R51 and fed to the frontward side. The peeling part 517 peels the separation material layer 151 from the adhesive tape 150' with print, separating the separation material layer 151 and the adhesive tape 150" with print made of the other layers, i.e., the base layer 153 and the adhesive layer 152. Then, the peeled separation material layer 151 is taken up and wound, forming the above described third roll R53. Further, the adhesive tape 150" with print, from which the separation material layer 151 has been peeled, is wound around an outer circumference side of a core member 540 described later, forming a second roll R52 described later. Note that the configuration of the connecting arm 516 other than that described above will be described in further detail later.

The third roll R53 is rotatably supported on the frontward side of the adhesive tape cartridge TK5 (that is, the downstream side of the first roll R1 along the tape feeding direction) by the connecting arm 516, and the separation material layer 151 peeled from the adhesive tape 150' with print is wound around an axis O53 (refer to FIG. 27 and the like) in the left-right direction. At this time, the third roll R53 is received in the third storage part 505 by the mounting of the adhesive tape cartridge TK5 from above and stored in a state in which the axis O53 of the winding of the separation material layer 151 is in the left-right direction. Then, the third roll R53, stored in the third storage part 505 (with the adhesive tape cartridge TK5 mounted), is driven by a take-up motor M53 (refer to FIG. 27) disposed on the housing main body 502*a* via a gear mechanism (not shown) and rotated in a predetermined rotating direction (direction c in FIG. 27) inside the third storage part 505, thereby taking up the separation material layer 151.

Further, similar to the above described embodiment 1, a support bracket RB5 connected to the upper part of the frontward side of the housing main body 502*a* in an openable and closeable manner is disposed on the second storage part 504. At this time, the core member 540 for sequentially winding the adhesive tape 150" with print, generated by the peeling of the separation material layer 151 from the adhesive tape 150' with print, is received in the second storage part 504 from above and stored so that it is rotatably supported around an axis O52 by the support bracket RB5 in a state in which the axis O52 of the winding of the adhesive tape 150" with print is in the left-right direction. Then, the core member 540, stored in the second storage part 504, is driven by the take-up motor M53 (refer to FIG. 27) disposed on the housing main body 502*a* via the gear mechanism and rotated in a predetermined rotating direction (direction b in FIG. 27) inside the second storage part 504, taking up and layering the adhesive tape 150" with print. With this arrangement, the adhesive tape 150" with print is sequentially wound around the outer circumference side of the core member 540, forming the second roll R52.

At this time, the support bracket RB5 is capable of pivoting around a predetermined pivot axis K56 (refer to FIG. 27) disposed on the upper end of the frontward side of the housing main body 502a. Specifically, the support bracket RB5 is capable of pivoting from a closed position (the states in FIG. 27 and FIG. 31) where it is positioned on the closing direction side of the second opening/closing arm 507 (that is, the print head 511 side of the first opening/closing arm 506 in a closed state), making the second roll R52 not attachable or detachable, to an open position (the states in FIG. 32 and FIG. 33) where it is positioned on the opening direction side of the second opening/closing arm 507 (that is, the side opposite the print head 511 of the first opening/closing arm 506 in a closed state), making the second roll R52 attachable and detachable.

Note that the above described support bracket RB5 and the core member 540 will be described in further detail later.

Summary of Operation of Adhesive Tape Printer

Next, an overview of the operation of the adhesive tape printer 501 will be described.

The basic operation of the adhesive tape printer 501 in this embodiment is substantially the same as that of the tape printer 1 in the above described embodiment 1. That is, when the adhesive tape cartridge TK5 is mounted in the third predetermined position 513, the first roll R51 is stored in the first storage part 503 positioned on the rearward side of the housing main body 502a, and the third roll R53 is stored in the third storage part 505 positioned on the frontward side of the housing main body 502a. Further, the core member 540 for forming the second roll R52 is stored in the second storage part 504 positioned on the frontward side of the housing main body 502a.

At this time, when the platen roller 512 is driven, the print-receiving adhesive tape 150 fed out by the rotation of the first roll R51 stored in the first storage part 503 is fed to the frontward side. Then, preferred print is formed on the base layer 153 of the fed print-receiving adhesive tape 150 by the print head 511, thereby forming the adhesive tape 150' with print. When the adhesive tape 150' with print on which print has been formed is further fed to the frontward side and fed to the peeling part 517, the separation material layer 151 is peeled at the peeling part 517. The peeled separation material layer 151 is fed to the downward side, introduced to the third storage part 505, and wound inside the third storage part 505, forming the third roll R53.

On the other hand, the adhesive tape 150" with print from which the separation material layer 151 has been peeled is further fed to the frontward side, introduced to the second storage part 504, and wound around the outer circumference side of the core member 540 inside the second storage part 504, thereby forming the second roll R52. At that time, a cutter mechanism disposed further on the rearward side than the second roll R52, that is, on the upstream side of the second roll R52 along the tape transport direction, cuts the adhesive tape 150" with print on which print has been formed and from which the separation material layer 151 has been peeled. With this arrangement, the adhesive tape 150" with print wound around the second roll R52 can be cut based on a timing preferred by the user and the second roll R52 can be removed from the second storage part 504 after cutting.

Detailed Structure of Each Part of Adhesive Tape Printer

Next, the detailed structure of each part of the adhesive tape printer 501 will be sequentially described.

Rearward-Side Opening/Closing Part

As described above, the area above the first storage part 503 in which the first roll R51 is stored can be opened and closed by the rearward-side opening/closing part 508. As print formation is executed and the adhesive tape 150" with print is generated as described above, the print-receiving adhesive tape 150 is consumed, decreasing the amount of the print-receiving adhesive tape 150 that is wound around the first roll R51. Accordingly, operator needs include the desire to check the behavior of the first roll R51 (whether or not the print-receiving adhesive tape 150 has been consumed, decreasing the diameter of the first roll R51, for example) inside the first storage part 503 with relatively high frequency. Nevertheless, when the rearward-side opening/closing part 508 that opens and closes the area above the first storage part 503 comprises one large opening/closing cover, the large opening/closing cover needs to be opened and closed with high frequency, thereby increasing the operation burden of the operator.

Here, according to this embodiment, the rearward-side opening/closing part 508 that opens and closes the area above the first storage part 503 comprises two opening/closing covers (the first opening/closing cover 508a and the second opening/closing cover 508b) as described above. That is, the area above the frontward side of the first storage part 503 can be opened and closed by the first opening/closing cover 508a, and the area above the rearward side of the first storage part 503 can be opened and closed by the second opening/closing cover 508b.

At this time, an urging member (not shown; an extension coil spring or the like, for example) is disposed on the upper end of the rearward side of the housing main body 502a. This urging member causes an urging force urged in the closing direction of the second opening/closing cover 508b to act on the second opening/closing cover 508b. Then, when the first opening/closing cover 508a moves in the opening direction, the edge part 519 (refer to FIGS. 28-32) of the second opening/closing cover 508b substantially in contact with the outer circumferential part 518 (refer to FIGS. 28-32) of the first opening/closing cover 508a slides as it receives the driving force caused by the contact from the outer circumferential part 518. With this arrangement, the urging force of the above described urging member is resisted by the edge part 519 due to the received driving force, causing the second opening/closing cover 508b to also move in the opening direction in tandem with the movement of the above described first opening/closing cover 508a in the opening direction.

Accordingly, when the operator wants to check the behavior of the first roll R51 inside the first storage part 503, the operator may manually operate only the second opening/closing cover 508b in the opening direction while leaving the first opening/closing cover 508a closed as is. When the operator performs this operation, only the second opening/closing cover 508b moves in the opening direction and opens, opening only the area above the rearward side of the first storage part 503 (the state in FIG. 28).

On the other hand, when the operator wants to largely open the area above the first storage part 503 and store (or remove) the first roll R51, the operator may manually operate only the first opening/closing cover 508a in the opening direction. When the operator performs this operation and the first opening/closing cover 508a moves in the opening direction, the edge part 519 of the second opening/closing cover 508b slides as it receives the driving force caused by the contact from the outer circumferential part 518 of the first opening/closing cover 508a and, resisting the urging force of the above described urging member due to the received driving force, the second opening/closing cover 508b automatically moves in the opening direction as well in tandem with the movement of the first opening/closing cover 508*a* in the opening direction. With this arrangement, both the first opening/closing cover 508*a* and the second opening/closing cover 508*b* open, largely opening the overall area above the first storage part 503 (the states in FIGS. 29-32).

Note that, after storage (or removal) of the first roll R51, the operator manually operates the first opening/closing cover 508*a* in the closing direction, causing the second opening/closing cover 508*b* to automatically move in the closing direction as well in tandem with the movement of the first opening/closing cover 508*a* in the closing direction due to the urging force of the above described urging member. With this arrangement, both the first opening/closing cover 508*a* and the second opening/closing cover 508*b* become closed, closing substantially the entire area above the first storage part 504 (the state in FIG. 26).

Adhesive Tape Cartridge

Figure 33:
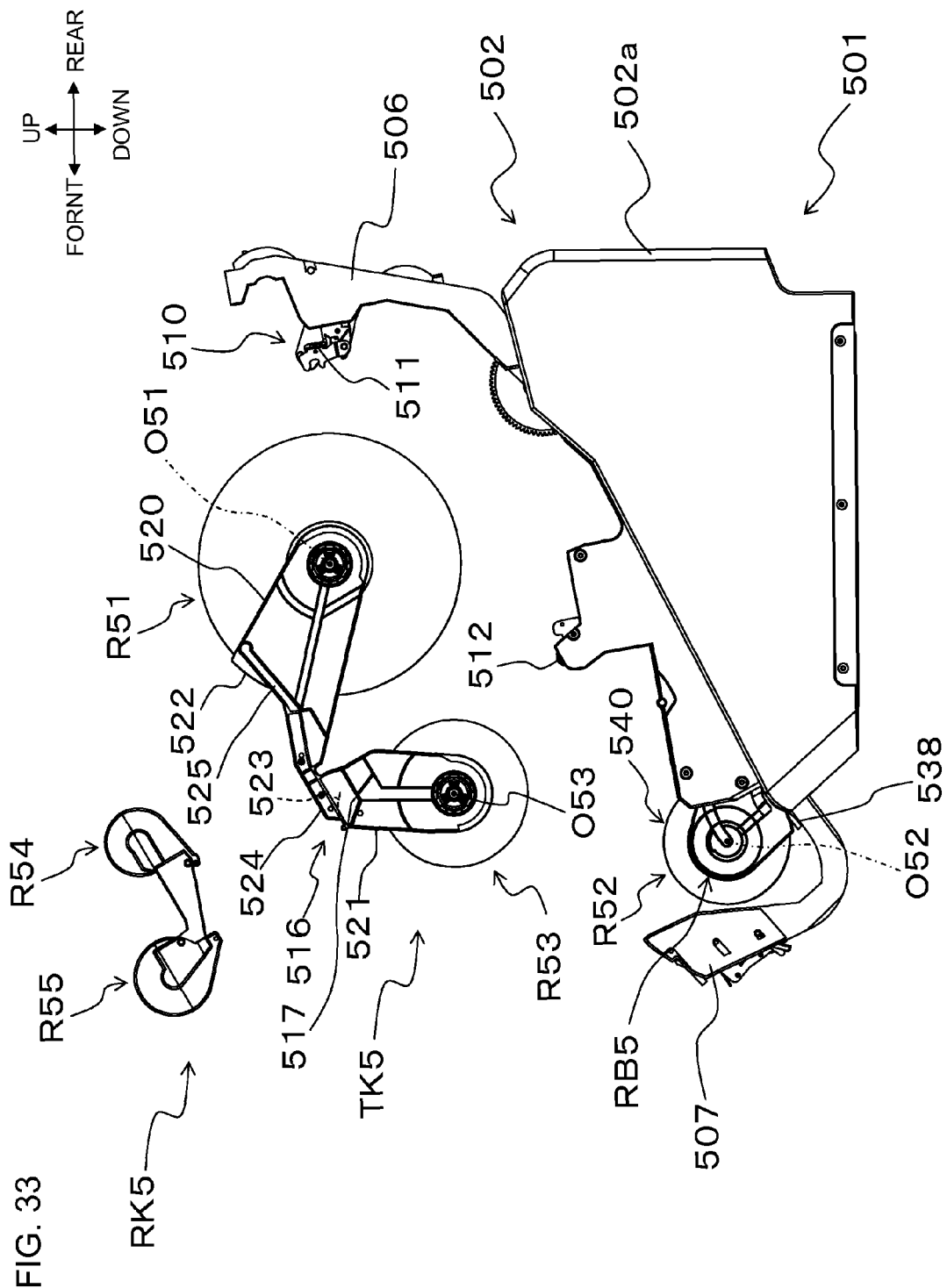
FIG. 33 is an exploded side view showing the adhesive tape printer with the first opening/closing cover and the second opening/closing cover open and the adhesive tape cartridge and ribbon cartridge removed.
Figure 34:
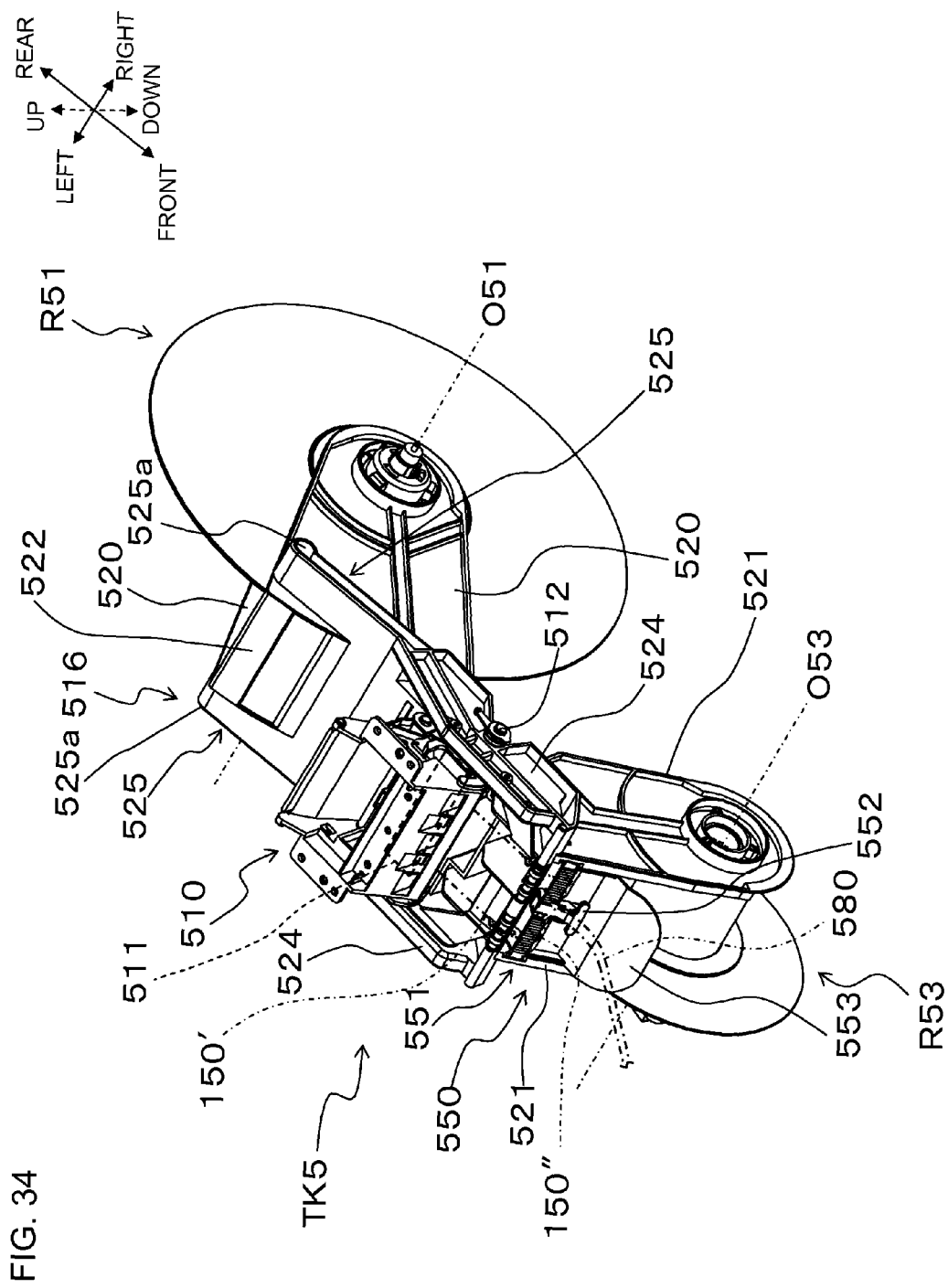
FIG. 34 is a perspective view showing the overall configuration of the adhesive tape cartridge according to embodiment 2 of the present disclosure.
Figure 35:
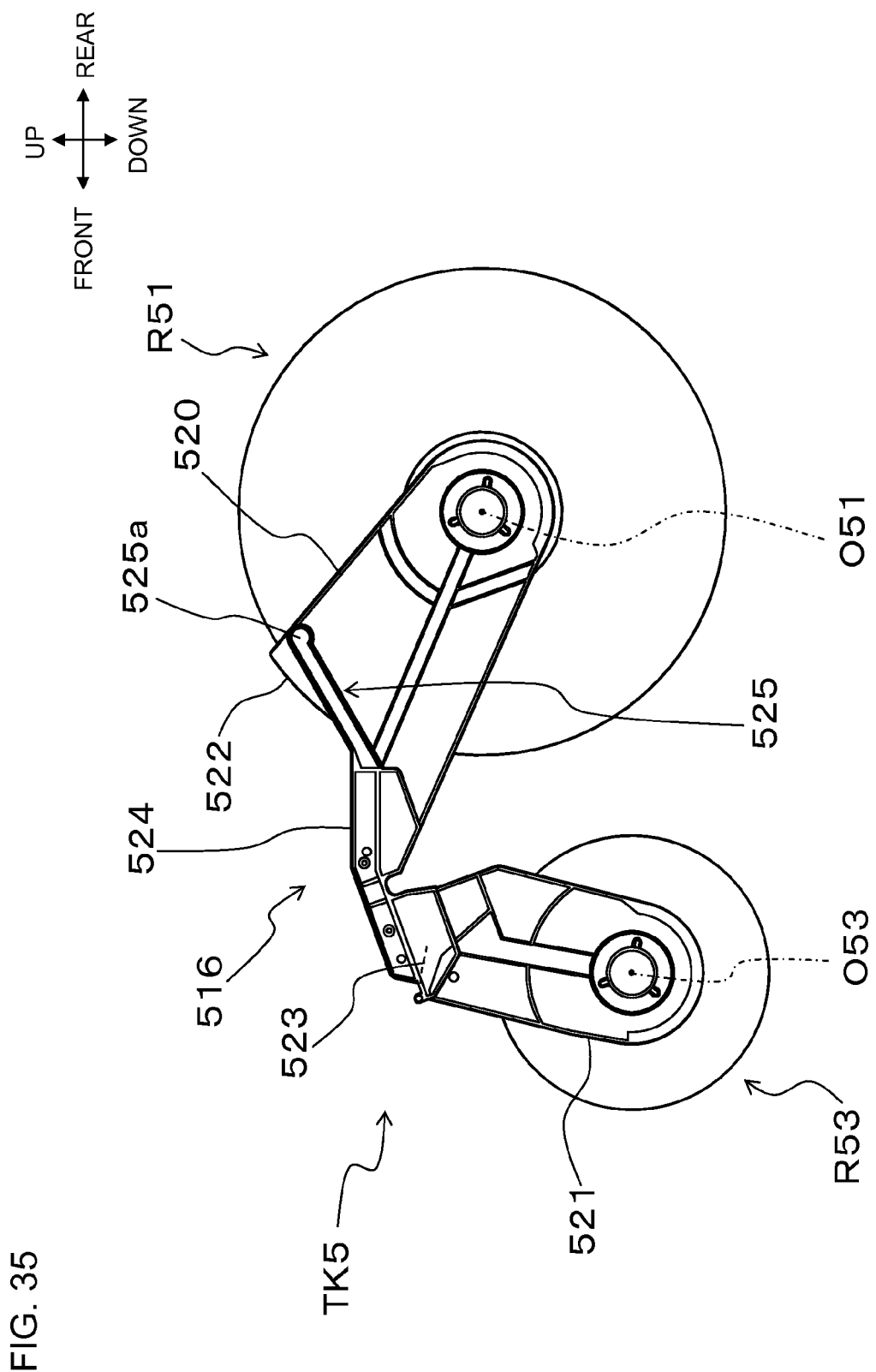
FIG. 35 is a right side view showing the overall configuration of the adhesive tape cartridge.

In FIGS. 33-35, the adhesive tape cartridge TK5, as described above, comprises the first roll R51, the third roll R53, and the connecting arm 516. The connecting arm 516, similar to the above described embodiment 1, comprises a pair of left and right first bracket parts 520, 520 disposed on the rearward side, and a pair of left and right second bracket parts 521, 521 disposed on the frontward side. Note that, in FIG. 34, the print-receiving adhesive tape 150 wound around the axis O51 on the first roll R51, and the separation material layer 151 wound around the axis O53 on the third roll R53 are not shown, and the member comprising the first roll R51 and the third roll R53 is partially not shown.

The first bracket parts 520, 520 sandwich the first roll R51 from both left and right sides (one side and the other side) along the axis O51, rotatably holding it around the axis O51. These first bracket parts 520, 520 are connected by a first connecting part 522 extended substantially along the left-right direction on the upper end, avoiding interference with the outer diameter of the first roll R51.

The second bracket parts 521, 521 sandwich the third roll R53 from both left and right sides (one side and the other side) along the axis O53, rotatably holding it around the axis O53. These second bracket parts 521, 521 are connected by a second connecting part 523 extended substantially along the left-right direction on the upper end.

Then, the first bracket parts 520, 520 and the first connecting part 522 on the rearward side, and the second bracket parts 521, 521 and the second connecting part 523 on the frontward side are connected by a pair of left and right roll connecting beam parts 524, 524.

Here, as described above, when the adhesive tape cartridge TK5 is used, the print-receiving adhesive tape 150 is fed out and fed from the first roll R51, thereby consuming the print-receiving adhesive tape 150. On the other hand, the separation material layer 151, which has been peeled by the above described peeling part 517 from the adhesive tape 150' with print on which print has been formed after the feeding of the print-receiving adhesive tape 150, is wound around the axis O53 on the third roll R53.

Figure 36:
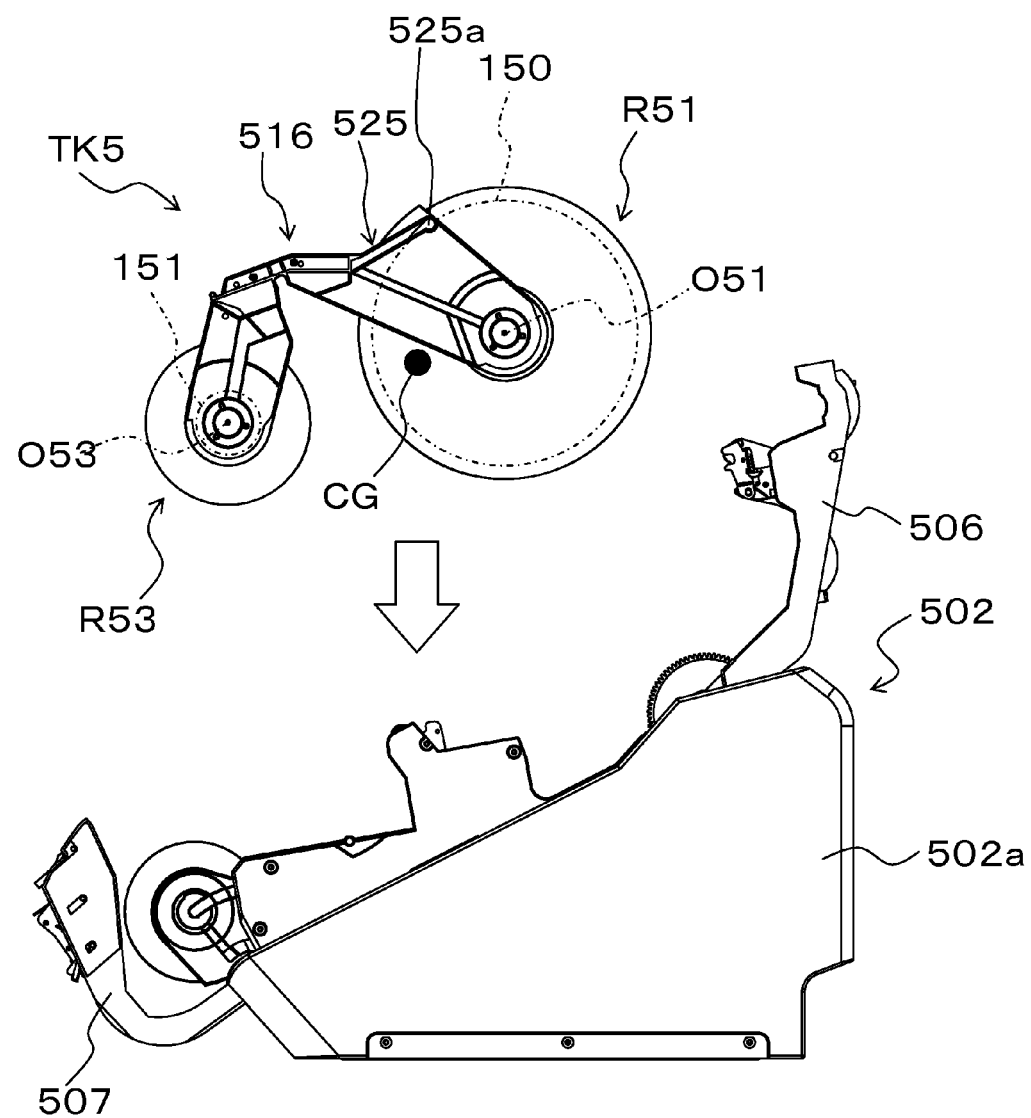
FIG. 36 is an explanatory view showing a mode in which the adhesive tape cartridge is mounted.
Figure 37:
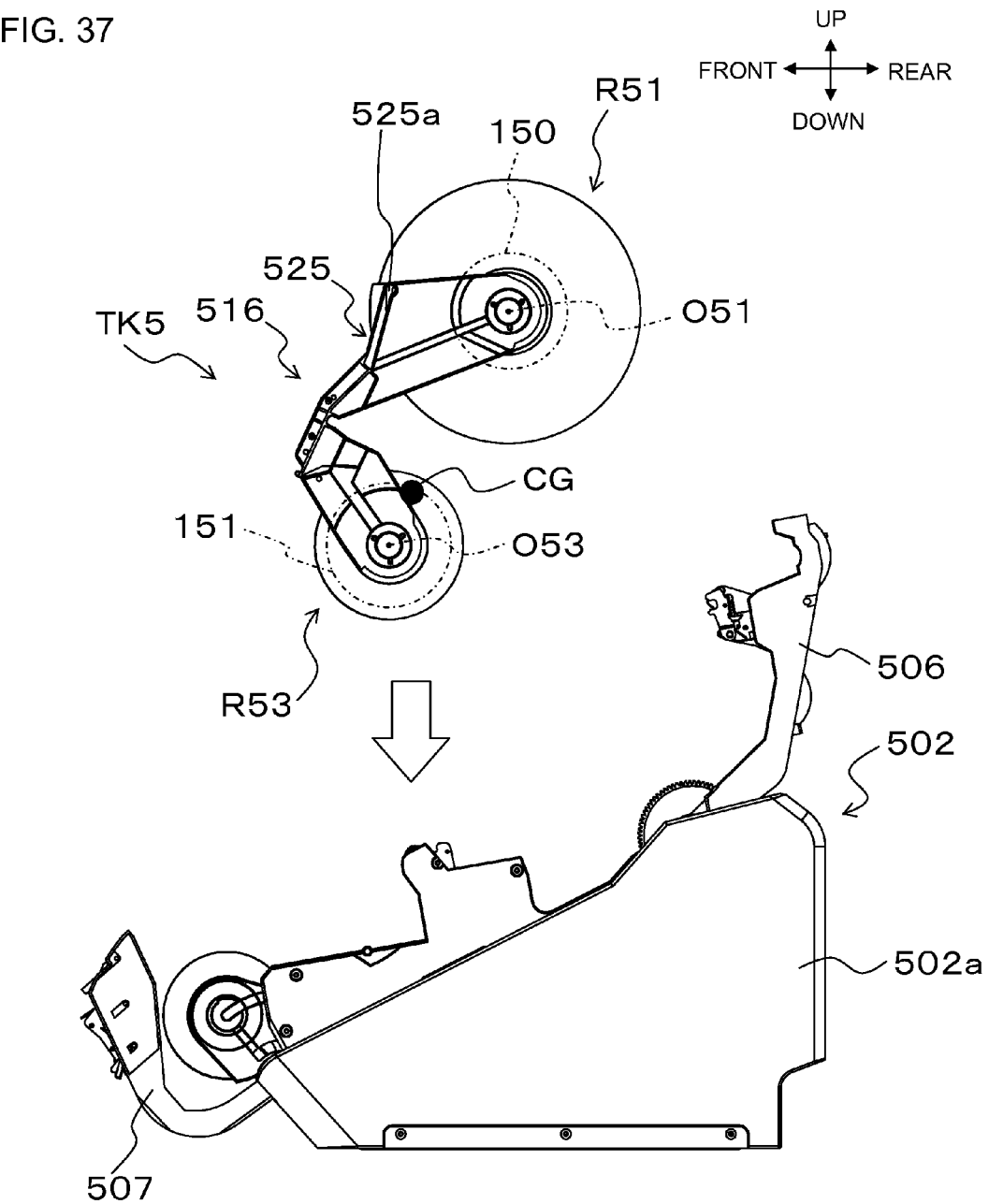
FIG. 37 is an explanatory view showing a mode in which the adhesive tape cartridge is mounted.
Figure 38B:
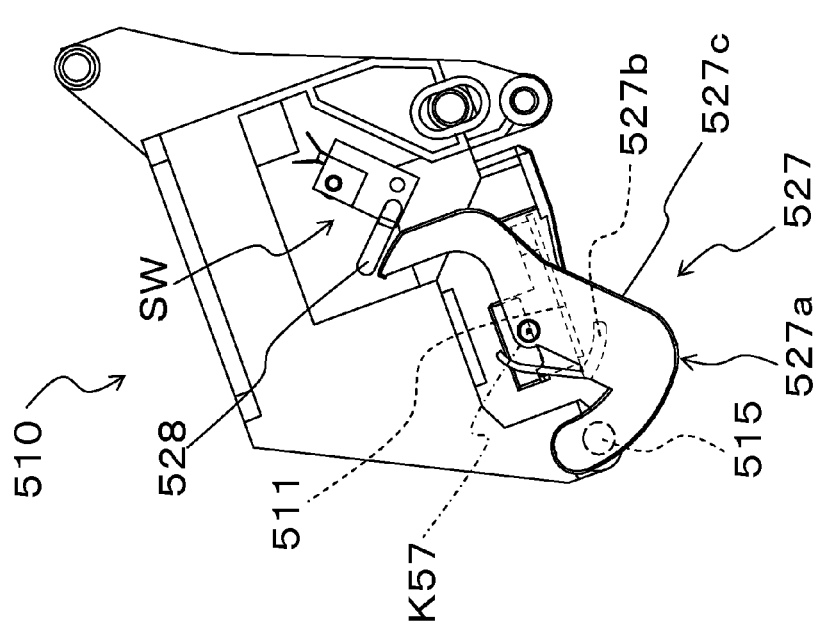
FIG. 38B is a right side view showing the head holder extracted.
Figure 38A:
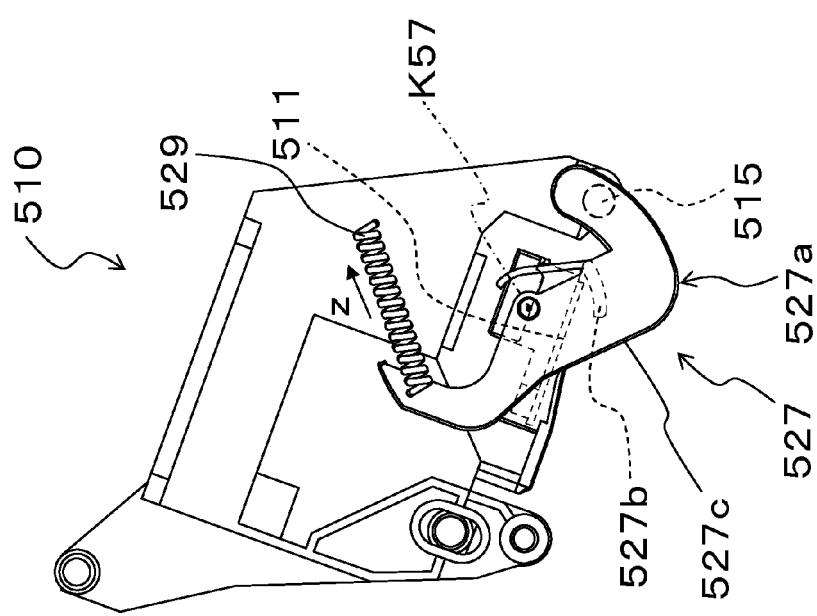
FIG. 38A is a left side view showing the head holder extracted.
Figure 40:
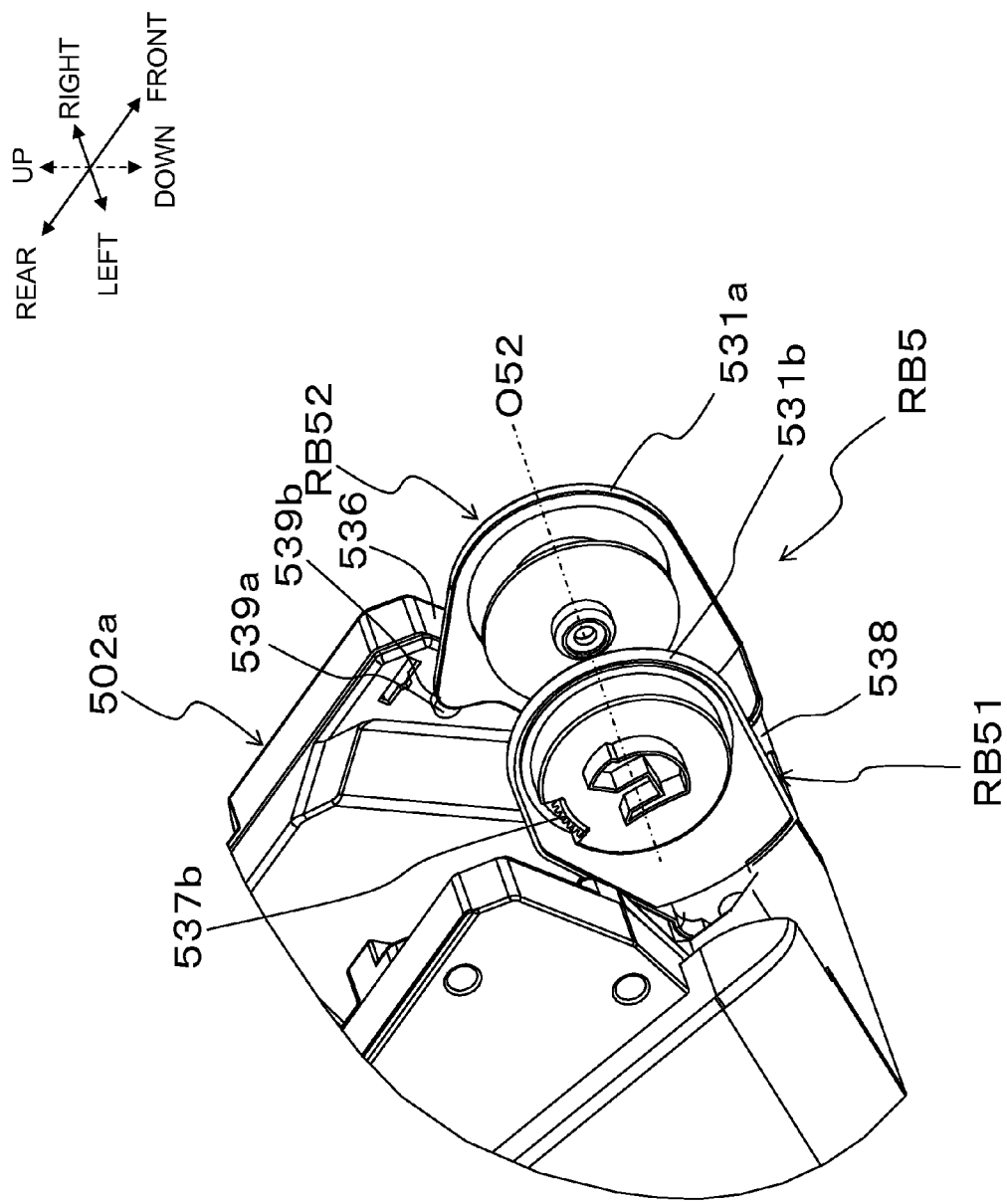
FIG. 40 is a perspective view for explaining the detailed structure of the support bracket.
Figure 41:
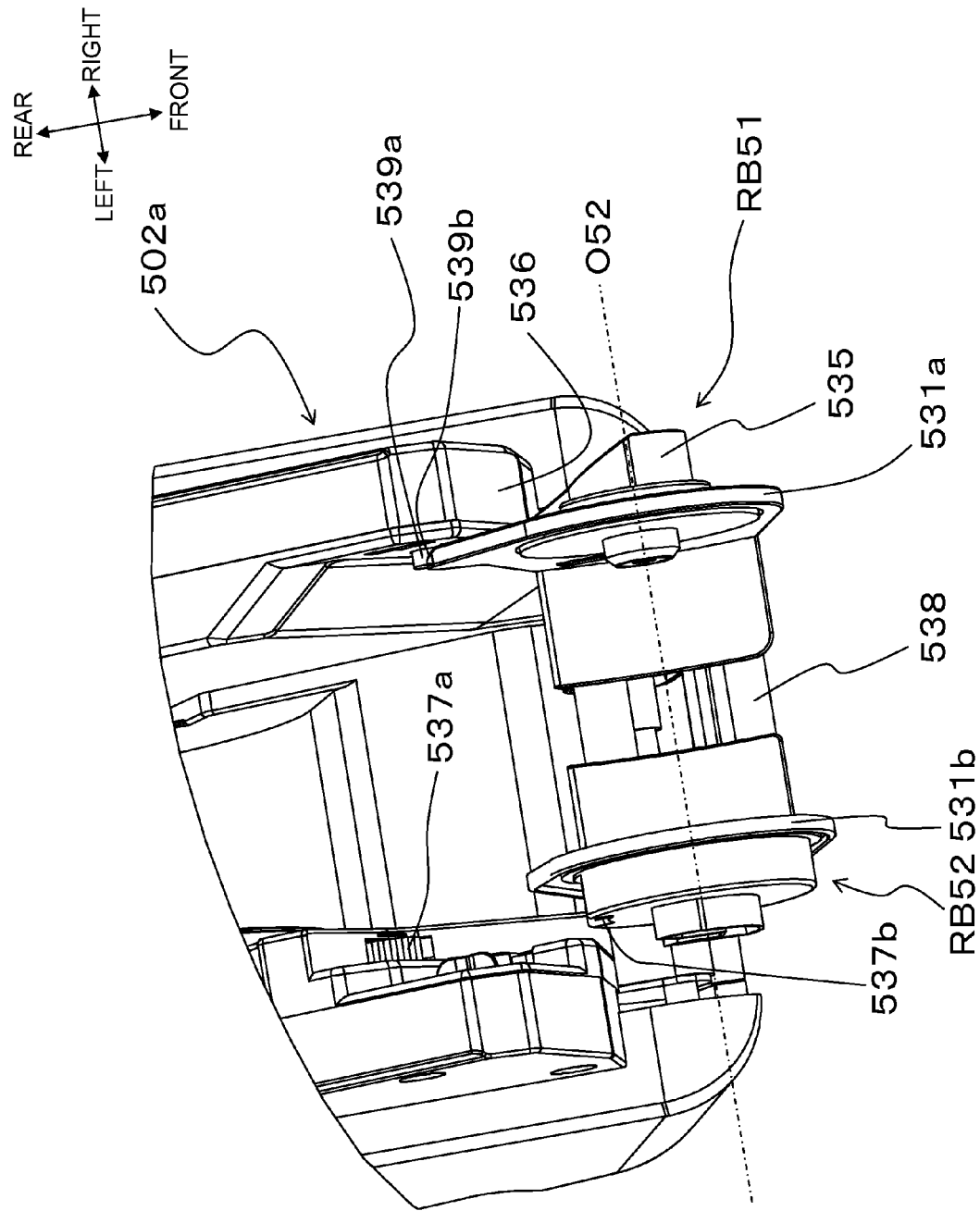
FIG. 41 is a perspective view for explaining the detailed structure of the support bracket.
Figure 42:
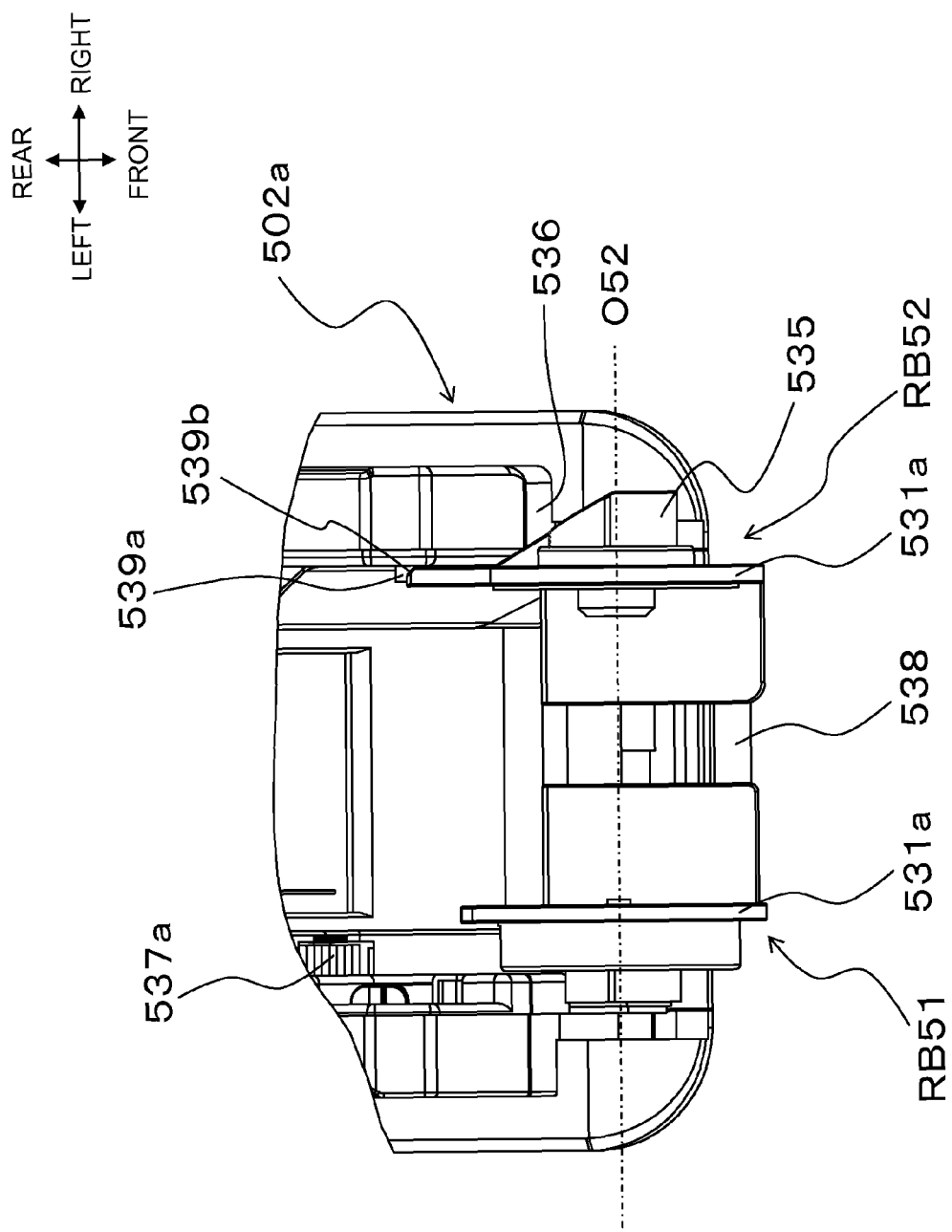
FIG. 42 is a top view for explaining the detailed structure of the support bracket.
Figure 43:
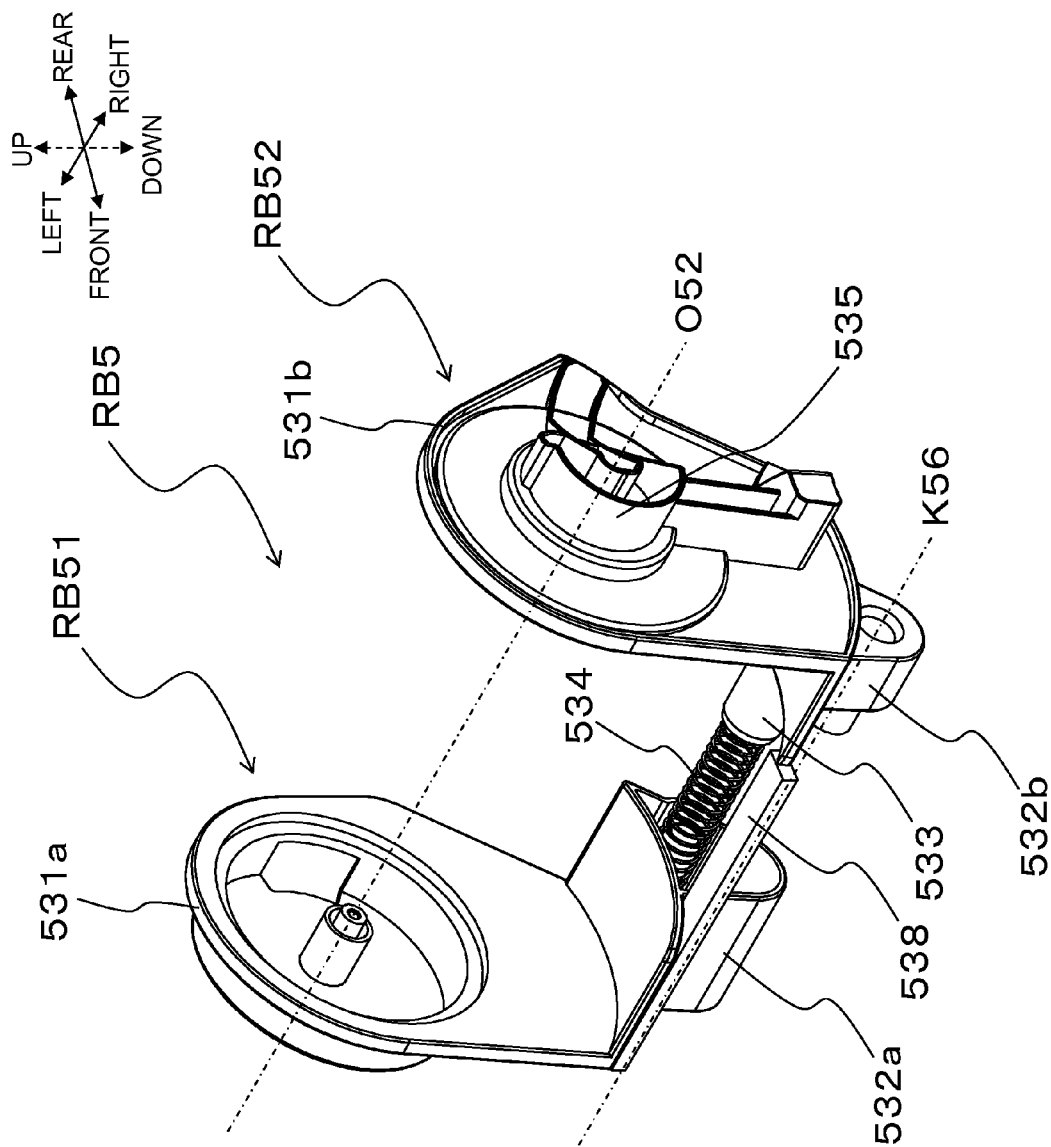
FIG. 43 is a perspective view for explaining the detailed structure of the support bracket.
Figure 44:
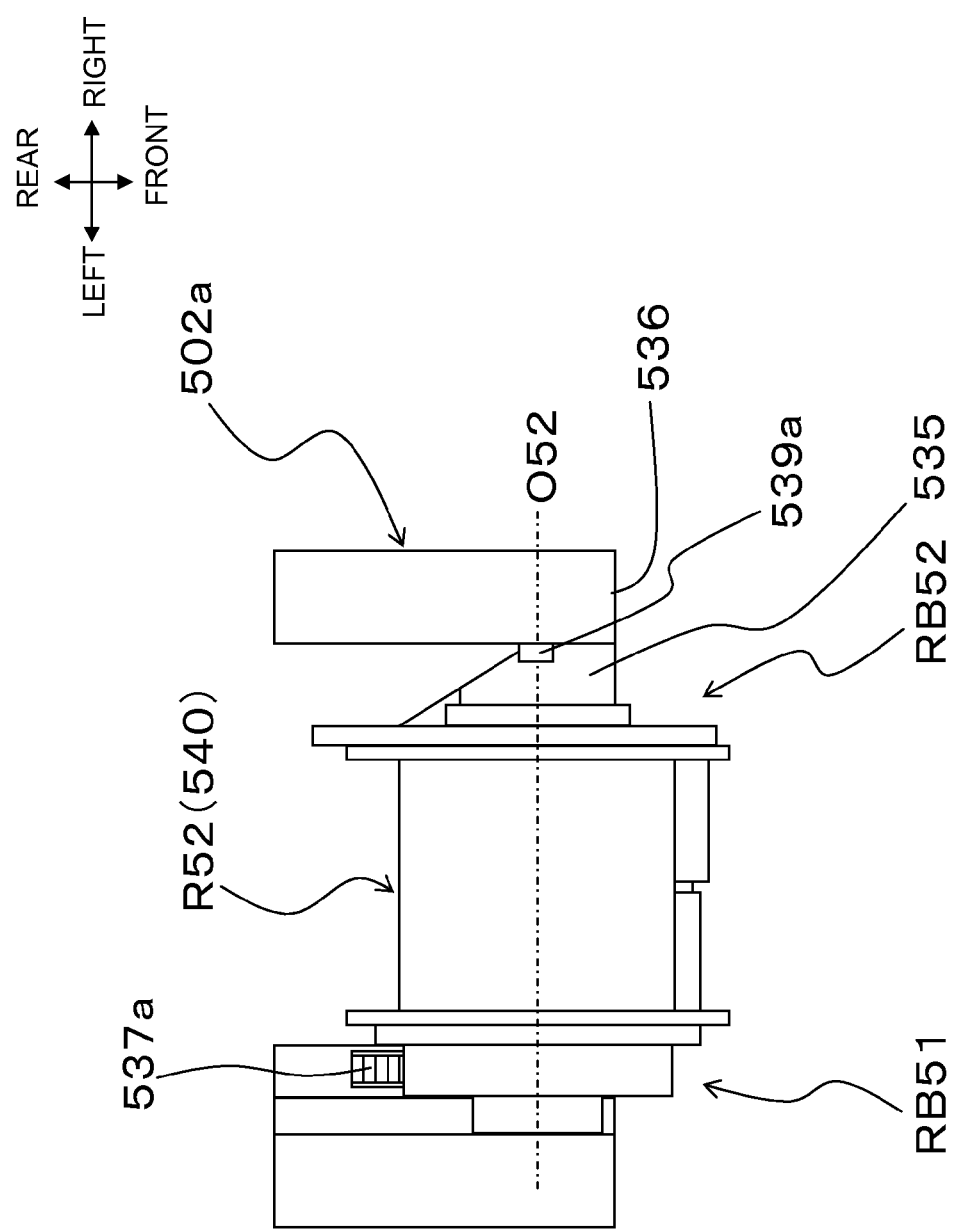
FIG. 44 is a top view for explaining the behavior of the support bracket.
Figure 45:
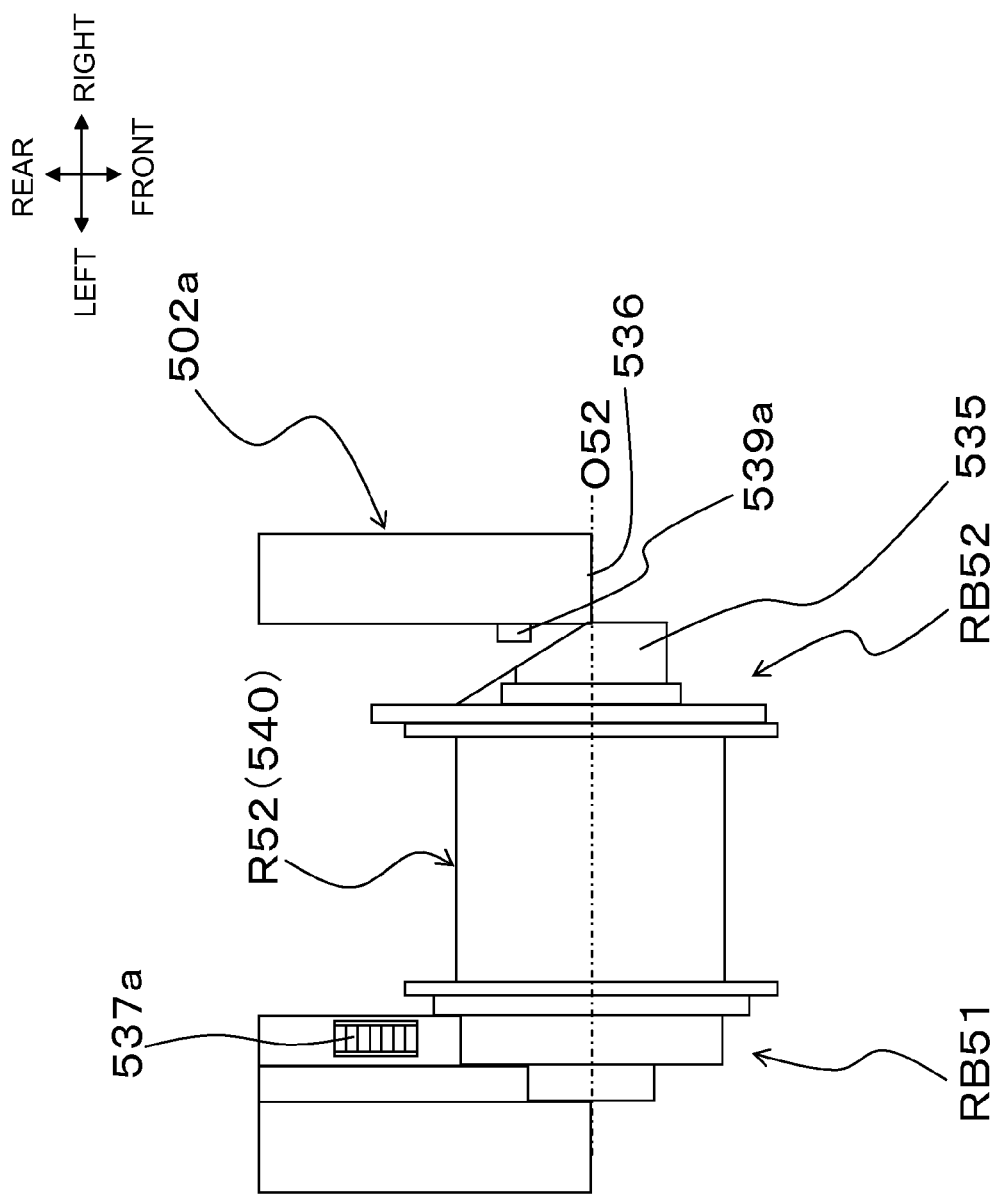
FIG. 45 is a top view for explaining the behavior of the support bracket.
Figure 46:
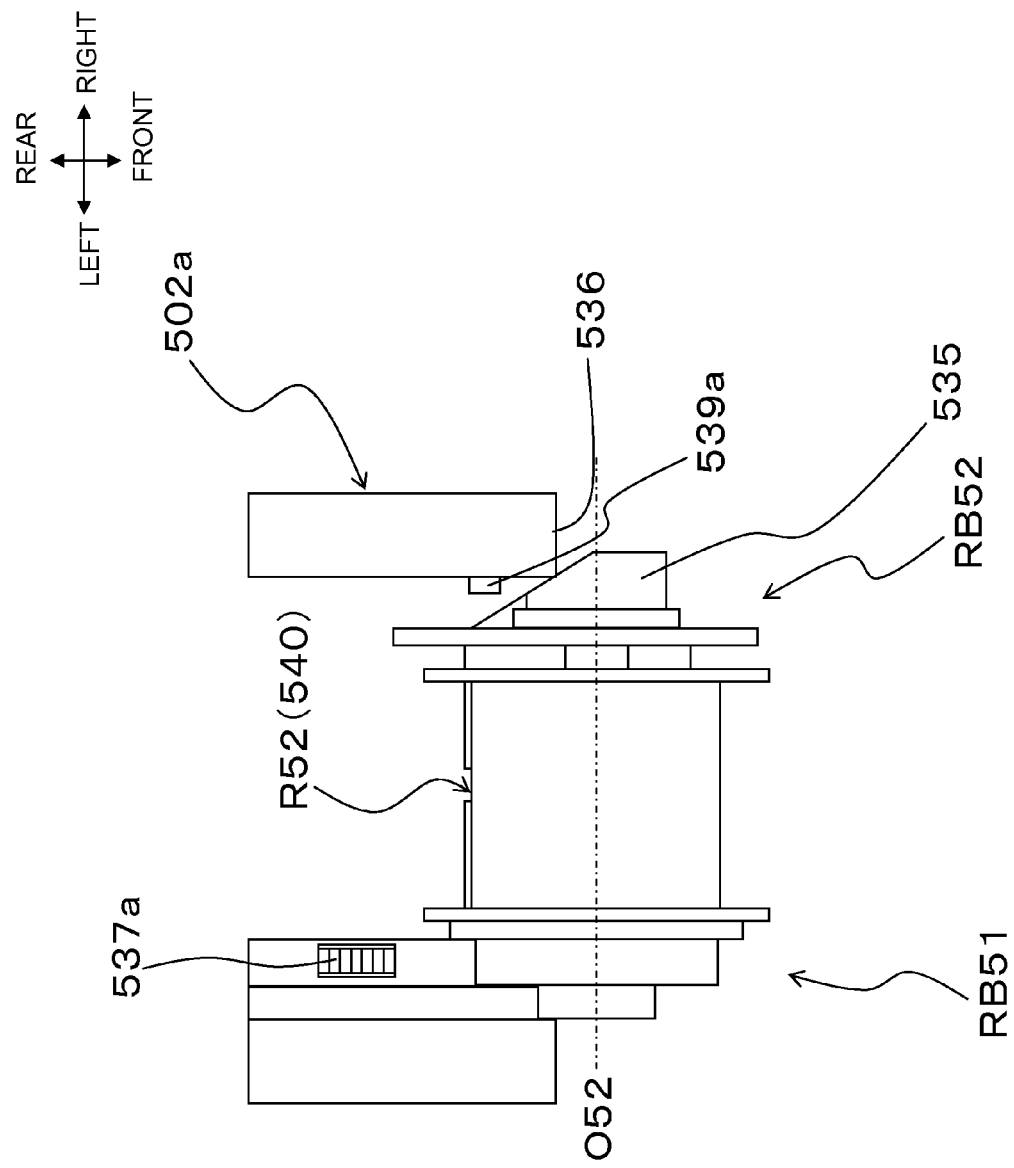
FIG. 46 is a top view for explaining the behavior of the support bracket.
Figure 47:
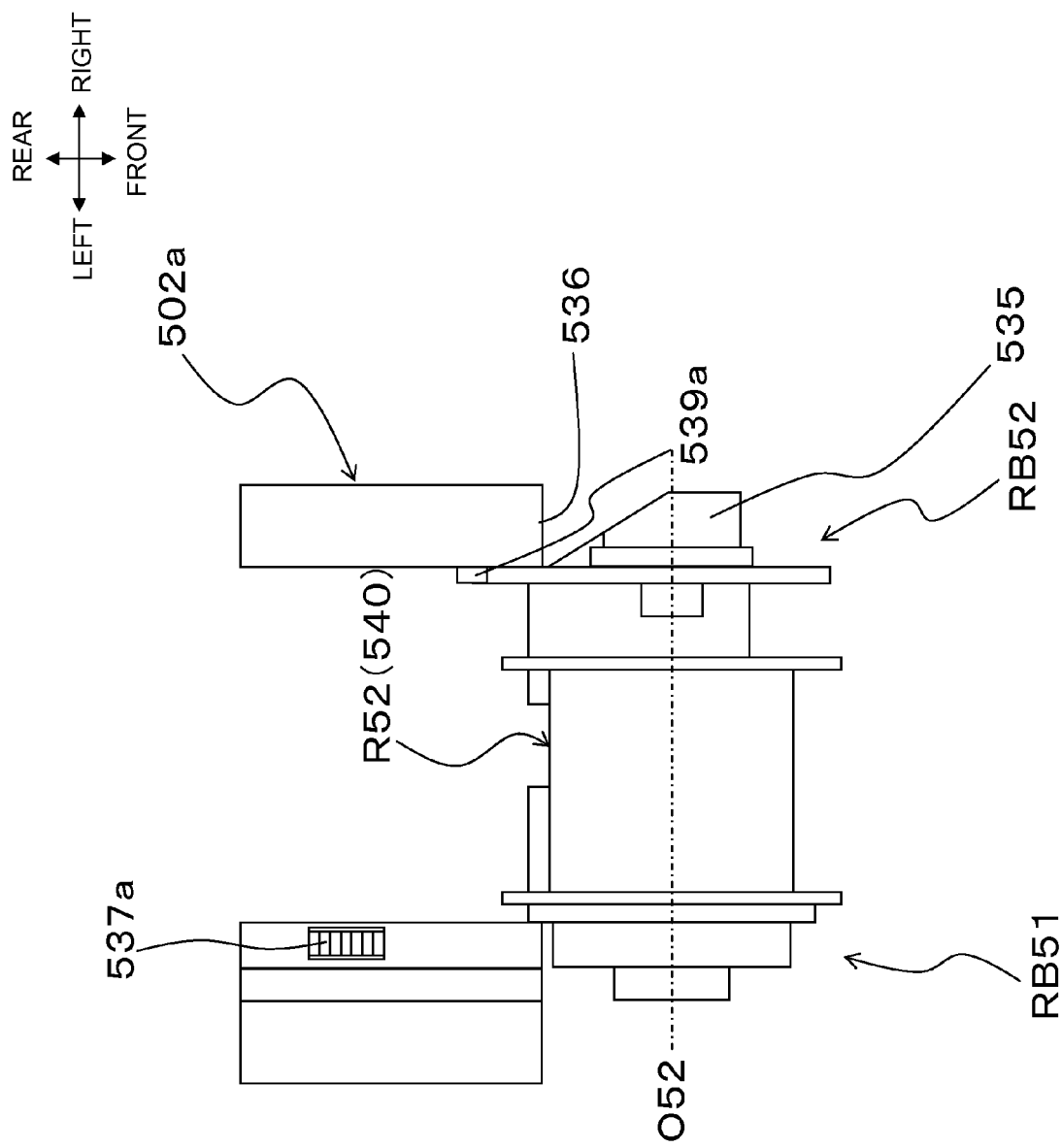
FIG. 47 is a top view for explaining the behavior of the support bracket.

As a result of such an above described mode of use, as shown in FIG. 36, when the adhesive tape cartridge TK5 is not used (or when the history of usage is short), a large amount of the print-receiving adhesive tape 150 not yet fed out remains on the first roll R51 and the separation material layer 151 is substantially not wound (or not very much wound) around the third roll R53. Accordingly, in this state, the first roll R51 side becomes heavier in terms of the weight distribution of the entire adhesive tape cartridge TK5, and a center of gravity CG of the adhesive tape cartridge TK5 is positioned on the first roll R51 side. Then, as shown in FIG. 37, after the adhesive tape cartridge TK5 is used for a relatively long period of time (when the history of usage of the adhesive tape cartridge TK5 is long), the amount of the print-receiving adhesive tape 150 that has not yet been fed out and remains on the first roll R51 decreases, and the amount of the separation material layer 151 wound around the third roll R53 increases. Accordingly, in this state, the third roll R53 side becomes heavier in terms of the weight distribution of the entire adhesive tape cartridge TK5, and the center of gravity CG of the adhesive tape cartridge TK5 is positioned on the third roll R53 side.

As described above, in this embodiment, the weight balance between the first roll R51 side and the third roll R53 side changes according to the length of history of usage of the adhesive tape cartridge TK5. As a result, when the adhesive tape cartridge TK5 is handled and the operator holds a section of the first roll R51 side and a section of the third roll R53 side using both hands, the above described weight balance differs according to the length of the history of usage of the adhesive tape cartridge TSK, making handling difficult.

Here, according to this embodiment, a pair of left and right handle parts 525, 525 is extended along the front-rear direction on the rearward side (first roll R51 side) of the connecting arm 516 that connects the first roll R51 and the third roll R53, each disposed on the respective left or right side, as shown in FIGS. 33-35. Specifically, the handle parts 525, 525 are disposed so that they respectively protrude outward along the right-left direction from the first bracket parts 520, 520 positioned on both left and right sides of rearward side of the connecting arm 516. Accordingly, when the adhesive tape cartridge TK5 is to be lifted, the operator may grip the handle parts 525, 525 that respectively protrude in the left-right direction from the first bracket parts 520, 520 using the left hand and the right hand, respectively, with the first roll R51 and the third roll R53 positioned in the front-rear direction.

Then, further, according to this embodiment, the rearward side ends of handle parts 525, 525 comprise slip preventing parts 525*a*, 525*a* that prevent slipping at the time of gripping. Accordingly, when gripping the handle parts 525, 525, the operator may support the gripping by pinching the slip preventing parts 525*a*, 525*a* between the fingertips of the left hand and right hand, respectively.

At this time, the slip preventing parts 525*a*, 525*a* are disposed so that the position of the first roll R51 in the radial direction is further on the inside in the radial direction than the first connecting part 522 disposed to prevent interference with the outer diameter of the first roll R51, and are configured so that the dimension of the first roll R51 along the radial direction is larger than the dimensions of the other areas of the handle parts 525, 525.

Here, due to the difference in weight balance of the entire adhesive tape cartridge TK5 based on the length of the history of usage thereof, the angle of inclination of the adhesive tape cartridge TK5 may vary when the operator grips the handle parts 525, 525 and lifts the adhesive tape cartridge TK5. For example, the angle of inclination of the adhesive tape cartridge TK5 is relatively gentle in the example shown in FIG. 36 which corresponds to a state of non-use (or a short history of usage) of the adhesive tape cartridge TK5, and conversely quite sharp in the example shown in FIG. 37 which corresponds to a state after relatively long use of the adhesive tape cartridge TK5 (a long history of usage of the adhesive tape cartridge TK5). Here, according to this embodiment, the slip preventing parts

525a, 525a are substantially partially arcuate in shape when viewed in the left-right direction.

Head Holder

In FIG. 33, FIG. 34, FIG. 38, and FIG. 39, according to this embodiment, the head holder 510 disposed on the first opening/closing arm 506 comprises the above described print head 511, the above described ribbon take-up roller 515, and a pivoting member 527. Note that, in FIG. 34, the head holder 510 disposed on the first opening/closing arm 506 and the platen roller 512 disposed on the housing main body 502a are shown along with the adhesive tape cartridge TK5 as well. Further, FIG. 38 corresponds to a case where the first opening/closing arm 506 is open, and FIG. 39 corresponds to a case where the first opening/closing arm 506 is closed. Further, FIG. 38A and FIG. 39A show the left lateral side of the head holder 510, and FIG. 38B and FIG. 39B show the right lateral side of the head holder 510.

The print head 511, as described above, is capable of relatively approaching or separating from the above described platen roller 512 by the pivoting of the first opening/closing arm 506 around the above described pivot axis K51. That is, the print head 511 approaches the platen roller 512 when the first opening/closing arm 506 is closed, and separates from the platen roller 512 when the first opening/closing arm 506 is open.

The pivoting member 527 is capable of pivoting around a predetermined pivot axis K57 (refer to FIG. 38 and the like) disposed near the print head 511, and comprises a head cover part 527b disposed near the print head 511, and a pair of left and right side plate parts 527a, 527a that are substantially shaped like the numeral 3, each disposed on the respective left or right side of the head cover part 527b.

The head cover part 527b is configured so that it protects the platen roller 512 side of the print head 511 when the print head 511 is separated from and exposes the platen roller 512, and recesses from and exposes the platen roller 512 side of the print head 511 when the above described print formation is executed. Specifically, the head cover part 527b is capable of switching between a covering position (the states in FIG. 38A and FIG. 38B) in which it covers the platen roller 512 side of the print head 511, and an exposing position (the states in FIG. 39A and FIG. 39B) in which it exposes the platen roller 512 side of the print head 511, by the pivoting of the entire pivoting member 527 around the above described pivot axis K57.

At this time, an extension coil spring 529 is disposed on the left lateral side of the head holder 510. The extension coil spring 529 causes an urging force urged in an arrow z direction to act on the side plate part 527a on the leftward side.

The side plate parts 527a, 527a are capable of pivoting around the pivot axis K57. Further, edge parts 527c, 527c of the side plate parts 527a, 527a are capable of receiving a force from a shaft part 512a of the platen roller 512 that is generated in association with the relative approaching movement of the platen roller 512 and the print head 511 in tandem with the opening/closing movement of the first opening/closing arm 506 (specifically, generated by the approach between the platen roller 512 and the print head 511 resulting from the closing movement of the first opening/closing arm 506). That is, when the first opening/closing arm 506 is closed, the edge parts 527c, 527c of the side plate parts 527a, 527a are pressed from the upward side by the shaft part 512a of the platen roller 512 to the upward side.

Then, in accordance with whether or not the edge parts 527c, 527c of the side plate parts 527a, 527a receive a force from the shaft part 512a of the platen roller 512, the entire pivoting member 527 is selectively pivoted to either a state in which the head cover part 527b is in a covering position or a state in which the head cover part 527b is in an exposing position.

That is, as shown in FIG. 38, when the first opening/closing arm 506 is open and the edge parts 527c, 527c of the side plate parts 527a, 527a do not receive a force from the shaft part 512a of the platen roller 512, the urging force of the extension coil spring 529 causes the entire pivoting member 527 to be in a state in which the head cover part 527b is in the covering position.

Then, as shown in FIG. 39, when the first opening/closing arm 506 is closed, the edge parts 527c, 527c of the side plate parts 527a, 527a receive a force from the shaft part 512a of the platen roller 512 and resist the urging force of the extension coil spring 529, causing the entire pivoting member 527 to pivot to a state in which the head cover part 527b is in the exposing position. Note that, when pivoted to the exposing position as described above, the head cover part 527b is inserted and disposed so as to enter a space that is generated between the print head 511 and the above described ribbon take-up roller 515.

Subsequently, as shown in FIG. 38, when the first opening/closing arm 506 is changed to an open state once again, the edge parts 527c, 527c of the side plate parts 527a, 527a do not receive a force from the shaft part 512a of the platen roller 512, causing the urging force of the extension coil spring 529 to pivot the entire pivoting member 527 to a state in which the head cover part 527b is in the covering position.

Further, at this time, a limit switch SW for detecting the opening and closing of the first opening/closing arm 506 is disposed on the right lateral side of the head holder 510. The limit switch SW comprises a rotating lever 528 capable of switching between an open detection position (the state in FIG. 38B) that detects that the first opening/closing arm 506 is open, and a closed detection position (the state in FIG. 39B) that detects that the first opening/closing arm 506 is closed.

That is, when the first opening/closing arm 506 is closed, the rotating lever 528 is positioned in the closed detection position, as shown in FIG. 38. In this case, the limit switch SW detects that the first opening/closing arm 506 is closed. Then, when the first opening/closing arm 506 changes to an open state, the rotating lever 528 is pressed to the upward side by the side plate part 527a on the rightward side, rotating to the open detection position, as shown in FIG. 39. In this case, the limit switch SW detects that the first opening/closing arm 506 is open.

Support Bracket

In FIG. 33 and FIGS. 40-47, the support bracket RB5, as described above, pivotably supports the second roll R52, around which is wound the adhesive tape 150" with print, around the axis O52 on the core member 540. Note that, in FIGS. 40-43, the second roll R52 is not shown. Further, the support bracket RB5 is capable of pivoting from the closed position where the second roll R52 is not attachable or detachable, to the open position where the second roll R52 is attachable and detachable. Then, similar to the above described embodiment 1, when the support bracket RB5 is positioned in the closed position, the second roll R52 (the core member 540) rotates, executing the above described print formation and winding the adhesive tape 150" with print around the core member 540.

At this time, the support bracket RB5, similar to the above described embodiment 1, comprises a first bracket RB51 and a second bracket RB52. The first bracket RB51 and the second bracket RB52 are respectively disposed facing each other on both left and right sides along the axis O52 direction, which is the axial direction of the second roll R52, sandwiching the second roll R52, and are capable of approaching or separating from each other along the left-right direction. In this example, only the second bracket RB52 is movable in the left-right direction, and the left-right direction position of the first bracket RB51 is fixed. Further, a reinforcing plate 538 (refer to FIGS. 41-43) capable of connecting the lower areas of the first bracket RB51 and the second bracket RB52 is disposed on the support bracket RB5.

The first bracket RB51 comprises a substantially circular-shaped circular part 531*a* and a base part 532*a* that bulges from the circular part 531*a* in the radial direction, and the second bracket RB52 comprises a substantially circular-shaped circular part 531*b* and a base part 532*b* that bulges from the circular part 531*b* in the radial direction.

A compression spring 534 is disposed on the inside of the base part 532*a* of the first bracket RB51 (the side facing the base part 532*b* of the second bracket RB52). The compression spring 534 causes an urging force urged in the direction in which the first bracket RB51 and the second bracket RB52 separate from each other (in this example, in the direction in which the second bracket RB52 separates from the first bracket RB51) to act on a spring seat 533 disposed on the inside of the base part 532*b* of the second bracket RB52 (the side facing the base part 532*a* of the first bracket RB51).

According to this embodiment, an inclined cam part 535 is disposed on the outside of the circular part 531*b* of the second bracket RB52 (the side opposite the side facing the base part 532*a* of the first bracket RB51). With the pivoting of the support bracket RB5 (the first bracket RB51 and the second bracket RB52) from the open position toward the closed position, the inclined cam part 535 resists the urging force of the compression spring 534 and receives a force that makes the first bracket RB51 and the second bracket RB52 approach each other (in this example, a force that makes the second bracket RB52 approach the first bracket RB51) from a wall part 536 of the housing main body 502*a*. That is, with the pivoting of the support bracket RB5 from the open position toward the closed position, the inclined cam part 535 is pressed to the leftward side by the wall part 536 of the housing main body 502*a*.

With the above described configuration, when the operator pivots the support bracket RB5 from the closed position toward the open position, the urging force of the compression spring 534 causes the first bracket RB51 and the second bracket RB52 to relatively move in directions of separation from each other (in this example, the second bracket RB52 moves in a direction of separation from the first bracket RB51) as the support bracket RB5 pivots from the closed position toward the open position (as the mode of the support bracket RB5 transitions to those in FIG. 44, FIG. 45, FIG. 46, and FIG. 47). With this arrangement, with the support bracket RB5 positioned in the open position (the states in FIG. 33, FIGS. 40-42, and FIG. 47), the second roll R52 (the core member 540) becomes attachable and detachable from the space between the first bracket RB51 and the second bracket RB52 separated as described above.

On the other hand, when the second roll R52 (the core member 540) is newly mounted, for example, and the operator pivots the support bracket RB5 from the open position to the closed position after disposing the second roll R52 (the core member 540) between the first bracket RB51 and the second bracket RB52 separated as described above, a force such as one that resists the urging force of the compression spring 534 acts on the second bracket RB52 due to the force received by the inclined cam part 535 from the wall part 536 of the housing main body 502*a* as the support bracket RB5 pivots from the open position toward the closed position (as the mode of the support bracket RB5 transitions to those in FIG. 47, FIG. 46, FIG. 45, and FIG. 44), thereby relatively moving the first bracket RB51 and the second bracket RB52 in directions of approaching each other (in this example, moving the second bracket RB52 in a direction of approaching the first bracket RB51). With this arrangement, in the state in which the support bracket RB5 is positioned in the closed position (the state in FIG. 44), the second roll R52 (the core member 540) is mounted in a non-detachable state.

Further, in the state in which the support bracket RB5 is positioned in the closed position (the state in FIG. 44), the driven gear 537*b* (refer to FIG. 40) disposed on the first bracket RB51 fits together with a drive transmitting gear 537*a* disposed on the frontward side and the leftward side of the housing main body 502*a*. Further, the drive transmitting gear 537*a* is connected in operation to an output shaft (not shown) of the aforementioned take-up motor M53 via a gear mechanism disposed on the frontward side of the housing main body 502*a*. As a result, the driving force generated by the take-up motor M53 is transmitted to the first bracket RB51 via the gear mechanism, the drive transmitting gear 537*a*, and the driven gear 537*b* disposed on the frontward side of the housing main body 502*a*, in a state in which the support bracket RB5 is positioned in the above described closed position. Then, the above described driving force transmitted to the first bracket RB51 is transmitted to the second roll R52 (the core member 540) mounted between the first bracket RB51 and the second bracket RB52, thereby rotationally driving the second roll R52 (the core member 540).

Further, when the support bracket RB5 (the first bracket RB51 and the second bracket RB52) pivots from the closed position and arrives at the open position (in the states in FIG. 33, FIGS. 40-42, and FIG. 47), a concave part 539*b* disposed on the edge part of the circular part 531*b* of the second bracket RB52 engages with a protrusion 539*a* disposed on the frontward side and the rightward side of the housing main body 502*a*, and the above described reinforcing plate 538 butts against the surface on the inside of the second opening/closing arm 507 (refer to FIG. 33), thereby preventing the support bracket RB5 from pivoting any further.

Core Member 540

Figure 48:
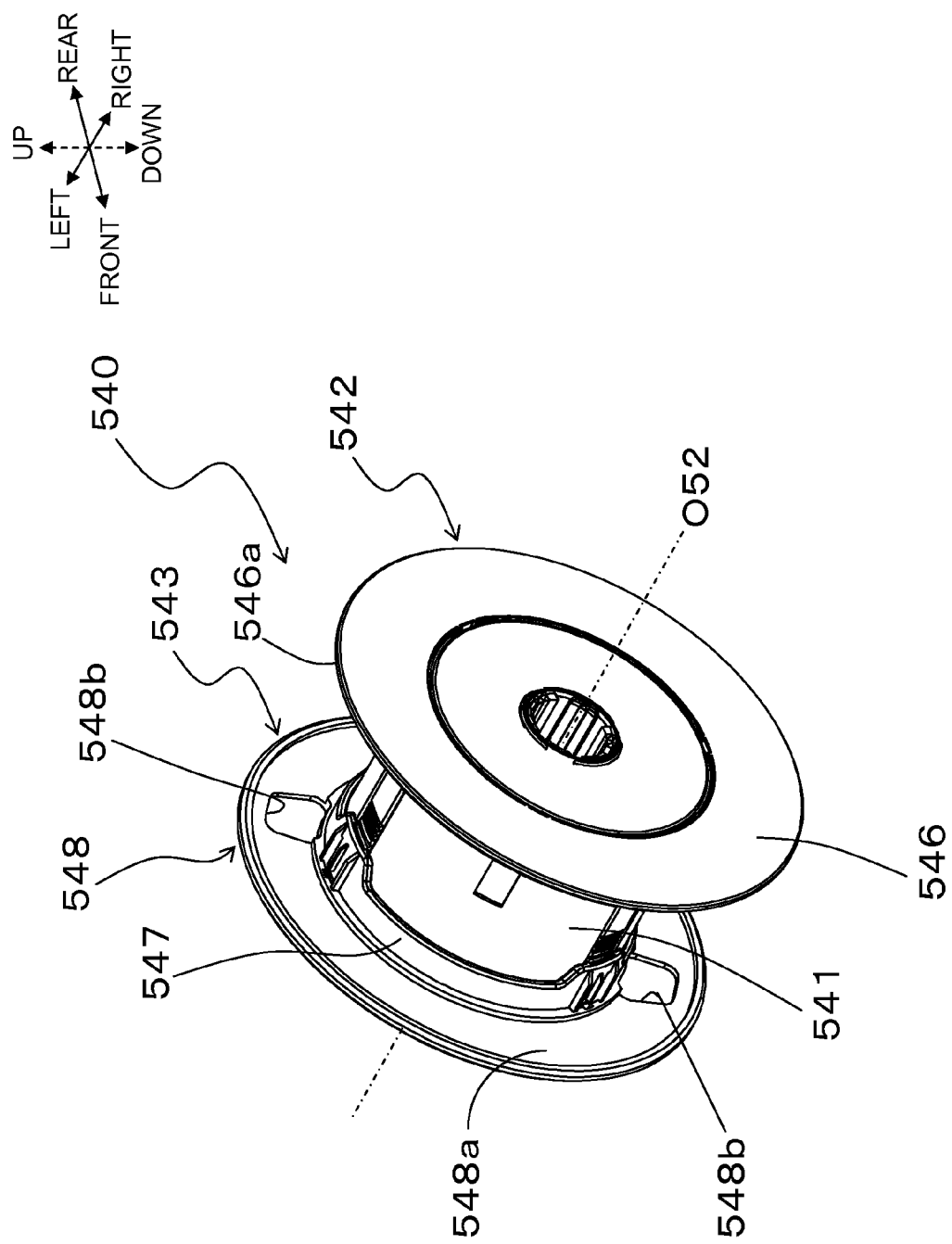
FIG. 48 is a perspective view showing the outer appearance of the core member.
Figure 49:
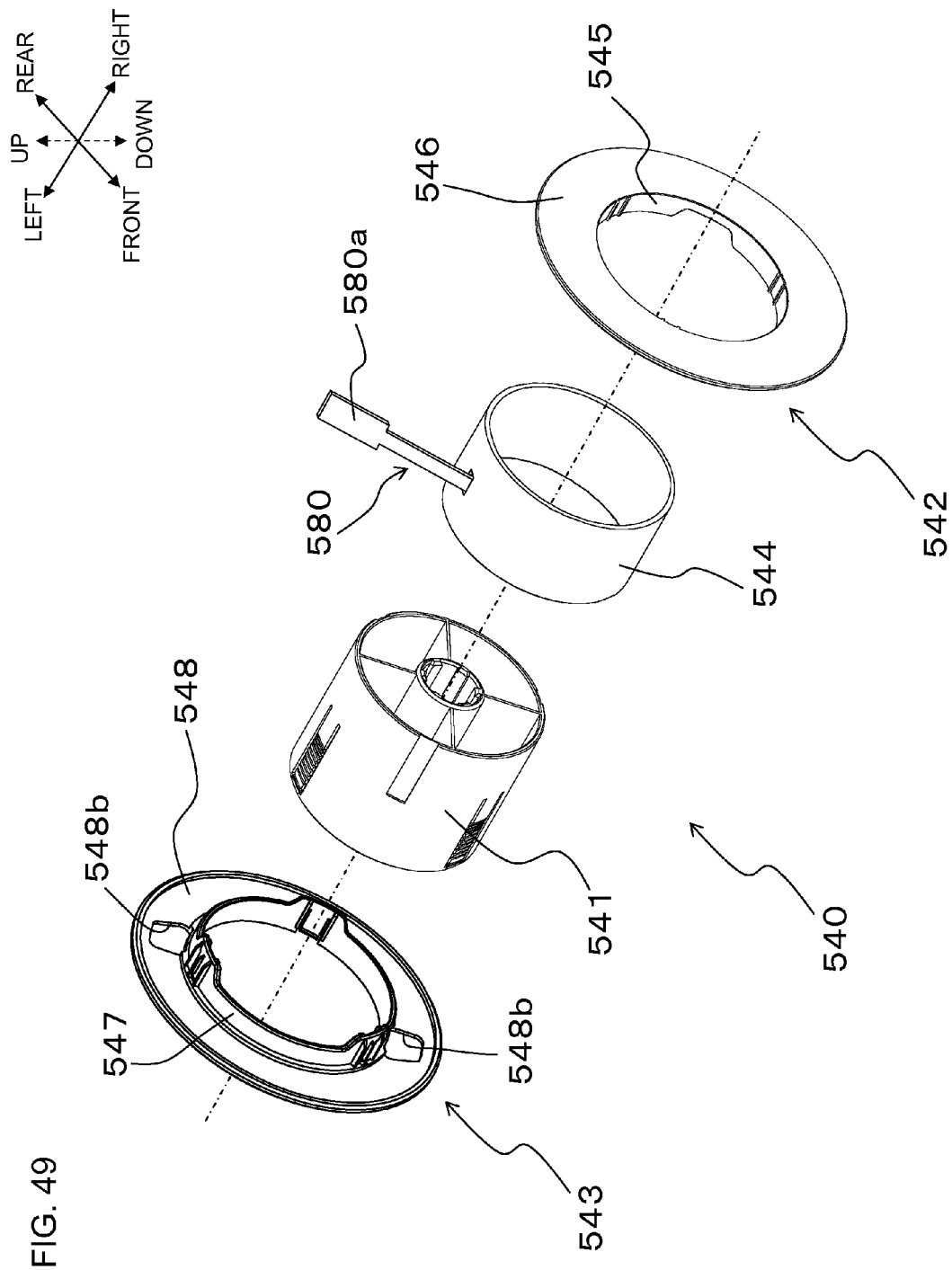
FIG. 49 is an exploded perspective view of the core member.
Figure 50:
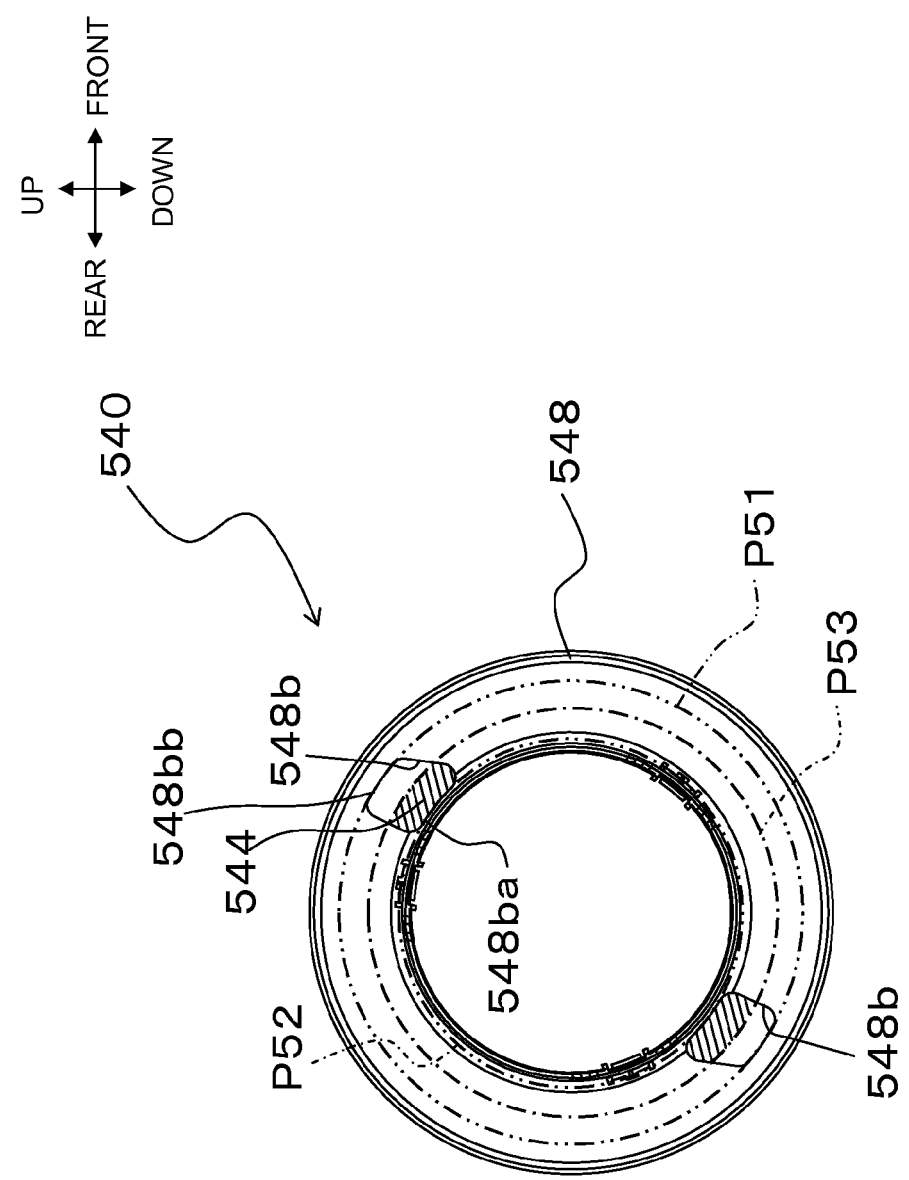
FIG. 50 is a left side view showing the outer appearance of the core member.

In FIGS. 48-50, the core member 540 comprises a substantially cylindrical inner cylinder 541, a first outer cylinder 542, and a second outer cylinder 543, with the above described axis O52 serving as the axis.

The first outer cylinder 542 is mounted to the outer circumference side of one side end (specifically, the right end) of the inner cylinder 541 along the axial direction (that is, the left-right direction, which is the direction of the axis O52). This first outer cylinder 542 comprises a substantially cylindrical first cylinder part 545, and a substantially annular first flange part 546 integrally formed on the right end of the first cylinder part 545.

The second outer cylinder 543 is mounted to the outer circumference side of the other side end (specifically, the left end) of the inner cylinder 541 along the axial direction (that is, the left-right direction, which is the direction of the axis O53). This second outer cylinder 543 comprises a substantially cylindrical second cylinder part 547, and a substantially annular second flange part 548 integrally formed on the left end of the second cylinder part 547.

That is, with the first outer cylinder 542 and the second outer cylinder 543 mounted to the inner cylinder 541, the first flange part 546 and the second flange part 548 are disposed facing each other, forming a space between the first flange part 546 and the second flange part 548 capable of receiving the above described adhesive tape 150″ with print.

Further, with the first outer cylinder 542 and the second outer cylinder 543 mounted to the inner cylinder 541, the first cylinder part 545 and the second cylinder part 547 are extended substantially along the axis O52 so as to connect the first flange part 546 and the second flange part 548, and a substantially cylindrical paper core 544 is mountable to the outer circumference side of the first cylinder part 545 and the second cylinder part 547 (in other words, in the space between the first flange part 546 and the second flange part 548). The paper core 544 is a member for winding the adhesive tape 150″ with print generated by the peeling of the separation material layer 151 from the adhesive tape 150′ with print at the aforementioned peeling part 517 around the outer circumference side so that the tape width direction is in the left-right direction. Note that FIG. 48 shows a state in which the paper core 544 is not mounted to the outer circumference side of the first cylinder part 545 and the second cylinder part 547, and FIG. 49 shows a state in which the adhesive tape 150″ with print is not wound around the outer circumference side of the paper core 544.

An example of the procedure for fabricating the core member 540 will now be described. That is, when the core member 540 is fabricated, first the second cylinder part 547 of the second outer cylinder 543 is mounted to the outer circumference side of the left end of the inner cylinder 541. At this point in time, the paper core 544 is not yet mounted to the outer circumference side of the second cylinder part 547, and the second outer cylinder 543 that includes the second flange part 548 is movable in the left-right direction. Then, the second outer cylinder 543 is moved in the left-right direction so that it corresponds to the width direction dimension of the paper core 544, and the paper core 544 is mounted to the outer circumference side of the second cylinder part 547 while the left end is positioned by the second flange part 548 so that the left end contacts a right end surface 548a of the second flange part 548 of the second outer cylinder 543. When the paper core 544 is mounted to the outer circumference side of the second cylinder part 547, the second outer cylinder 543 that includes the second flange part 548 becomes fixed to the outer circumference side of the inner cylinder 541 and is no longer movable in the left-right direction. Then, the first outer cylinder 542 that includes the first flange part 546 is removably attached to the outer circumferential part of the right end of the inner cylinder 541 where the paper core 544 exists on the outer circumference side. At this time, the right end of the paper core 544 is positioned by the first flange part 546 so that the right end contacts a left end surface 546a of the first flange part 546 of the first outer cylinder 542. Thus, the core member 540 is fabricated.

Then, when the core member 540 is stored in the aforementioned second storage part 504 in a state where it is mounted in a manner supported by the above described support bracket RB5, take-up of the above described adhesive tape 150″ with print is performed. That is, the entire core member 540 rotates around the axis O52 while the adhesive tape 150″ with print is sequentially wound around the outer circumference side of the paper core 544. With this arrangement, the adhesive tape 150″ with print is sequentially wound around and layered on the outer circumference side of the paper core 544, forming the second roll R52. At this time, to streamline the start of the winding movement such as described above, a leader tape 580 is disposed on the paper core 544 (refer to FIG. 49). A substantially snake-head shaped (the shape is not limited thereto) tip end part 580a of the leader tape 580 is extended outward from the paper core 544. The adhesive layer 152 included in the adhesive tape 150″ with print is adhered and connected to this tip end part 580a (refer to FIG. 34). With this arrangement, the entire core member 540 that includes the paper core 544 rotates around the axis O52, thereby causing the adhesive tape 150″ with print connected to the tip end part 580a of the leader tape 580 to be pulled to the paper core 544 side and be sequentially wound around and layered on the outer circumferential part of the paper core 544, forming the second roll R52. Note that the adhesive layer may be disposed on the above described tip end part 580a in advance. In this case, a tape that does not comprise an adhesive layer on the tape with print itself (a non-adhesive tape with print), such as the above described adhesive tape 150″ with print, can also be wound around the outer circumferential part of the paper core 544 as described above.

Further, at this time, while the second flange part 548 of the above described two flange parts (the first flange part 546 and the second flange part 548) is a structure fixed to the inner cylinder 541, the first flange part 546 is removable from the inner cylinder 541. With this arrangement, when the adhesive tape 150″ with print is sequentially introduced into the space between the above described first flange part 546 and the second flange part 548 and layered on the paper core 544 attached to the first cylinder part 545 and the second cylinder part 547 to form the second roll R52 with the rotation of the core member 540, the first outer cylinder 542 that includes the first flange part 546 is removed from the inner cylinder 541. Then, the second roll R52 is extracted along the left-right direction from the side of the inner cylinder 541 from which the first outer cylinder 542 has been removed.

Here, since the adhesive tape 150″ with print comprises the adhesive layer 152 as described above, adhesive may appear on the roll side surface of the second roll R52 with the adhesive tape 150″ with print layered as described above. In this case, the second roll R52 may stick to the second flange part 548 by the adhesive, causing difficulties in the aforementioned extraction in the left-right direction.

Here, according to this embodiment, open holes 548b, 548b are disposed in two locations facing each other in the radial direction, sandwiching the axis O52, of the substantially annular shape of the second flange part 548. Note that the open hole 548b may be disposed in three or more locations including the two locations of the substantially annular shape of the second flange part 548. At this time, each of the open holes 548b, 548b comprises a radial dimension from a predetermined first radial position P51 to a second radial position P52 further on the inner circumference side, and a predetermined circumferential dimension. The second radial position P52 is set so that it is further on the inner circumference side than an outer diameter position P53 of the paper core 544 mounted to the first cylinder part 545 and the second cylinder part 547; more specifically, so that the second radial position P52 substantially matches the inside end of the second flange part 548 in the radial direction. With this arrangement, as shown in FIG. 50, when the second roll R52 is formed as described above, at least a part of the paper core 544 (the section shaded with diagonal lines in FIG. 50) is exposed in the left-right direction via the open holes 548b, 548b of the above described second flange part 548.

Further, at this time, each of the open holes 548*b*, 548*b* is substantially trapezoidal in shape, with the length of an edge part 548*ba* on the inside in the radial direction longer than the length of an edge part 548*bb* on the outside in the radial direction. Note that each of the open holes 548*b*, 548*b* may be substantially triangular in shape with the length of the edge part of the inside in the radial direction longer than the length of the edge part of the outside in the radial direction.

Adhesive Holding Part

Figure 51:
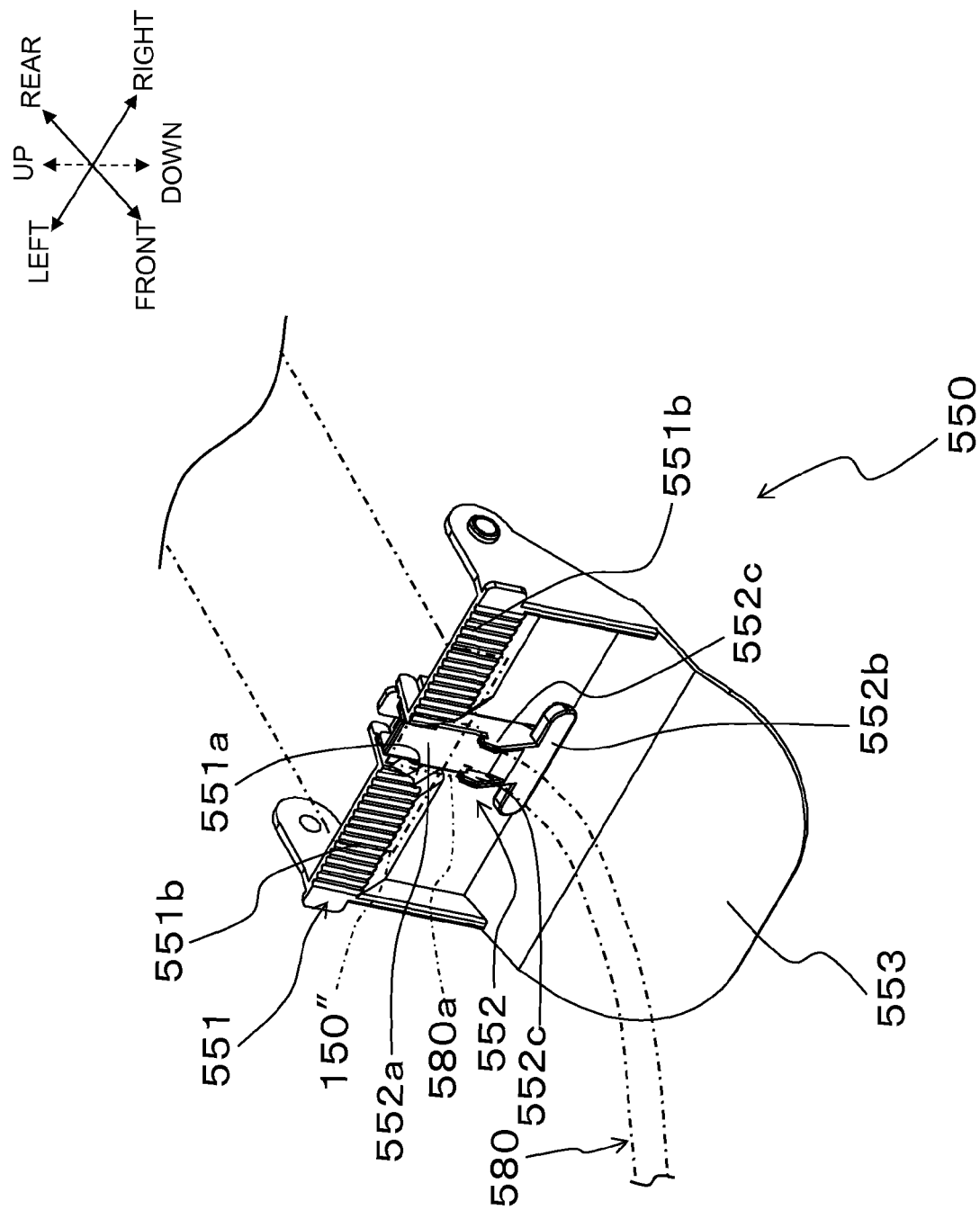
FIG. 51 is a perspective view showing the tape connecting mechanism, which provides the adhesive holding part, the switching member, and the cover part, extracted.

In FIG. 34 and FIG. 51, as described above, similar to the above described embodiment 1, when the adhesive tape cartridge TK5 is mounted to the housing main body 502*a*, the print-receiving adhesive tape 150 is fed out by the rotation of the first roll R51 stored in the first storage part 503 and fed to the frontward side. Then, preferred print is formed on the base layer 153 of the fed print-receiving adhesive tape 150 by the print head 511, thereby forming the adhesive tape 150' with print. The adhesive tape 150' with print on which print has been formed is further fed to the frontward side, and the separation material layer 151 is peeled at the peeling part 517. The peeled separation material layer 151 is fed to the downward side, introduced to the third storage part 505, and taken up and wound inside the third storage part 505, forming the third roll R53. Further, the adhesive tape 150" with print from which the separation material layer 151 has been peeled is further fed to the frontward side, introduced to the second storage part 504, and wound around the outer circumference side of the core member 540 inside the second storage part 504, thereby forming the second roll R52.

Then, when the adhesive tape 150" with print is cut by the aforementioned cutter mechanism, the adhesive tape cartridge TK5 is sometimes removed from the housing main body 502*a* and moved, etc., by the operator. At this time, since the adhesive tape 150" with print is formed by the peeling of the separation material layer 151 from the adhesive tape 150' with print, the adhesive layer 152 is exposed. In this embodiment, a tape connecting mechanism 550 is disposed near the peeling part 517 positioned on the frontward side of the adhesive tape cartridge TK5. Note that the tape connecting mechanism 550 is shown only in FIG. 34 and FIGS. 51-54, and is omitted in other figures.

An adhesive holding part 551 is disposed on the tape connecting mechanism 550 in preparation for cases where the adhesive layer 152 exposed on the above described adhesive tape 150" with print is to be temporarily tacked (reseparably adhered) when the adhesive tape cartridge TK5 is handled as a single unit prior to mounting to the housing main body 502*a* and for cases where the adhesive tape cartridge TK5 is mounted to the housing main body 502*a* to start generation of the second roll R52. The adhesive holding part 551 comprises a concave part 551*a* and adhering parts 551*b*, 551*b* respectively disposed on both left and right sides of the concave part 551*a*.

The concave part 551*a* comprises a width direction dimension that is smaller than the width of the adhesive tape 150" with print and larger than the width of the tip end part 580*a* of the above described leader tape 580. This concave part 551*a* holds the center area of the adhesive layer 152 exposed on the adhesive tape 150" with print that is adhered across the adhering parts 551*b*, 551*b* positioned on both left and right sides of the concave part 551*a* as described later, which is positioned in the width direction substantial center, in a state where it is exposed in the air. At this time, the concave part 551*a* is configured so that it is capable of receiving the tip end part 580*a* of the leader tape 580 extended outward from the above described paper core 544.

The adhering parts 551*b*, 551*b* are subjected to release processing by formation of a serration-shaped protrusion on the surface. These adhering parts 551*b*, 551*b* reseparably adhere and hold both side areas of the adhesive layer 152 exposed on the adhesive tape 150" with print that are positioned on both width direction sides of the above described center area, with both side areas separated from the tip end part 580*a* of the leader tape 580 received by the above described concave part 551*a* in the tape thickness direction.

Further, a substantially T-shaped switching member 552 is attached to the tape connecting mechanism 550. The switching member 552 comprises a sticking part 552*a* so that the sticking part 552*a* is positioned on the concave part 551*a*. On the sticking part 552*a*, the tip end part 580*a* of the leader tape 580 is hooked by and stuck to convex parts 552*c*, 552*c* disposed on both left and right ends of the switching member 552. Further, the switching member 552 is capable of pivoting around a predetermined pivot axis disposed on the tape connecting mechanism 550. Specifically, the switching member 552 is capable of pivoting (switching and moving) between a separated position (the states in FIG. 52 and FIG. 54) and a close contact position (the state in FIG. 53).

The separated position is a position in which the sticking part 552*a* is moved to the side opposite the above described center area side of the adhesive tape 150" with print held in an exposed state by the concave part 551*a*. In this separated position, it is possible to separate the tip end part 580*a* of the leader tape 580 stuck to the sticking part 552*a* and the center area of the above described adhesive tape 150" with print in the tape thickness direction.

The close contact position is a position in which the sticking part 552*a* is moved to the above described center area side of the adhesive tape 150" with print held in an exposed state by the concave part 551*a*. In this close contact position, it is possible to make the tip end part 580*a* of the leader tape 580 stuck to the sticking part 552*a* and the center area of the above described adhesive tape 150" with print approach and come in close contact with each other in the tape thickness direction.

Further, a cover part 553 that hangs down in the shape of an eave is disposed on the tape connecting mechanism 550 to cover the area of the second roll R52 that is on the side of the adhesive tape 150" with print from which the separation material layer 151 has been peeled at the peeling part 517.

Accordingly, in a case where the adhesive layer 152 exposed on the adhesive tape 150" with print is to be temporarily tacked, the operator may adhere the above described both side areas of the adhesive tape 150" with print to the adhering parts 551*b*, 551*b*. Then, in a case where generation of the second roll R52 is to be started, the operator may connect the leader tape 580 and the above described temporarily tacked adhesive tape 150" with print.

Figure 52:
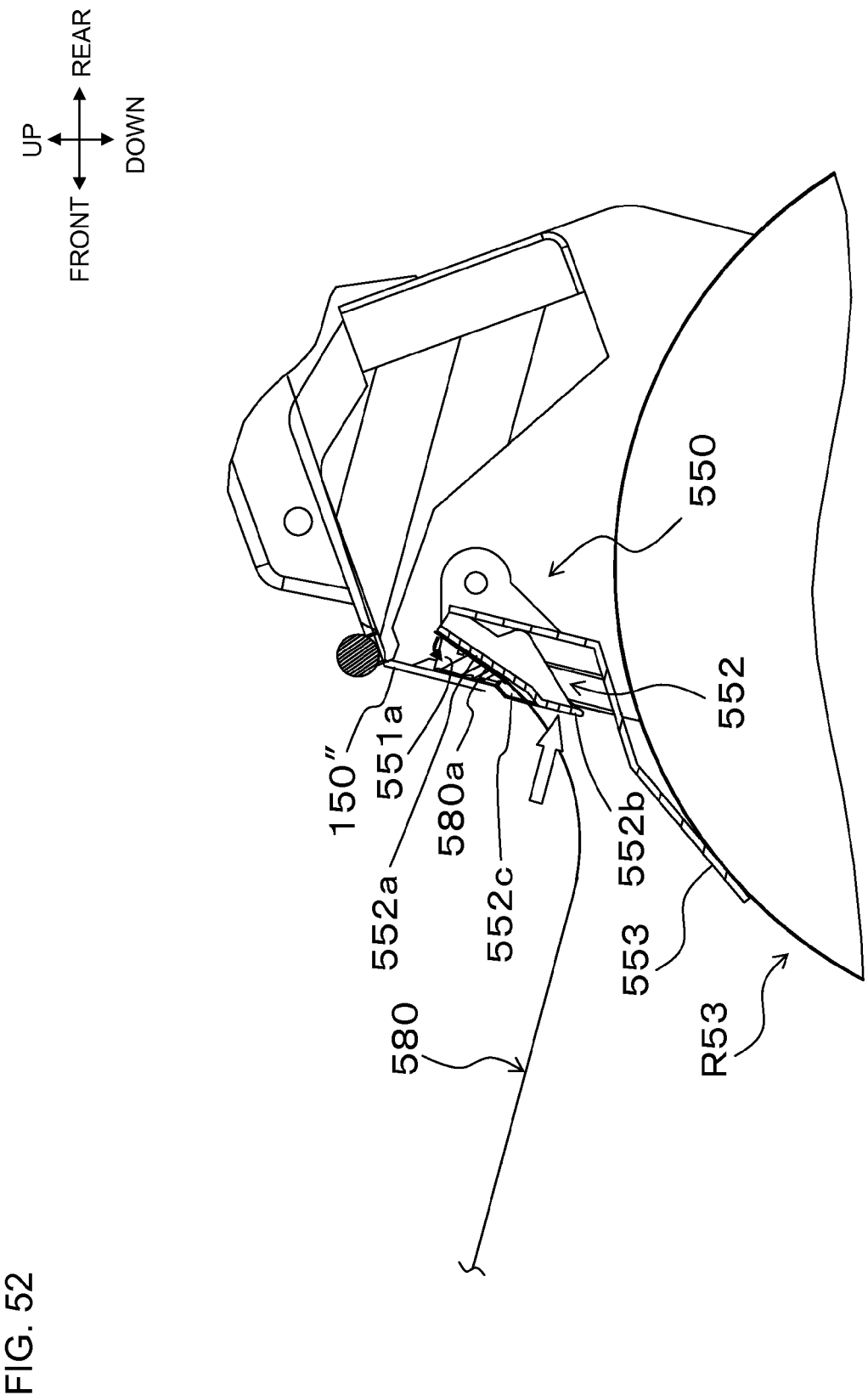
FIG. 52 is an explanatory view for explaining the connecting procedure of the leader tape and adhesive tape with print.

An example of the procedure for connecting the leader tape 580 and the above described temporarily tacked adhesive tape 150" with print will be described with reference to FIGS. 52-54. That is, first, as shown in FIG. 52, the operator hooks the tip end part 580*a* of the leader tape 580 to the convex parts 552*c*, 552*c* of the switching member 552 set in the separated position in advance, sticking the tip end part 580*a* to the sticking part 552*a*, and then switches the switching member 552 to the close contact position (the state in FIG. 53) by pressing a substantially flat plate shaped flat plate part 552*b* (refer to FIG. 51 as well) included on the side opposite the sticking part 552*a* of the switching member 552 using a finger (refer to the white arrow in FIG. 52). With this arrangement, the tip end part 580a of the leader tape 580 stuck to the sticking part 552a is made to approach and come in close contact with the above described center area of the adhesive tape 150" with print (refer to the arrow in FIG. 52). At this time, the flat plate part 552b comprises a width-direction dimension that is larger than the width of the leader tape 580 with the tip end part 580a stuck to the sticking part 552a (refer to FIG. 51), enabling the operator to press the flat plate part 552b using a finger without contacting the leader tape 580.

Figure 53:
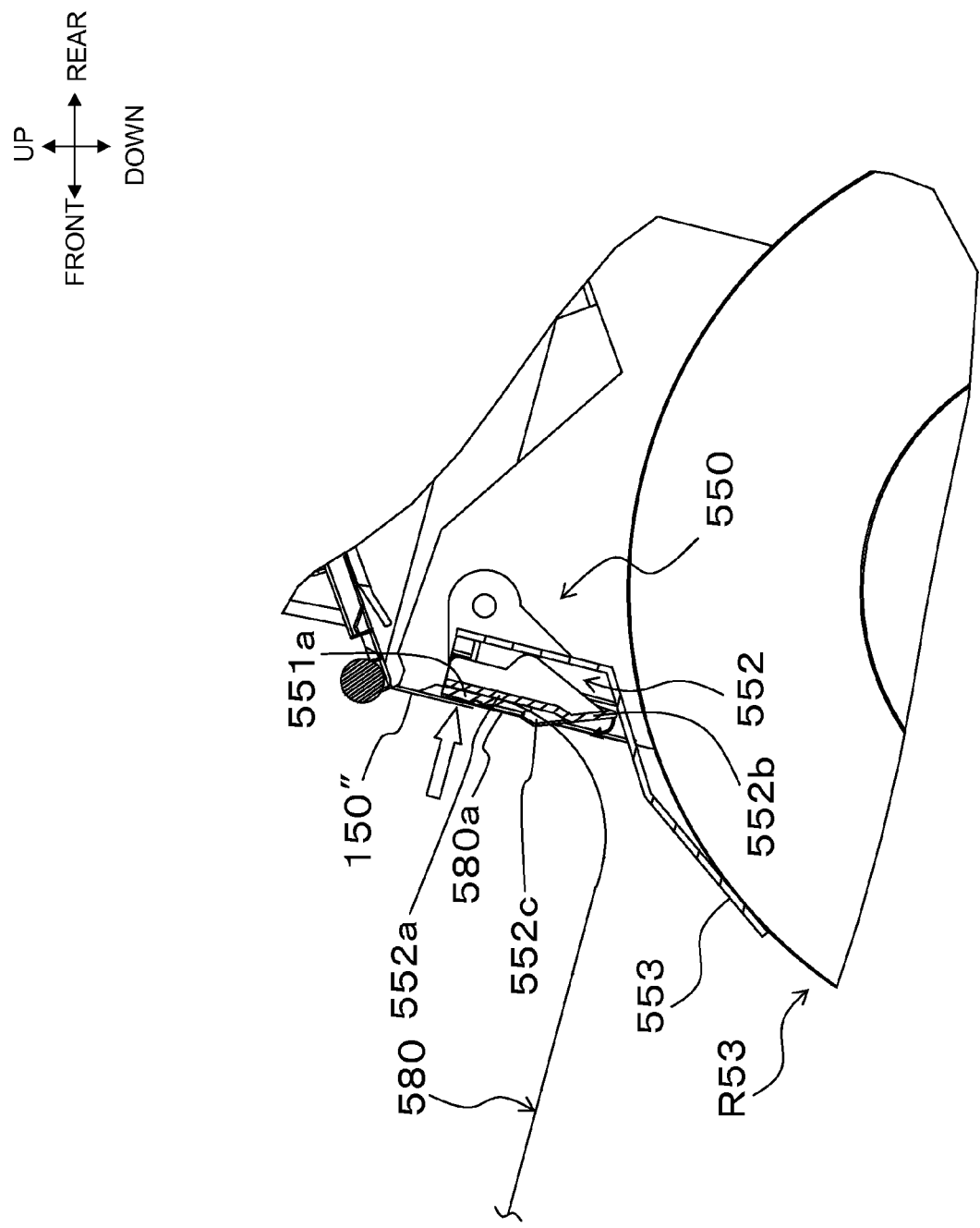
FIG. 53 is an explanatory view for explaining the connecting procedure of the leader tape and adhesive tape with print.

Subsequently, as shown in FIG. 53, the operator switches the switching member 552 to the separated position (the state in FIG. 54) by pressing the sticking part 552a of the switching member 552 from above the above described center area of the adhesive tape 150" with print using a finger (refer to the white arrow in FIG. 53). At this time, the above described center area of the adhesive tape 150" with print pressed to the leader tape 580 side bends to the leader tape 580 side and adheres to the tip end part 580a of the leader tape 580 by the adhesive of the center area. With this arrangement, the leader tape 580 and the adhesive tape 150" with print are connected. Further, at this time, if the switching member 552 is designed to produce a noise when switched from the close contact position to the separated position, it is possible to notify the operator that the switching member 552 has been switched from the close contact position to the separated position, in other words, that the tip end part 580a of the leader tape 580 and the above described center area of the adhesive tape 150" with print are adhered.

Figure 54:
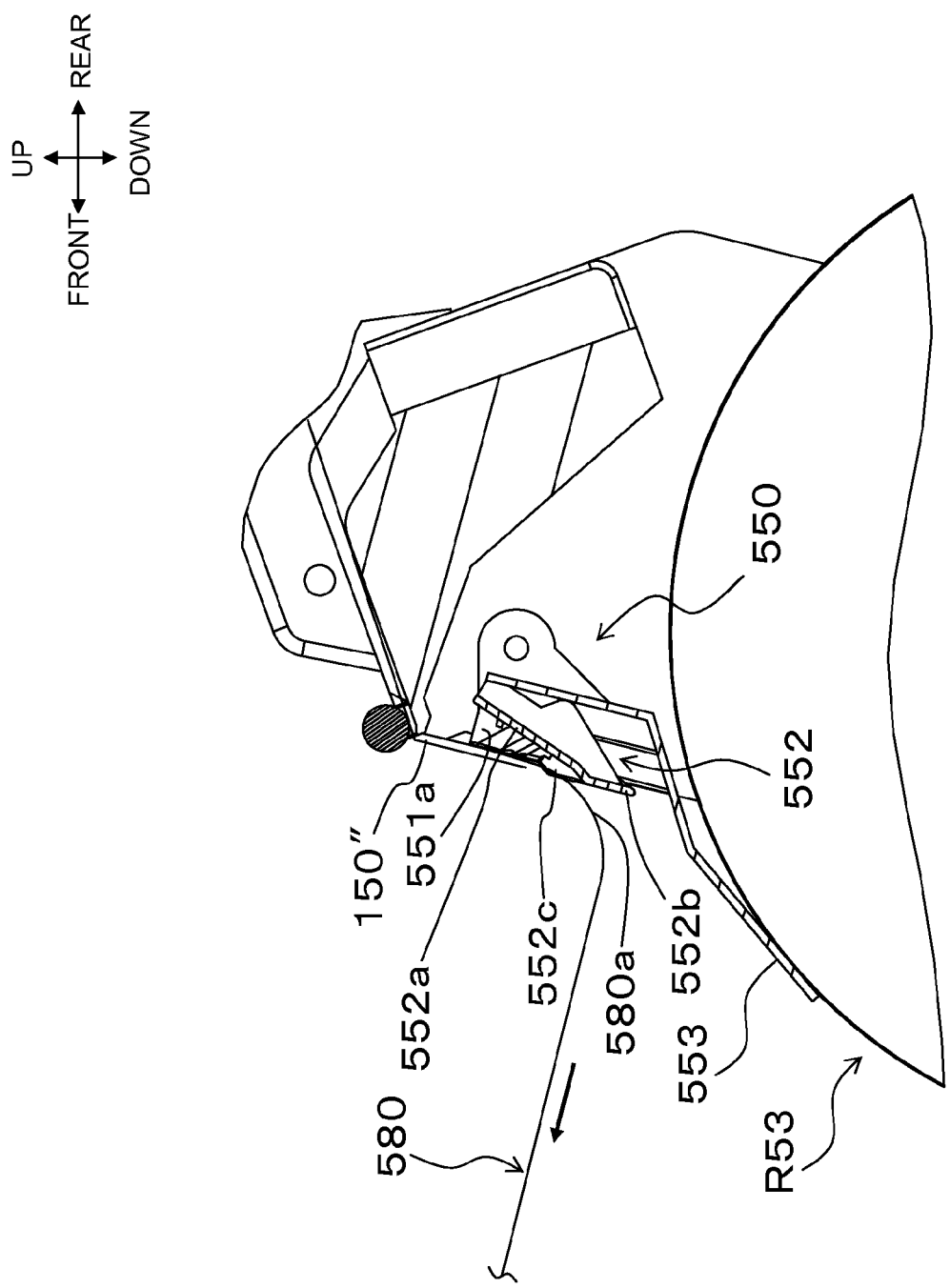
FIG. 54 is an explanatory view for explaining the connecting procedure of the leader tape and adhesive tape with print.

Then, as shown in FIG. 54, the entire core member 540, including the paper core 544, rotates as described above, causing the tip end part 580a of the leader tape 580 to come off the above described convex parts 552c, 552c, be pulled to the paper core 544 side (refer to the arrow in FIG. 54), and be sequentially wound around and layered on the outer circumferential part of the paper core 544, forming the second roll R52.

ADVANTAGES OF THIS EMBODIMENT

As described above, in this embodiment, the rear-side opening/closing part 508 comprises two opening/closing covers (the first opening/closing cover 508a and the second opening/closing cover 508b). That is, the area above the frontward side of the first storage part 503 can be opened and closed by the first opening/closing cover 508a, and the area above the rearward side of the first storage part 503 can be opened and closed by the second opening/closing cover 508b separately from the first opening/closing cover 508a. Accordingly, when the operator wants to check the behavior of the first roll R51 inside the above described first storage part 503, the operator may set only the second opening/closing cover 508b in an open state while leaving the first opening/closing cover 508a closed as is. With this arrangement, the operator can visually check the state of the print-receiving adhesive tape 150 by a simple operation without largely opening the entire first storage part 503.

On the other hand, the edge part 519 of the second opening/closing cover 508b receives a driving force from the outer circumferential part 518a of the first opening/closing cover 508a when the first opening/closing cover 508a is moved in the opening direction. Accordingly, when the operator wants to largely open the area above the first storage part 503 and store (or remove) the first roll R51, for example, the operator may manually operate only the first opening/closing cover 508a in the opening direction. With this arrangement, when the first opening/closing cover 508a is moved in the opening direction, the edge part 519 of the second opening/closing cover 508b receives a driving force from the outer circumferential part 518a of the first opening/closing cover 508a, causing the second opening/closing cover 508b to automatically move in the opening direction as well in tandem with the movement of the first opening/closing cover 508a. As a result, it is possible to set both the first opening/closing cover 508a and the second opening/closing cover 508b in open states, largely open the entire first storage part 503, and smoothly store (or remove) the first roll R51. Note that with the operator manually operating the first opening/closing cover 508a in the closing direction after storage (or removal), the urging force of the urging member disposed on the upper end of the rearward side of the housing main body 502a causes the second opening/closing cover 508b to automatically move in the closing direction as well in tandem with the movement of the first opening/closing cover 508a in the closing direction. With this arrangement, it is possible to close substantially the entire area above the first storage part 503.

As described above, according to this embodiment, the operator can visually check the state of the first roll R51 inside the first storage part 503 by a simple operation without deteriorating operability at the time of storage or removal of the first roll R51 into or from the first storage part 503.

Further, in particular, according to this embodiment, the pivot axis K53 of the first opening/closing cover 508a is further on the rearward side than the roll center R50 of the first roll R51, making it possible to reliably largely open the area above the first roll R51 inside the first storage part 503 by simply manually operating the first opening/closing cover 508a in the opening direction, setting both the first opening/closing cover 508a and the second opening/closing cover 508b in open states.

Further, in particular, according to this embodiment, of the pivot axis K53 of the first opening/closing cover 508a, the pivot axis K54 of the second opening/closing cover 508b, and the roll center R50 of the first roll R51 stored in the first storage part 503, the pivot axis K54 of the second opening/closing cover 508b is in the highest position. As a result, the size of the space above the first storage part 503 that is opened and closed by the second opening/closing cover 508b (in other words, the size of the second opening/closing cover 508b itself) can be made as small as possible, making it possible for the operator to reliably visually check the state of the first roll R51 by a simple operation.

Further, in this embodiment, each of the pair of left and right handle parts 525, 525 is disposed on the respective left or right side of the connecting arm 516 that connects the first roll R51 and the third roll R53. With this arrangement, the operator can lift the adhesive tape cartridge TK5 by gripping the handle parts 525, 525 from both sides using the left hand and the right hand with the first roll R51 and the third roll R53 positioned in the front-rear direction as viewed from the operator. Since the adhesive tape cartridge TK5 can be handled with the two rolls (the first roll R51 and the third roll R53) set in the front-rear direction in this manner, regardless of the state of the weight balance between the first roll R51 side and the third roll R53 side as described above, it is possible to reduce susceptibility to the effects of weight balance. Then, further, according to this embodiment, the slip preventing parts 525a, 525a are disposed on the rearward side ends of the above described handle parts 525, 525. With this arrangement, the operator can pinch the slip preventing parts 525a, 525a between the fingertips of both hands for support, making it possible to grip the handle parts 525, 525 in their entirety using the left and right hands while preventing fingertip slipping.

As a result of the above, the operator can grip the adhesive tape cartridge TK5 in this embodiment favorably and reliably regardless of the length of the history of usage, thereby improving handling performance.

Further, in particular, according to this embodiment, the operator can grip the handle parts 525, 525 that respectively protrude in the left-right direction from the pair of left and right first bracket parts 520, 520 that hold the first roll R51 using the left and right hands, respectively, and lift the adhesive tape cartridge TK5. As a result, it is possible to reliably improve the handling performance of the adhesive tape cartridge TK5.

Further, in particular, according to this embodiment, the first connecting part 522 is disposed further on the outside in the radial direction than the slip preventing parts 525a, 525a. With this arrangement, it is possible to set the position of the first connecting part 522, which is disposed to prevent interference with the outer diameter of the first roll R51, on the outside in the radial direction to the extent possible. As a result, the maximum outer diameter of the first roll R51 can be further increased, making it possible to increase the length of the print-receiving adhesive tape 150 that can be fed out from a single adhesive tape cartridge TK5.

Further, in particular, according to this embodiment, the slip preventing parts 525a, 525a are configured so that the dimension of the first roll R51 along the radial direction is larger than the dimensions of the other areas of the handle parts 525, 525. With the areas of the handle parts 525, 525 that are larger than the other areas serving as the slip preventing parts 525a, 525a, it is possible to reliably improve the ease of gripping and insusceptibility to slipping for the operator.

Further, in particular, according to this embodiment, the slip preventing parts 525a, 525a are partially arcuate in shape, making it possible to reliably maintain a state in which the slip preventing parts 525a, 525a are pinched by the fingertips of both hands even if the angle of inclination of the adhesive tape cartridge TK5 differs by the length of the history of usage as described above, thereby maintaining favorable handling performance.

Further, in particular, according to this embodiment, the first roll R51 winds the print-receiving adhesive tape 150. Further, the third roll R53 winds the separation material layer 151 peeled from the adhesive tape 150' with print. With this arrangement, it is possible to realise a configuration in which the operator can favorably and reliably grip the adhesive tape cartridge TK5 that is used after the separation material layer 151 is peeled as the print-receiving adhesive tape 150 is fed out, regardless of the length of the history of usage.

Further, in this embodiment, the head cover part 527b is pivotably disposed around the pivot axis K57 near the print head 511, making it switchable between a covering position in which it covers the platen roller 512 side of the aforementioned print head 511 and an exposing position in which it exposes the platen roller 512 side. Then, depending on whether or not a force generated in association with the relative approaching movement of the aforementioned platen roller 512 and the print head 511 is received by the edge parts 527c, 527c of the side plate parts 527a, 527a, the head cover part 527b is selectively pivoted to the above described covering position or the above described exposing position.

With this arrangement, when the platen roller 512 and the print head 511 are relatively near each other, the head cover part 527b pivots to the exposing position, making the aforementioned print formation movement possible. On the other hand, when the platen roller 512 and the print head 511 are relatively separated from each other, the head cover part 527b pivots to the covering position, making it possible to cover and protect the platen roller 512 side of the print head 511.

As described above, according to this embodiment, it is possible to not obstruct the print formation movement when the movement is executed, and cover the area around and reliably protect the print head 511 when the print formation movement is not performed.

Further, in particular, according to this embodiment, the edge parts 527c, 527c of the side plate parts 527a, 527a are configured to be capable of receiving a force from the shaft part 512a of the platen roller 512 that is generated in association with the relative approaching movement of the platen roller 512 and the print head 511. With this arrangement, when the platen roller 512 and the print head 511 are relatively near each other, the head cover part 527b pivots to the exposing position by the force received from the shaft part 512a of the approaching platen roller 512, making the above described print formation movement possible. On the other hand, when the platen roller 512 and print head 511 are relatively separated from each other, the force from the above described shaft part 512a is no longer received, causing the head cover part 527b to pivot to the covering position, making it possible to cover and protect the platen roller 512 side of the print head 511. Further, the edge parts 527c, 527c receive the force from the shaft part 512a of the platen roller 512 and, utilising the force received from the shaft part 512a, the pivoting of the head cover part 527b is executed. With this arrangement, the head cover part 527b disposed around the print head 511 is capable of promptly pivoting to the exposing position or the covering position in a manner that most directly corresponds to the approaching or separating behavior of the print head 511 with respect to the platen roller 512.

Further, in particular, according to this embodiment, the housing 502 comprises the housing main body 502a where the platen roller 512 is disposed, and the first opening/closing arm 506 connected to the housing main body 502a in an openable and closeable manner. Then, the edge parts 527c, 527c of the side plate parts 527a, 527a are configured to be capable of receiving a force from the shaft part 512a of the platen roller 512 that is generated by the approach between the platen roller 512 and the print head 511 resulting from the opening/closing movement of the first opening/closing arm 506. Then, the edge parts 527c, 527c receive a force from the shaft part 512a of the platen roller 512 when the first opening/closing arm 506 is closed, causing the head cover part 527b to pivot to the exposing position; and the edge parts 527c, 527c do not receive a force from the shaft part 512a of the platen roller 512 when the first opening/closing arm 506 is open, causing the head cover part 527b to pivot to the covering position. With this arrangement, when the operator sets the first opening/closing arm 506 in a closed state, it is possible to make the print head 511 approach the platen roller 512 and, by the force received by the edge parts 527c, 527c of the side plate parts 527a, 527a at that time of that approach, pivot the head cover part 527b to the exposing position. On the other hand, when the operator sets the first opening/closing arm 506 in an open state, it is possible to make the print head 511 separate from the platen roller 512 and, since the force received from the above described shaft part 512*a* no longer exists, pivot the head cover part 527*b* to the covering position. Thus, it is possible to automatically switch the head cover part 527*b* between the covering position and the exposing position in tandem with the opening/closing movement of the first opening/closing arm 506.

Further, in particular, according to this embodiment, the space that is generated between the ribbon take-up roller 515 and the print head 511 disposed for guiding the ink ribbon IB5 is utilised as a space for the pivoting movement of the head cover part 527*b*. With this arrangement, it is possible to maintain a space where the head cover part 527*b* recesses in the exposing position without causing unnecessary increases in size, and achieve smooth pivoting of the head cover part 527*b*.

Further, in this embodiment, when the user pivots the support bracket RB5 from the above described closed position to the above described open position, the second bracket RB52 moves in the direction of separation from the first bracket RB51, making the second roll R52 attachable and detachable in the open position. Accordingly, after the adhesive tape 150" with print is wound to form the second roll R52 as described above, for example, the user can pivot the support bracket RB5 to the open position at suitable timing, and smoothly and simply remove the wound second roll R52 from the space between the first bracket RB51 and the second bracket RB52 separated as described above.

On the other hand, when the user pivots the support bracket RB5 from the above described open position to the above described closed position, the second bracket RB52 moves in the direction of approaching the first bracket RB51, making the second roll R52 not attachable or detachable in the closed position. Accordingly, when the second roll R52 is newly mounted, for example, the user disposes the second roll R52 (or the core member 540 for forming the second roll R52) in the space between the first bracket RB51 and the second bracket RB52 separated in the above described open position, and then pivots the support bracket RB5 to the closed position. With this arrangement, the second bracket RB52 is made to approach the first bracket RB51, making it possible to smoothly and simply sandwich and mount the above described second roll R52 (or the core member 540) between the two.

As described above, in this embodiment, the user can set the support bracket RB5 in the closed position, making it possible attach and detach the second roll R52 not in the interior space but outside the interior space of the housing main body 502*a*. With this arrangement, it is no longer necessary to maintain a manual operation space for attaching and detaching the second roll R52 inside the housing main body 502*a*, making it possible to decrease the size of the housing main body 502*a*. Then, at this time, with a one-touch operation that pivots the support bracket RB5 from the closed position to the open position (or from the open position to the closed position), the user can make the second bracket RB52 approach or separate from the first bracket RB51 in tandem with that pivoting. With this arrangement, it is possible to simply and easily remove and mount the second roll R52 and thus improve operability.

Further, in particular, according to this embodiment, after disposing the second roll R52 (or the above described core member 540) between the first bracket RB51 and the second bracket RB52 in the separated state, the user pivots the support bracket RB5 from the open position to the closed position. As a result, due to the force received by the inclined cam part 535 from the wall part 536 of the housing main body 502*a*, a force such as one that resists the urging force of the compression spring 534 acts on the second bracket RB52. With this arrangement, it is possible to make the second bracket RB52 reliably approach the first bracket RB51 in tandem with the pivoting movement from the closed position to the open position.

Further, in particular, according to this embodiment, a gear mechanism for transmitting a driving force for rotationally driving the second roll R52 generated by the take-up motor M53 is disposed on the frontward side of the housing main body 502*a*. Then, the first bracket RB51 is configured to be capable of transmitting the driving force from the above described gear mechanism to the second roll R52 in the closed position, and the inclined cam part 535 is disposed on the second bracket RB52 on the side opposite the first bracket RB51. With this arrangement, it is possible to transmit the driving force from the take-up motor M53 to the second roll R52 via the first bracket RB51 by setting the support bracket RB5 in the closed position. As a result, it is possible to reliably take up and wind the adhesive tape 150" with print onto the second roll R52. Further, the inclined cam part 535 is disposed on the second bracket RB52, making it possible to move only the second bracket RB52 in the left-right direction when the support bracket RB5 is pivoted, and fix the left-right direction position of the first bracket RB51. As a result, it is possible to not inhibit transmission of the driving force from the aforementioned gear mechanism to the first bracket RB51.

Further, in particular, according to this embodiment, when the support bracket RB5 pivots from the closed position and arrives at the open position, the concave part 539*b* disposed on the edge part of the circular part 531*b* of the second bracket RB52 engages with the protrusion 539*a* disposed on the frontward side and the rightward side of the housing main body 502*a*, and the reinforcing plate 538 disposed on the support bracket RB5 butts against the surface on the inside of the second opening/closing arm 507, thereby preventing the support bracket RB5 from pivoting any further. With this arrangement, it is possible to reliably prevent the occurrence of bending, damage, and the like on the first bracket RB51 and the second bracket RB52 due to excessive pivoting from the closed position.

Further, in this embodiment, the open hole 548*b* is disposed on the second flange part 548. At this time, the open hole 548*b* comprises a radial dimension from the first radial position P51 to the second radial position P52 further on the inner circumference side. Further, the second radial position P52 is set so that it is further on the inner circumference side than the outer diameter of the paper core 544 mounted to the first cylinder part 545 and the second cylinder part 547.

With this arrangement, when the second roll R52 is generated as described above, at least a part of the paper core 544 is exposed in the direction of the axis O52 via the above described open hole 548*b* of the second flange part 548. As a result, even if the second roll R52 sticks to the second flange part 548 as described above, the operator can peel the sticking by pushing out the above described exposed section with a fingertip or the like, and pull out the second roll R52 in the direction of the axis O52. Further, at that time, the open hole 548*b* is disposed in two locations of the second flange part 548 facing each other in the radial direction, making it possible to substantially simultaneously press the two locations of the second roll R52 facing each other in the radial direction. As a result, it is possible to smoothly and reliably pull out the second roll R52.

Further, in particular, according to this embodiment, the edge part 548*ba* of the open hole 548*b* on the inside in the radial direction is substantially set in the same position as the inside end of the second flange part 548 in the radial direction, making it possible to increase the size of the open hole 548b to the inside in the radial direction. With this arrangement, it is possible to more reliably peel the second roll R52 from the second flange part 548 by the above described push-out via the open hole 548b.

Further, in particular, according to this embodiment, the open hole 548b comprises a substantially trapezoidal shape with the length of the edge part 548ba on the inside in the radial direction longer than the length of the edge part 548bb on the outside in the radial direction. With this arrangement, it is possible to increase the size of the edge part 548ba of the open hole 548b on the inside in the radial direction, which exposes the paper core 544, and make the above described push-out easier to perform and, at the same time, decrease the size of the edge part 548bb on the outside in the radial direction of the opposite side to the extent possible to maintain the strength of the second flange part 548, making it possible to guide the push-out position by the fingertip in the edge part 548ba direction.

Further, in this embodiment, the adhesive holding part 551 is disposed in order to temporarily tack the adhesive layer 152 that is exposed on the above described adhesive tape 150" with print when the adhesive tape cartridge TK5 is handled as a single unit prior to mounting to the housing main body 502a. The user adheres the above described generated adhesive tape 150" with print (specifically, both side areas) to the above described adhesive holding part 551. With this arrangement, when the adhesive tape cartridge TK5 is handled as a single unit as described above, it is possible to prevent the adhesive tape 150" with print from mistakenly sticking to the third roll R53 or another part of the adhesive tape cartridge TK5.

At this time, in preparation for cases where the above described adhesive tape cartridge TK5 is mounted to the housing main body 502a as described above and generation of the second roll R52 is to be started, the above described adhesive holding part 551 holds the above described adhesive layer 152 with the center area other than the above described both side areas exposed in the air. With this arrangement, the user can set the tip end part 580a of the leader tape 580 attached to the outer circumference side of the above described core member 540 near the above described center area exposed in the air, for example. Then, when the generation of the above described second roll R52 is started, the user makes the tip end part 580a of the leader tape 580 set as described above approach and come in close contact with the center area of the above described adhesive tape 150" with print positioned nearby. With this arrangement, the adhesive tape printer 501 rotationally drives the above described core member 540 and winds the leader tape 580 around the outer circumference side thereof, for example, making it possible to wind the above described adhesive tape 150" with print connected to the leader tape 580 around the outer circumference side of the above described core member 540 following the leader tape 580 and generate the second roll R52.

As described above, in this embodiment, it is possible to improve the handling performance of the overall adhesive tape cartridge TK5 and improve user convenience. Then, it is possible to simplify and streamline the preparation operation performed when the adhesive tape cartridge TK5 is mounted to the housing main body 502a and generation of the second roll R52 is to be started, thereby decreasing the labour burden.

Further, in particular, according to this embodiment, the adhesive holding part 551 holds both side areas of the adhesive layer 152 by the adhering parts 551b, 551b with the center area of the adhesive layer 152 held and exposed in the air by the concave part 551a. At this time, the concave part 551a is configured to be capable of receiving the tip end part 580a of the above described leader tape 580. With this arrangement, the user sets the tip end part 580a of the leader tape 580 attached to the outer circumference side of the core member 540 to the inside of the concave part 551a, which is near the above described center area exposed in the air, making the set tip end part 580a of the leader tape 580 come in close contact with the center area of the above described adhesive tape 150" with print. As a result, it is possible to reliably connect the leader tape 580 and the adhesive tape 150" with print and wind the connected above described adhesive tape 150" with print around the outer circumference side of the core member 540.

Further, in particular, according to this embodiment, the switching member 552, which is capable of switching and moving between a separated position which causes the adhesive tape 150" with print and the leader tape 580 to separate from each other, and a close contact position which causes the adhesive tape 150" with print and the leader tape 580 to come in close contact with each other, is disposed in the above described concave part 551a. The user sticks the tip end part 580a of the above described leader tape 580 to the switching member 552 set in the separated position in advance, and then switches the above described switching member 552 to the close contact position. With this arrangement, it is possible to make the above described stuck tip end part 580a of the leader tape 580 approach and come in close contact with the center area of the above described adhesive tape 150" with print. As a result, it is possible to smoothly and reliably connect the leader tape 580 and the adhesive tape 150" with print by a simple operation.

Note that the above described embodiment 2 is not limited to the above described configuration, and various modifications may be made without deviating from the spirit and scope of the disclosure. For example, while the inclined cam part 535 is disposed on the second bracket RB52 side in the above described embodiment 2, the present disclosure is not limited thereto, allowing an inclined cam part to be disposed on the first bracket RB51 side rather than (or in addition to) the second bracket RB52 side. In this case as well, similar advantages to those in the above described embodiment can be achieved.

Further, while the compression spring 534, the inclined cam part 535, and the like are disposed on the support bracket RB5, causing the second bracket RB52 to move in the direction of separation from the first bracket as the support bracket RB5 pivots from the closed position toward the open position, and the second bracket RB52 to move in the direction of approaching the first bracket as the support bracket RB5 pivots from the open position toward the closed position in the above described embodiment 2, the present disclosure is not limited thereto. For example, at least one member that acts as described above may be disposed on the housing main body 502a side rather than (or in addition to) the support bracket RB5 side. In this case as well, similar advantages to those in the above described embodiment 2 can be achieved.

Further, while the second bracket RB52 is capable of moving in the left-right direction and the left-right direction position of the first bracket RB51 is fixed in the above described embodiment 2, the present disclosure is not limited thereto, allowing the first bracket RB51 to be capable of moving in the left-right direction and the left-right direction position of the second bracket RB52 to be fixed. Or, both the first bracket RB51 and the second bracket RB52 may be capable of moving in the left-right direction. In this case as well, similar advantages to those in the above described embodiment 2 can be achieved.

Further, while the second roll R52 that winds the adhesive tape 150″ with print on which print has been formed by the print head 511 and from which the separation material layer 151 has been peeled around the axis O52 is formed in the above described embodiment 2, the present disclosure is not limited thereto. For example, a second roll that winds the adhesive tape 150′ with print on which print has been formed by the print head 511 around the axis O52 without performing the above described peeling may be formed. In this case as well, similar advantages to those in the above described embodiment 2 can be achieved.

Further, while the paper core 544 is mounted to the outer circumference side of the first outer cylinder 542 and the second outer cylinder 543, and the adhesive tape 150″ with print is wound around the outer circumference side of the paper core 544 in the above described embodiment 2, the present disclosure is not limited thereto. For example, a dedicated cylindrical member may be fixed to the outer circumference side of the first outer cylinder 542 and the second outer cylinder 543, and the adhesive tape 150″ with print may be wound around the outer circumference side of the dedicated cylindrical member. Note that, in this case, the dedicated cylindrical member is fixed by a suitable fixing method. In this case as well, similar advantages to those in the above described embodiment 2 can be achieved.

Further, while the above described embodiment 2 has described an illustrative scenario in which the present disclosure is applied to the adhesive tape printer 501 that performs printing on the print-receiving adhesive tape 150, the present disclosure is not limited thereto, allowing application to a tape take-up apparatus that takes up and layers an affixing tape comprising a base layer and an adhesive layer to generate an affixing tape roll as well.

Further, other than that already stated above, techniques based on the above described embodiments and each of the modifications may be suitably utilized in combination as well.

What is claimed is:

1. An adhesive tape cartridge comprising:
an adhesive tape roll having an adhesive tape wound thereon, said adhesive tape comprising an adhesive layer and a separation material layer covering said adhesive layer;
a peeling part configured to peel said separation material layer from said adhesive tape fed out from said adhesive tape roll, and thereby to generate an affixing tape;
a separation material roll configured to wind said separation material layer peeled by said peeling part;
a support member that respectively rotatably supports said adhesive tape roll and said separation material roll; and
an adhering portion configured to reseparably adhere said affixing tape generated by the peeling of said separation material layer by said peeling part thereto, said adhering portion comprising a cover member configured to cover at least an area of said separation material roll from said affixing tape generated by said peeling part,
wherein the cover member comprises two sides defining a hole, and wherein said affixing tape is configured to be reseparably adhered to each of the two sides across said hole.

2. The adhesive tape cartridge according to claim 1, wherein said adhering portion is a reseparably adhering portion configured to perform a predetermined release processing for reseparably adhering said affixing tape thereto.

3. The adhesive tape cartridge according to claim 2, wherein said reseparably adhering portion comprises a release processing area formed on said support member, or a release processing member attached to said support member.

4. The adhesive tape cartridge according to claim 1, wherein said hole is configured to expose said affixing tape to said separation material roll via said hole so as to allow said affixing tape to be accessible by a finger operation.

5. The adhesive tape cartridge according to claim 1, wherein said support member includes:
a pair of first bracket parts that sandwich said adhesive tape roll from a first side and a second side to rotatably hold said adhesive tape roll; and
a pair of second bracket parts that sandwich said separation material roll from a first side and a second side to rotatably hold said separation material roll, and
wherein said pair of first bracket parts is spaced apart from said pair of second bracket parts.

6. An adhesive tape cartridge comprising:
an adhesive tape roll having wound thereon an adhesive tape comprising an adhesive layer and a separation material layer covering said adhesive layer;
a peeling part configured to peel said separation material layer from said adhesive tape fed out from said adhesive tape roll, and thereby to generate an affixing tape;
a separation material roll configured to wind said separation material layer peeled by said peeling part;
a support member that respectively rotatably supports said adhesive tape roll and said separation material roll; and
an adhering portion configured to reseparably adhere said affixing tape generated by the peeling of said separation material layer by said peeling part,
wherein said adhering portion is an adhesive holding member configured to reseparably adhere a first area of said adhesive layer of said affixing tape generated by the peeling of said separation material layer by said peeling part, and to hold a second area other than said first area in a state of exposure in the air, and
wherein said adhesive holding member comprises:
a concave part configured to hold said second area of said affixing tape in the air, and to receive a tip end part of a connecting tape for sticking and connecting to said adhesive layer of said affixing tape; and
an adhering part that is respectively provided on both sides of said concave part and is configured to reseparably adhere said first area of said affixing tape while keeping said first area separated from said tip end part of said connecting tape received in said concave part in a tape thickness direction, the first area being positioned on both sides of said second area in a width direction of said affixing tape.

7. The adhesive tape cartridge according to claim 6, further comprising:
a switching member that said tip end part of said connecting tape received is stuck to and is disposed on said concave part, the switching member being configured to switch between a first position and a second position, wherein in said first position the tip end part stuck and said second area of said affixing tape are separated in a tape thickness direction of said affixing tape, and wherein in said second position the tip end part stuck and said second area of said affixing tape approach in said tape thickness direction and come in contact with each other.

* * * * *